(12) United States Patent
Ito

(10) Patent No.: US 6,451,364 B1
(45) Date of Patent: Sep. 17, 2002

(54) METHOD OF TREATING A FOOD OBJECT IN AN ELECTROSTATIC FIELD

(76) Inventor: Akinori Ito, Room 202, Rose-Garden, 14-5 Takamatsu 1-chome, Nerima-ku, Tokyo 179-0075 (JP)

( * ) Notice: Subject to any disclaimer, the term of this patent is extended or adjusted under 35 U.S.C. 154(b) by 0 days.

(21) Appl. No.: 09/690,627

(22) Filed: Oct. 18, 2000

Related U.S. Application Data

(63) Continuation of application No. 09/180,927, filed as application No. PCT/JP98/01114 on Mar. 17, 1998, now abandoned.

(30) Foreign Application Priority Data

| Mar. 17, 1997 | (JP) | 9-63021 |
|---|---|---|
| Aug. 13, 1997 | (JP) | 9-218652 |
| Nov. 25, 1997 | (JP) | 9-323624 |
| Dec. 5, 1997 | (JP) | 9-336163 |
| Dec. 26, 1997 | (JP) | 9-360955 |
| Feb. 16, 1998 | (JP) | 10-33194 |

(51) Int. Cl.$^7$ .............................................. A23L 1/00
(52) U.S. Cl. ...................................... 426/244; 426/524
(58) Field of Search ................................ 426/234, 244, 426/524; 99/451, DIG. 14

(56) References Cited

U.S. PATENT DOCUMENTS

| 3,935,321 A | 1/1976 | Sackler et al. ............. 426/244 |
|---|---|---|
| 4,277,659 A | 7/1981 | DeRemer ................. 200/61.62 |
| 4,343,979 A | 8/1982 | Barbini et al. ............. 219/700 |
| 4,980,530 A | 12/1990 | Butot ........................ 219/771 |
| 5,034,236 A | 7/1991 | Ohtsuki ..................... 426/244 |
| 5,156,869 A | 10/1992 | Otsuki ...................... 426/237 |
| 5,194,181 A | 3/1993 | Reitz ......................... 252/500 |
| 5,541,392 A | 7/1996 | Miklos ...................... 219/771 |
| 5,651,907 A | 7/1997 | Miklos ...................... 219/771 |
| 5,695,671 A | 12/1997 | Landwehr et al. .......... 219/779 |
| 5,718,934 A | 2/1998 | Hayakawa ................. 426/237 |

*Primary Examiner*—George C. Yeung
(74) *Attorney, Agent, or Firm*—Young & Thompson

(57) ABSTRACT

A method of treating a food object in an electrostatic field to thaw food rapidly at temperatures between 0° C. and a freezing temperature of an object to be treated. By applying the electrostatic field, the freezing temperature of the food is lowered but the food does not freeze in the electrostatic field. Accordingly, foods are kept fresher longer and the freshness can be maintained over a range of temperatures.

14 Claims, 73 Drawing Sheets

Voltage to Temperature in Freshness Maintaining Method of Vegetables

Voltage to Temperature in Method of Freezing Meat

Voltage to Temperature in Method of Thawing Fishes and Shelfishes

Voltage to Temperature in Method of Maintaining Freshness of Fishes and Shelfishes

METHOD OF TREATING A FOOD OBJECT IN AN ELECTROSTATIC FIELD

This application is a continuation of application Ser. No. 09/180,927, filed on Nov. 16, 1998 now abandoned. Application Ser. No. 09/180,927 is the national phase of PCT International Application No. PCT/JP98/01114 filed on Mar. 17, 1998 under 35 U.S.C. §371. The entire contents of each of the above-identified applications are hereby incorporated by reference.

TECHNICAL FIELD

This invention relates to electrostatic treatment used for freezing, and freshness keeping of food and oxidation inhibition of edible oil.

TECHNICAL BACKGROUND

Conventionaly, meat and fish were thawed in the range of minus temperature in a refrigerator. Further, fruit as well as meat and fish was kept fresh therein, and these technics are disclosed in Japanese Patent Publication Hei5-77387. In this method, the whole part of a refrigerator is completely insulated from its floor and a voltage of 5,000V to 20,000V is impressed on the shelves of the refrigerator by a negative electron generating apparatus through the inner wall of the refrigerator to thaw food in a low temperature range of −3° C. to +3° C. Further, in the negative electron generating apparatus, one pole of the secondary side of a transformer is completely closed and insulated, and a high output resistance is provided on the other pole.

In these method and apparatus, since one pole of the electron generating apparatus is insulated, a large output is required on the secondary side of the transformer. Further, since the whole part of the refrigerator is insulated from the floor, and the casing of the refrigerator is not grounded, the casing of the refrigerator is charged with electricity, and an operator sometimes receives an electric shock to cause a danger of a secondary accident. In addition, there was a conventional fryer in which oil in an oil tank is charged with electricity to prevent oxidation of the oil. Such a fryer is disclosed in Japanese Patent Publication Hei7-78298, that is, an electrode is set in the oil tank with a high voltage electrostatic transformer or a voltage is directly impressed on the oil tank itself thereby. In this case, the whole part of the fryer is insulated from the floor, one pole on the secondary high voltage side of the high voltage electrostatic transformer is insulated and the other pole is connected to an electrode or the oil tank. However, unless the transformer having one pole thereof insulated and closed is adjusted so that a large output is generated on the secondary side thereof, a necessary voltage cannot be impressed on the oil itself. Further, since the whole of the fryer is insulated from the floor, the casing of the fryer is charged with electricity to cause an electric shock of an operator.

Therefore, it is an object of this invention to provide an electrostatic treatment method and apparatus which are safe and effective even if the secondary side output voltage of the transformer is relatively small.

BRIEF DESCRIPTION OF THE DRAWINGS

FIG. 120 is a structural view of an electron range.

FIG. 121 is a structural view of a muffler in which an electrostatic field is formed.

FIG. 122 is a system view of pine weevil exterminating device in which an electrostatic field is formed.

FIG. 123 is a structural view of an electron-charged water supply device in which an electrostatic field is formed.

FIG. 124 is a structural view of a fish farm in which an electrostatic field is formed.

FIG. 125 is a structural view of a water tank in which an electrostatic field is formed.

FIG. 126 is a structural view of a maturing device in which an electrostatic field is formed.

FIG. 127 is a graph showing a maturing state of pickles.

FIG. 128 is a sectional view of an electrostatic field water bed.

FIG. 129 is a structural view of a rice storage device in which an electrostatic field is formed.

FIG. 130 is a sectional view of a large-size rice boiling pot in which an electrostatic field is formed.

FIG. 131 is a sectional view of a rice boiling pot for domestic use in which an electrostatic field is formed.

Figure 132:
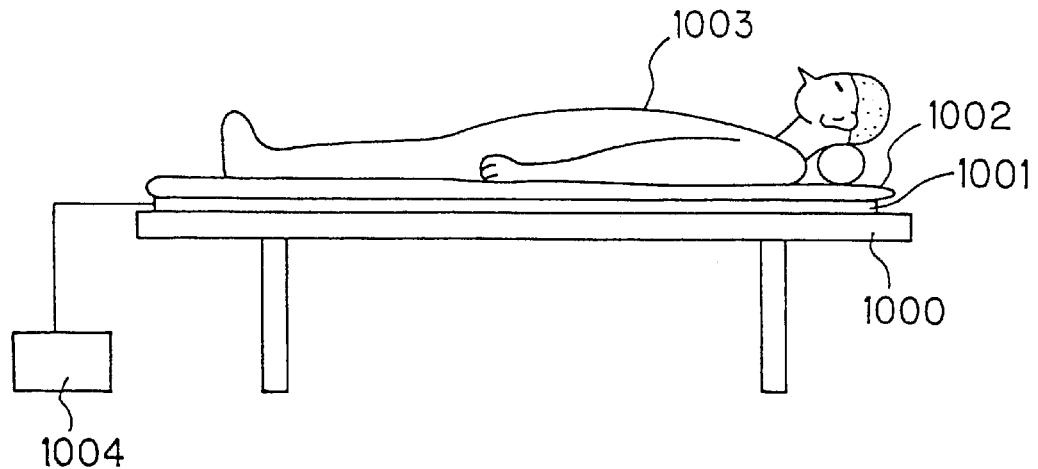

FIG. 132 is a side view of an electrostatic field treatment table.

Figure 133:
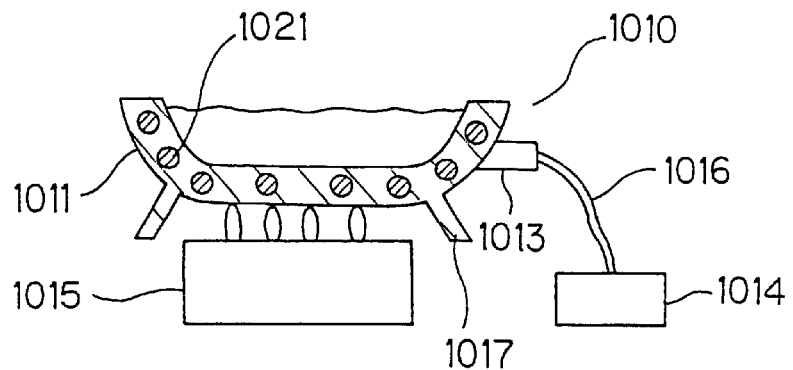

FIG. 133 is a sectional view of an electrostatic field cockpot.

Figure 134:
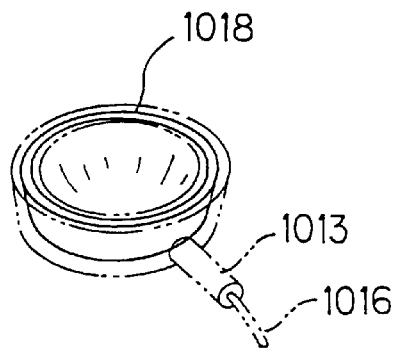

FIG. 134 is a perspective view showing another embodiment of an electrostatic field cockpot.

Figure 135:
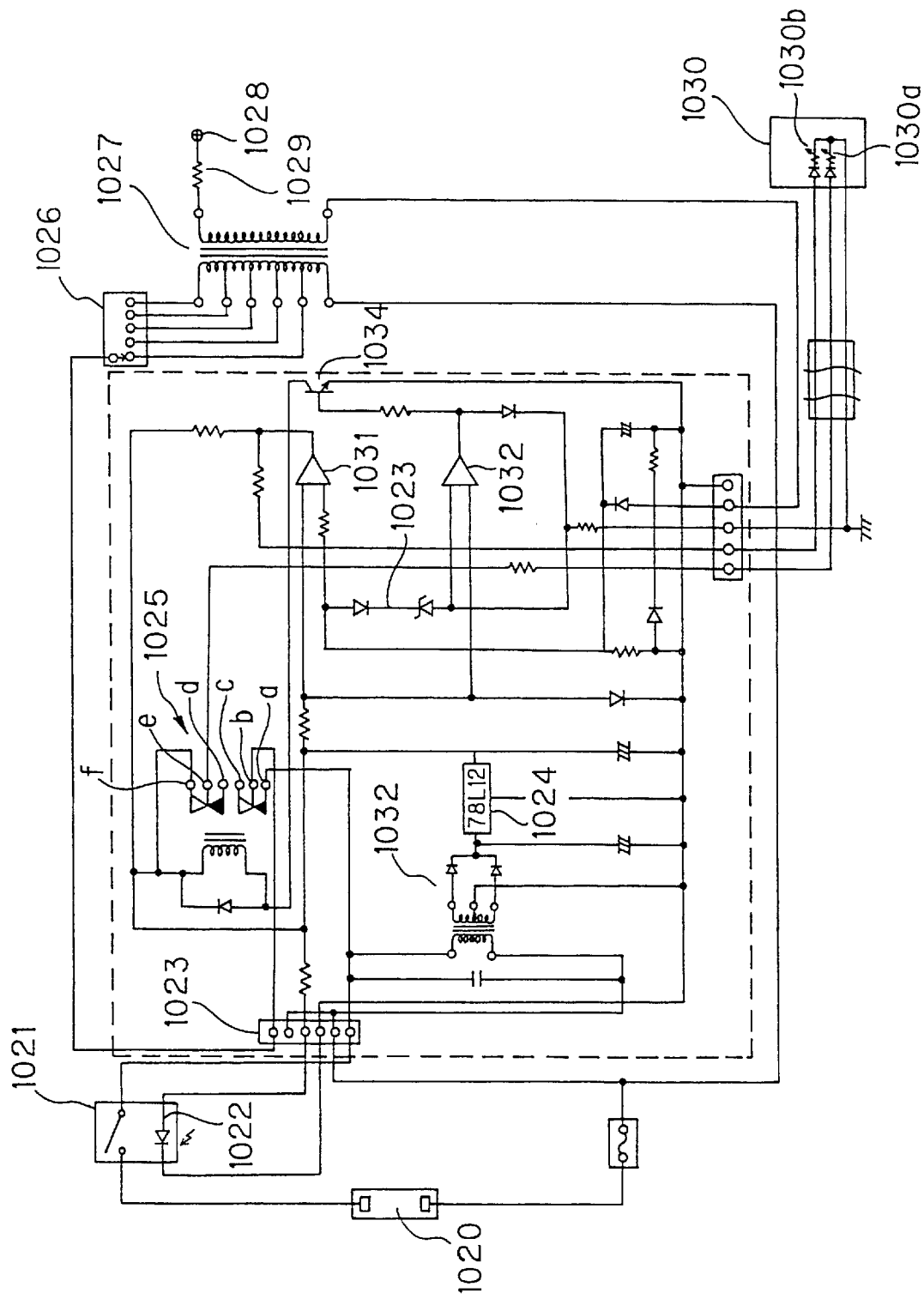

FIG. 135 is a circuit-view of a high voltage generating device.

Figure 136:
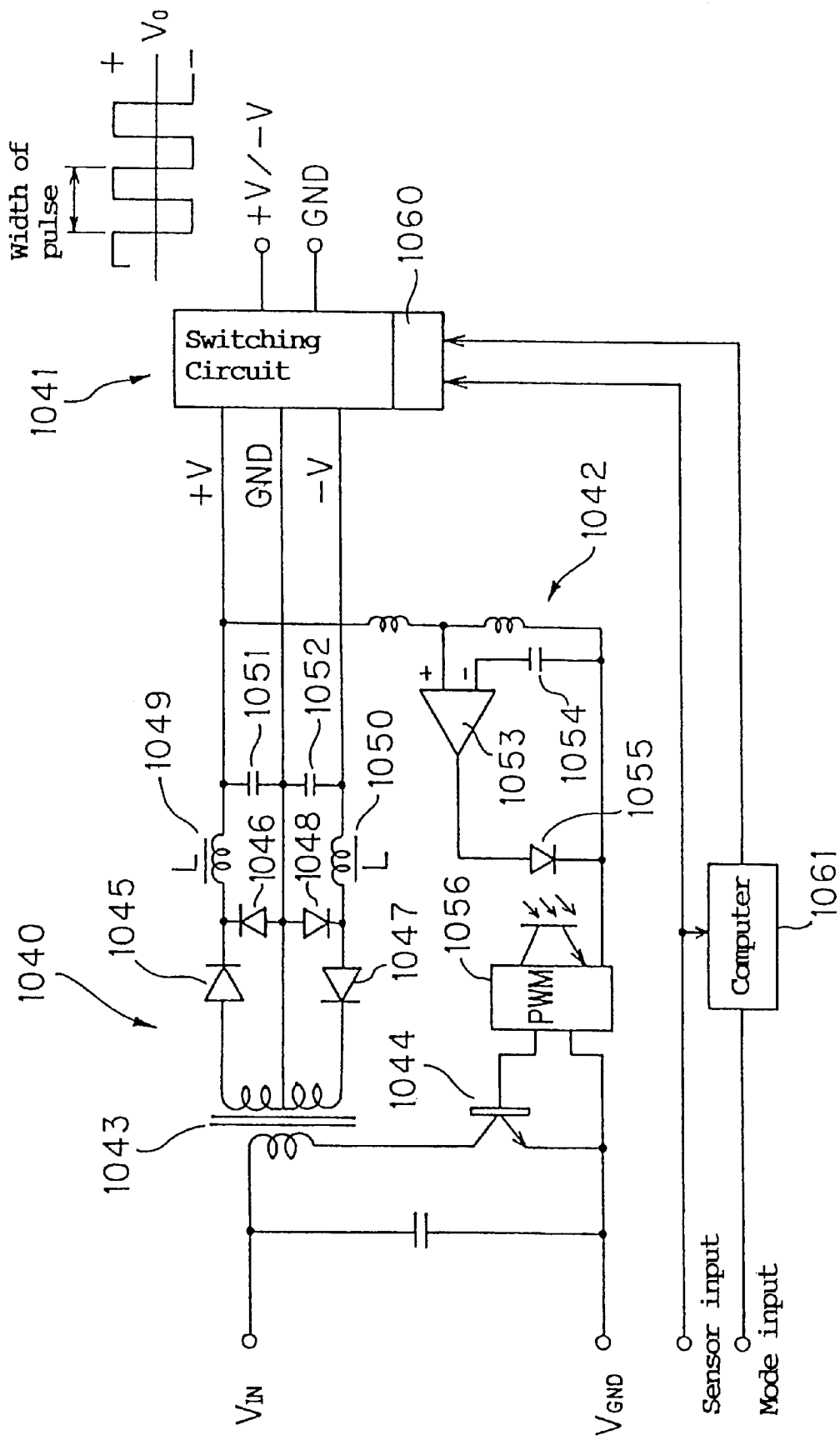

FIG. 136 is a circuit view of a high voltage generating device with a battery therein.

Figure 137:
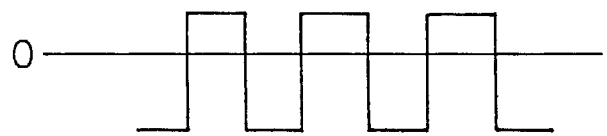

FIG. 137 is a view showing an alternating voltage outputted by the circuit shown in FIG. 136.

Figure 138:
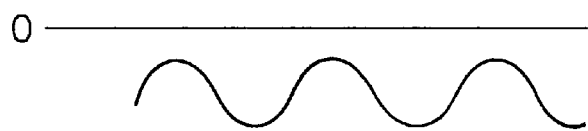

FIG. 138 is a view showing a minus voltage of a high voltage generating device.

Figure 139:
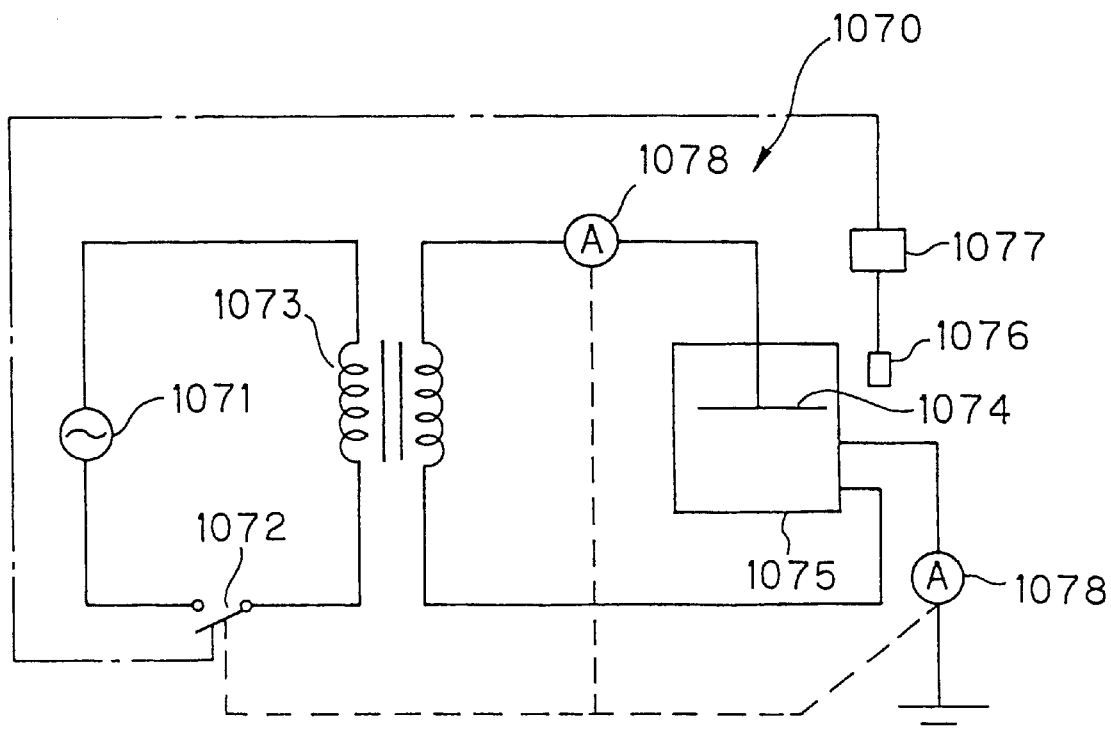

FIG. 139 is a circuit view of a high voltage generating device in which a safety device is arranged therein.

Figure 140:
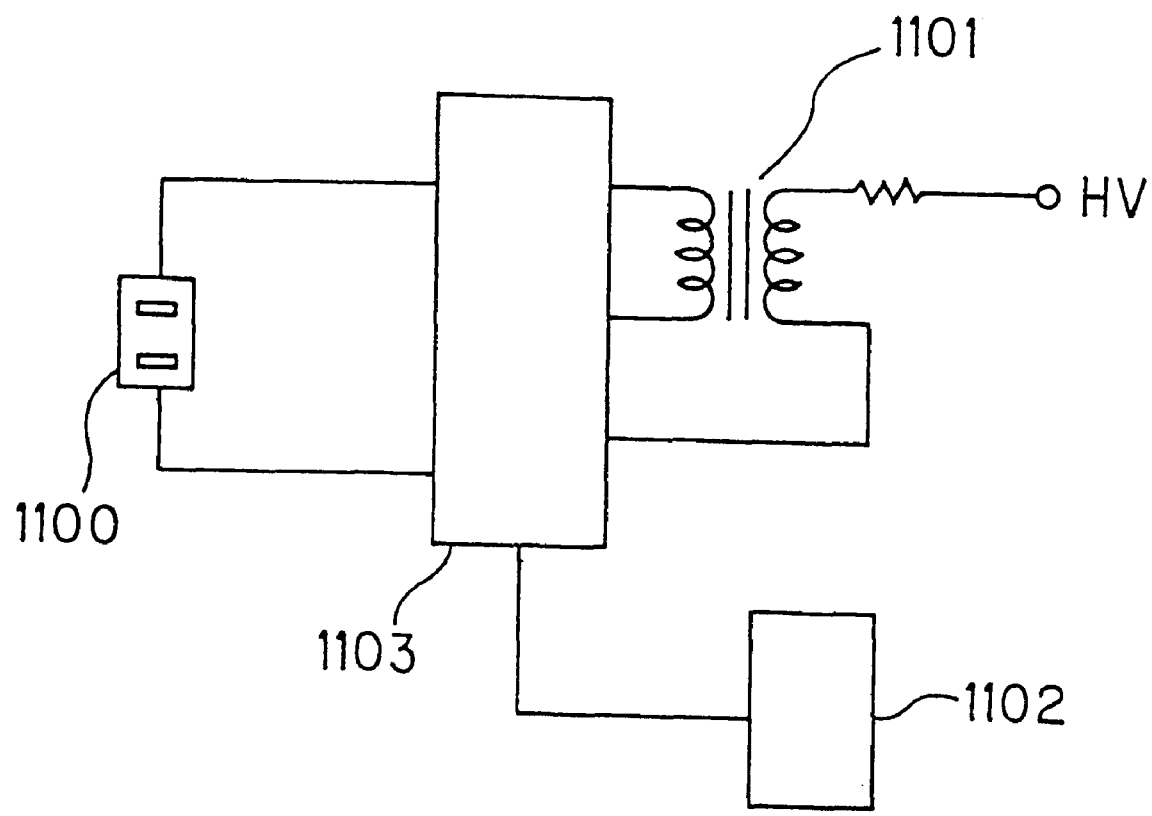

FIG. 140 is a circuit view of a high voltage generating device in case that a power source for domestic use is used as an earth.

BEST MODE FOR WORKING THE INVENTION

Figure 1:
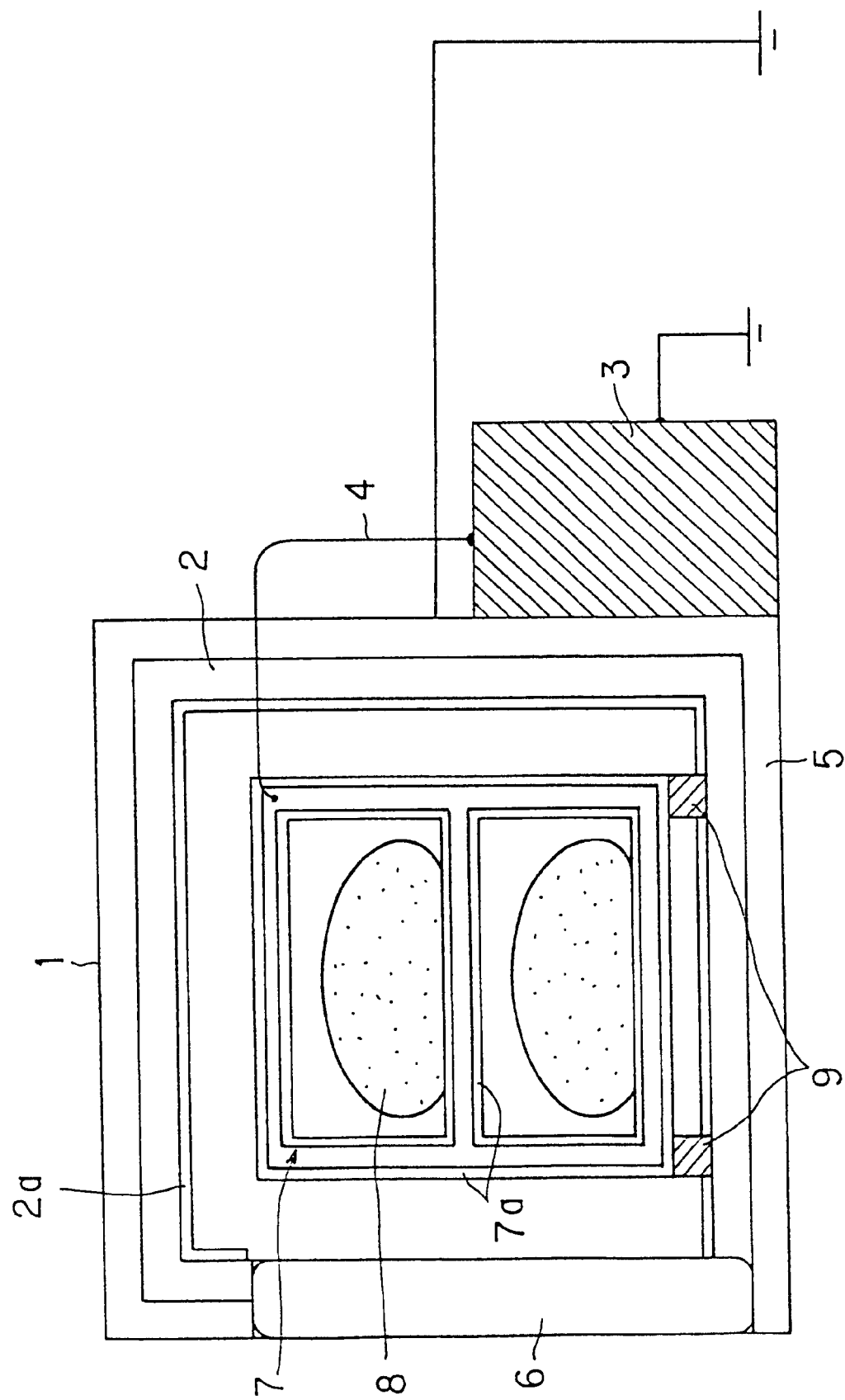
FIG. 1 shows a schematic structural view of a refrigerator of this invention.

Embodiments of this invention will now be explained with refence to drawings and tables. FIG. 1 is a view for showing an embodiment of a thawing and freshness keeping device according to this invention.

A refrigerator has a heat-insulating material 2, an outer wall 5, and a temperature adjusting mechanism (not shown) therein. A metal shelf 7 has a two-shelf structure, and objects such as vegetables, meat and fishes and shellfishes to be thawed, freshness-kept and matured are put on each shelf. The metal shelf 7 is insulated from the floor of the refrigerator by an insulating body 9.

Further, a high voltage generating device 3 can generate direct and alternating voltages of 0–500 V, and the interior of the heat-insulated material 2 is covered with an insulating plate 2a such as vinyl chloride and the like.

A high voltage cable 4 for output a voltage of the high voltage generating device 3 is connected to the metal shelf 7 through the outer wall 5 and the heat-insulated material 2. When a door 6 provided on the front face of the refrigerator 1 is opened, a safety switch 13 (see FIG. 2) is turned off to stop the output of the high voltage generating device 3.

Figure 2:
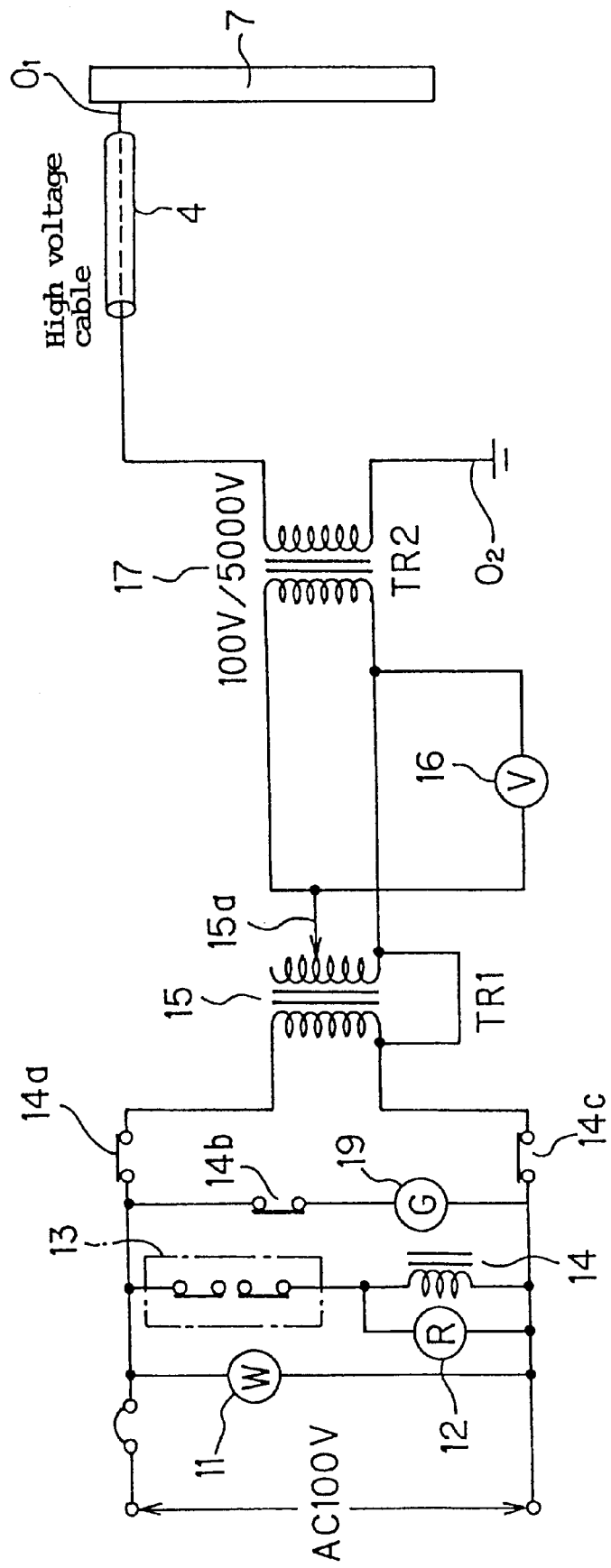
FIG. 2 shows an electric circuit view of a high voltage generating device.

FIG. 2 is a circuit view of the high voltage generating device 3.

AC100V is supplied on the primary side of a voltage adjustment transformer 15. Numeral 11 is a power source lamp, and numeral 19 is a lamp indicating a state of operation. A relay 14 is operated when the safety switch 13 is on with the door 6 being closed, and this state is indicated by a relay operating lamp 12. The operation of the relay closes relay contacts 14a, 14b, 14c to impress AC 100V of a power source on the primary side of the voltage adjustment transformer 15.

An impressed voltage is adjusted by an adjusting knob 15a provided on the secondary side of the voltage adjustment transformer, and the value of voltage is indicated on a voltmeter. The adjusting knob 15a is connected to the primary side of a voltage increasing transformer 17 provided on the secondary side of the voltage adjustment transformer 15, and the voltage increasing transformer 17 increases the voltage, e.g., at a rate of 1:50. For example, 60V is increased to 3000V. One output end $O_1$ on the secondary side of the voltage increasing transformer 17 is connected to the meal shelf 7 insulated from the refrigerator through the high voltage cable 4, and the other output end $O_2$ is grounded. Further, the outer wall 5 is grounded, and, therefore, a user of the refrigerator 1 does not receive an electric shock even if he touches the outer wall of the refrigerator. In case that the metal shelf 7 is exposed to the interior of the refrigerator in FIG. 1, the metal shelf 7 must be separated from the inner wall of the refrigerator (air functions as an insulating material) because the metal shelf 7 must be maintained in an insulating condition. However, in case that an object 8 protrudes from the metal shelf 7 to contact the inner wall of the refrigerator, an electric current flows to the earth through the wall of the refrigerator, and, therefore, if the insulating plate 2a applies to the inner wall, the decrease of the voltage impressed thereon can be prevented. In addition, if the metal shelf 7 is covered with vinyl chloride or the like with exposing the metal shelf 7 to the interior of the refrigerator, the whole of the interior of the refrigerator becomes an electrostatic field atmosphere. The interior of the refrigerator and the metal shelf 7 may be painted and sprayed with known coating material in addition to vinyl chloride and PBS.

Next, actual freshness keeping and maturing methods will now be explained.

(A) Method of Keeping Freshness of Vegetables (Including Fruits)

If vegetables are basically stored at approximately 4° C., the freshness can be maintained, and, however, the vegetables are sometimes dried or withered. In the case of cut vegetables, the cut portion thereof is changed in quality and dried quickly. Temperature range for storage is changed due to summer and winter vegetables. A alternating voltage is impressed on the metal shelf 7 by the high voltage generating device 3, and, the voltage of the metal shelf 3, generated by the alternating voltage was determined as shown in Table 1. The voltage of the metal shelf 7 was measured by a known electrostatic measuring device. The vegetables, meat and fishes and shellfishes were tested in such a manner that they were put in a stainless tray (having a good conductivity) with the opening being covered with thin film.

TABLE 1-1

Freshness keeping test of vegetables and fruits

| Vegetables | Freshness keeping device of this invention | Conventional refrigerator |
|---|---|---|
| Cucumber +1° C. 500 V | No cut vegetables and cut vegetables were maintained fresh without browning and drying for about two weeks and one week, respectively. | No cut vegetables and cut vegetables browned and dried in five days and one or two days, respectively. However, according to kind of vegetables, the time period was different. |
| Cucumber ±0° C. 1000 V | No cut vegetables and cut vegetables were maintained fresh without browning and drying for about ten days and five days, respectively. | |
| Cucumber −1° C. 2000 V | No cut vegetables and cut vegetables were maintained fresh without browning and drying for about ten days and five days, respectively. | |
| Beefsteak plant (big leaf) −1° C. 500 V | Freshness was maintained for about one week without withering. | This vegetable withered in one or two days and could not use as food. |
| Beefsteak plant (big leaf) ±0° C. 1000 V | Freshness was maintained for about five days without withering | |
| Beefsteak leaf (big leaf) −1° C. 2000 V | Freshness was maintained for about five days without withering | |
| Piment ±0° C. 2000 V | No cut piment and cut piment lost better taste in about two weeks and a week without browning and drying, respectively. | No cut piment and cut piment browned in about five days and two days, respectively. |
| Leek ±2° C. 700 V | Freshness was maintained for one week | The leek dried in one or two days. |

TABLE 1-2

Freshness keeping test of vegetables and fruits

| Vegetables | Freshness keeping device of this invention | Conventional refrigerator |
|---|---|---|
| Broccoli ±0° C. 2000 V | The broccoli did not brown for one week and became sweet. | The stem yellowed in two days and did not used as food. |
| Asparagas ±0° C. 2000 V | The stem did not change color and kept its freshness | The stem changed color in one or two days. |
| Chinese green ±0° C. 2000 V | No cut chinese green was maintained fresh for ten days and cut chinese green kept its freshness for about one week. | No cut chinese green dried in about three days and cut chinese green withered in half a day. |
| Chinese green +1° C. 1000 V | No cut chinese green was maintained fresh for ten days and cut chinese green was maintained fresh for five days. | |

TABLE 1-2-continued

Freshness keeping test of vegetables and fruits

| Vegetables | Freshness keeping device of this invention | Conventional refrigerator |
|---|---|---|
| Chinese green −1° C. 3000 V | No cut chinese green was maintained fresh for ten days and cut chinese green was maintained fresh for five days. | |
| Cresson +1° C. 2000 V | Freshness was maintained for one week. | The cresson withered in about two days. |
| Cresson ±0° C. 2500 V | " | |
| Cresson −1° C. 3000 V | Freshness was maintained for five days. | |

TABLE 1-3

Freshness keeping test of vegetables and fruits

| Vegetables | Freshness keeping device of this invention | Conventional refrigerator |
|---|---|---|
| Carrot ±0° C. 2000 V | No cut carrot and cut carrot did not brown and yellow for two weeks and one week, respectively. | No cut carrot and cut carrot browned in one week and two days, respectively. |
| Pasley ±0° C. 2000 V | Pasley did not change color and maintained freshness for one week. | Pasley changed color and dried in two days. |
| Celery ±0° C. 2000 V | Celery did not change color and maintained freshness. | Celery changed color and dried in two days. |
| Strawberry −1° C. 500 V | Freshness was maintained for twenty days. | Some of strawberry was changed quickly after laying in stock, and the limit was three days. |
| Grape ±0° C. 1000 V | Fruits did not drop from the cluster for twenty days, and stem did not brown. | Fruits dropped from the cluster for two or three days and the stem browned in one week |

The changing width of average temperature and the voltage error were ±1° C. and ±200 V, respectively.

Figure 3:
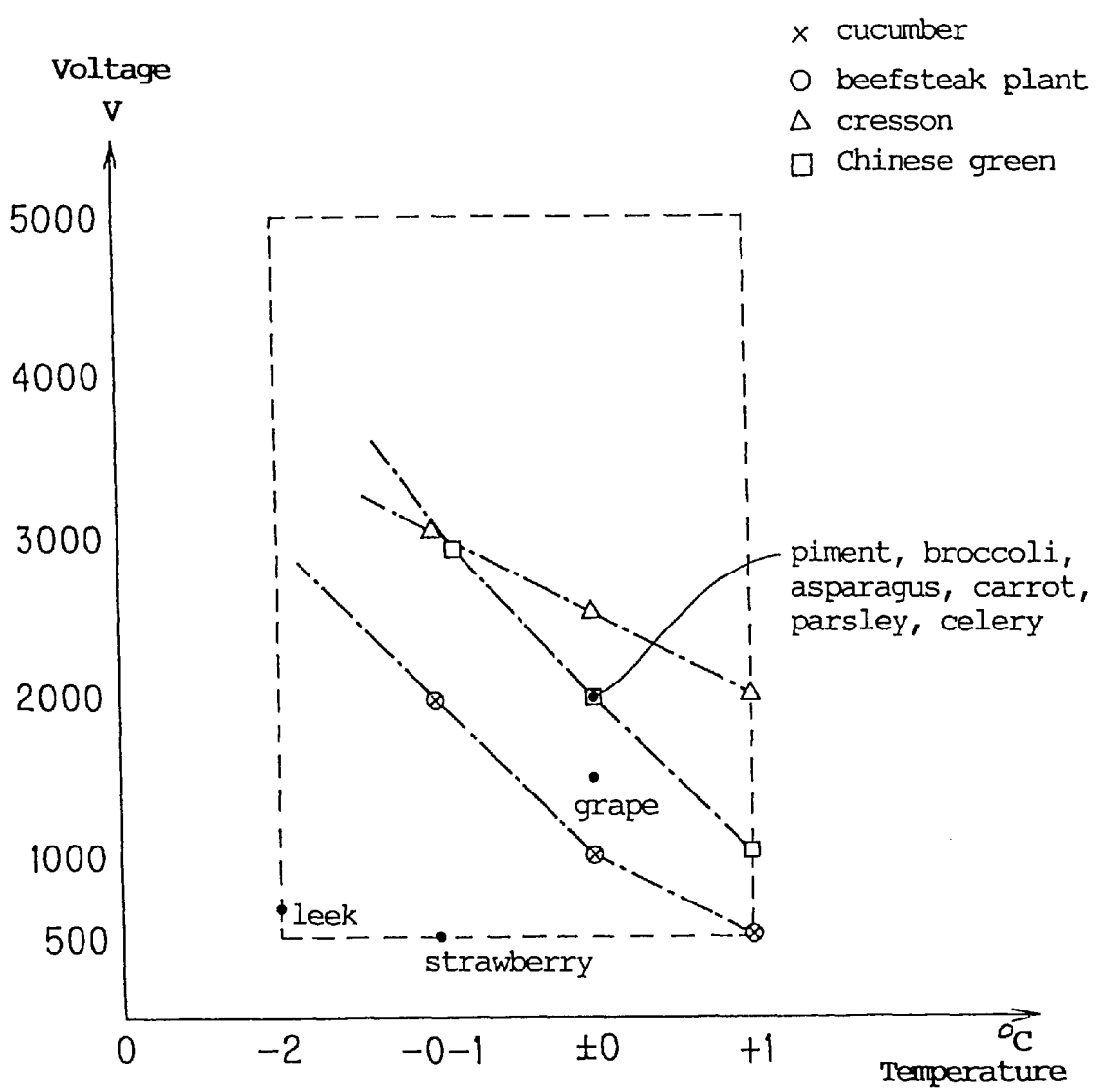
FIG. 3 is a graph showing the relationship between voltage and temperature in method of keeping freshness of vegetables.

FIG. 3 is a graph showing the relationship between the voltage and average temperature according to the results of the Tables 1-1 to 1-3. It can be understood that the freshness of vegetables is maintained for a long time at the ranges of average temperature of −2−+1° C. and of voltage of 500V–3000V in comparison with a conventional refrigerator. However, actually, a voltage less than 5000V is good. In the same kind of vegetable, at the proper respective ranges of the average temperature and the voltage, when the voltage is increased, the average temperature is decreased. When the voltage is decreased, the average temperature is increased. Thus, a good result can be obtained. For example, in the case of cucumber, if values of the voltage and the average temperature close to a line of (+1° C., 500V), (0° C., 1000V) and (−2° C., 3000V) are selected, a good result can be obtained. Further, in the case of piment, broccoli, asparagas, chinese green, carrot, parsley and celery, a good result can be obtained near the line of (+1° C., 1000V), (0° C., 2000V) and (−1° C., 500V) and (−2° C., 1500V). According to the above consideration, in the case of cucumber and beefsteak leaf, the relationship of Table 2 indicated below brings a good result.

TABLE 2

| Temperature | Voltage |
|---|---|
| −2° C. | 3000V |
| −1° C. | 2000V |
| ±0° C. | 1000V |
| +1° C. | 500V |

According to the above results, it is understood that if vegetables are stored on the metal shelf under the above condition using the apparatus shown in FIG. 1, they can be maintained fresh without freezing at the range of temperature of minus or close to minus.

(B) Method of Thawing, Freshness-maintaining and Maturing Meat

Thawing requires a large energy and the time period of thawing depends on level of voltage. If the voltage is too high, an object to be treated may have stains and discolor. In the thawing apparatus, an alternating voltage is impressed on the object in the same manner as the vegetables, and the alternating voltage is measured.

Some meat is freeze-stored at the temperature range of −55° C.−−30° C. In case that meat is stored at a temperature less than −5° C., the average thawing temperature is determined at the range of ±0° C.–+10° C. and the alternating voltage of 3000V (3000V–5000V) is impressed thereon to thaw frozen meat so that the core-temperature (temperature of the center portion) is raised to that upper approximately −5° C. (the difference between the core temperature and the outer surface temperature is less than 5° C.). Thereafter, a thawing operation is done under the condition mentioned below. Time period written in the columns of the thawing test of a thawing device of this invention means thawing time until an object becomes above −5° C. This is also adapted for thawing of fishes and shellfishes.

TABLE 3

Thawing test of meat

| Meat | Thawing device of this invention | Conventional refrigerator |
|---|---|---|
| Roast beef (10 kg thawing) ±0° C. 2000 V | Block of −15° C. was uniformly thawed for twenty hours. There was a drip. | Thawing of the block required two days. There was a case in which the center portion of the block was still frozen. |
| Roast beef (10 kg thawing) −1° C. 3000 V | Block of −15° C. was uniformly thawed for twenty hours. There was a little bit of drip. | |
| Roast beef (10 kg thawing) −2° C. 45000 V | Block of −15° C. was uniformly thawed for twenty hours. A slicer could slice the block smoothly. | |
| Sirloin (5 kg thawing) ±0° C. 2000 V | Block of −20° C. was uniformly thawed for twenty-four hours. There was a little bit of drip. | Thawing of the block required two days and fat yellowed. |
| Sirloin (5 kg thawing) −1° C. 3000 V | Block of −20° C. was uniformly thawed for twenty-four hours. There was a little bit of drip. | |
| Sirloin (5 kg thawing) −2° C. 4500 V | Block of −20° C. was uniformly thawed for twenty-four hours. | |
| Chicken (2 kg thawing) +2° C. 2000 V | Chicken was thawed for one day with a little bit of drip (1%). | Chicken was thawed for one day with a drip of more than 5%. |
| Chicken (2 kg thawing) ±0° C. 3000 V | Chicken was uniformly thawed with a little bit of drip (1%). | |
| Chicken (2 kg thawing) −1° C. 4000 V | Chicken was uniformly thawed with a little bit of drip (1%). | |

TABLE 4

Freshness maintaining and maturing Text

| Meat | Freshness keeping device | Conventional refrigerator |
|---|---|---|
| Roast beef (freshness keeping) +1° C. 300 V | Roast beef neither discolored nor made a drip for three days. It discolored on the fourth day. | Roast beef discolored and made a drip in two days and there was putrid smell after two days. |
| Roast beef (freshness keeping) ±0° C. 500 V | Roast beef neither discolored nor made a drip. It discolored on the sixth day. | |
| Roast beef (freshness keeping) −2° C. 700 V | Roast beef neither discolored nor made a drip for one week. | |
| Sirloin (ripening) +1° C. 300 V | Sirloin matured in three days. Thereafter, it did not discolor for three days, and discolored on the fourth day. | Maturing of sirloin required for more than one week. |
| Sirloin (ripening) ±0° C. 500 V | Sirloin matured in three days, and, thereafter, did not discolor for five days. | |
| Sirloin (ripening) −2° C. 700 V | Sirloin matured in three days, and, thereafter, did not discolor for five days. | |
| Chicken (freshness keeping) +1° C. 300 V | Freshness was kept for three days, and color was changed on the fourth days. | Chicken got rotten in two days. |
| Chicken (freshness keeping) ±0° C. 500 V | Freshness was kept for five days. | |

TABLE 4-continued

Freshness maintaining and maturing Text

| Meat | Freshness keeping device | Conventional refrigerator |
| --- | --- | --- |
| Chicken (freshness keeping) −2° C. 700 V | Freshness was well kept for five days. | |

Figure 4:
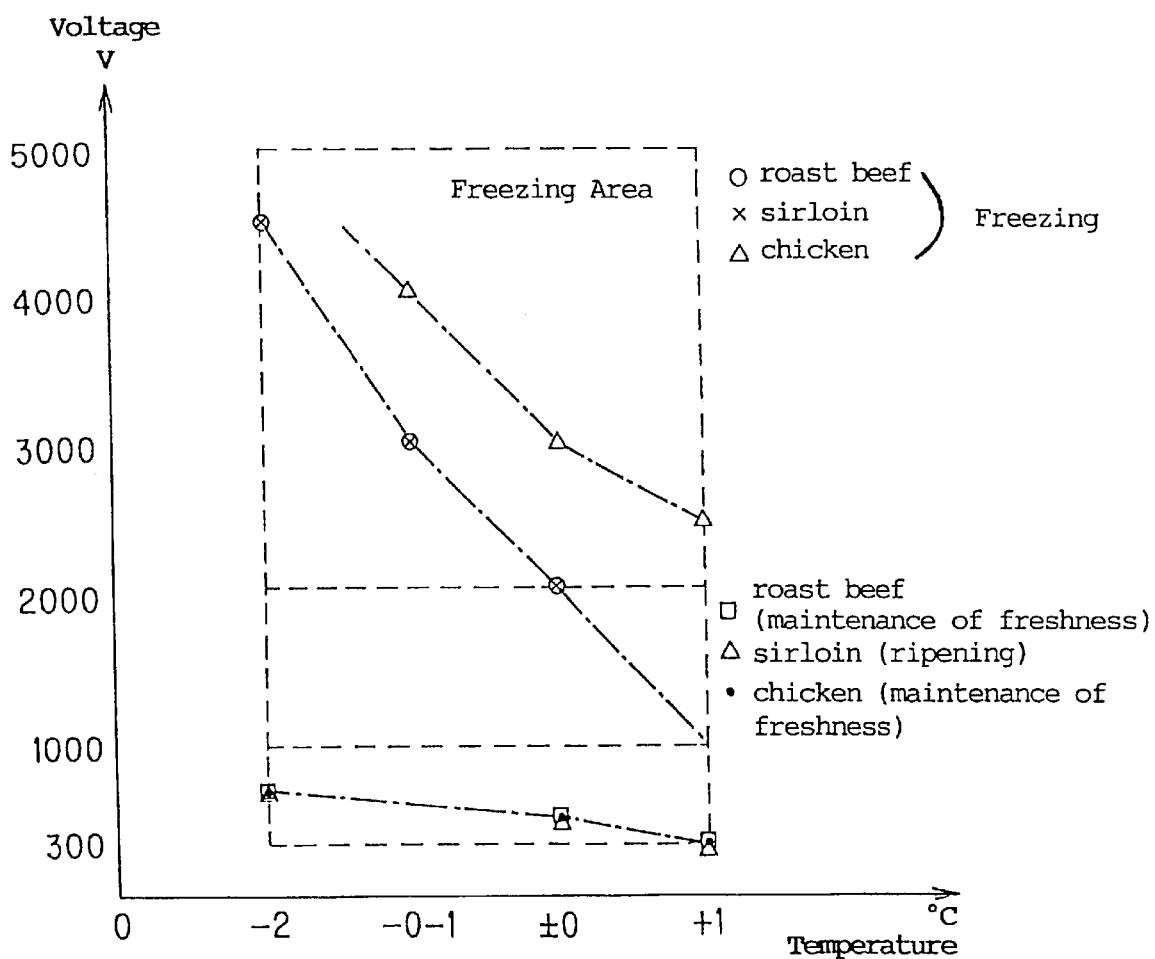
FIG. 4 is a graph showing the relationship between voltage and temperature in method of thawing meat.

FIG. 4 is a graph showing characteristics between voltage and average temperature. It is understood that meat can be thawed in the average temperature range of −2−+1° C. and the voltage range of 1000V–5000V with no stains, no discoloration, and a little bit of drip in comparison with a conventional refrigerator.

In the same kind of meat, at the respective proper ranges of the average temperature and impressed voltage, when the voltage is increased, the average temperature is decreased. When the voltage is decreased, the average temperature is increased. Thus, a good result can be obtained. For example, in the case of roast beef and sirloin, if the values of the voltage and the average temperature are selected close to a line of (±0° C., 2000V), (−1° C., 3000V) and (−2° C., 4500V), a good result can be obtained.

According to the above consideration, in the case of roast beef and sirloin, the relationship of Table 5 indicated below brings a good result.

TABLE 5

| Temperature | Voltage |
| --- | --- |
| −2° C. | 4500V |
| −1° C. | 3000V |
| ±0° C. | 2000V |
| +1° C. | 1000V |

According to the above results, it is understood that if frozen meat is thawed on the metal shelf 7 under the above condition using the apparatus shown in FIG. 1, the meat can be thawed with a little bit of drip and in a state of high quality.

Further, it is understood that freshness keeping and maturing of meat require a rather short period of three days in comparison with a conventional refrigerator in the ranges of average temperature of −2−±1° C. and voltage of 300V–100V, and meat can be maintained fresh for a long time. In the same kind of meat, at the respective proper ranges of average temperature and impressed voltage, when the voltage is increased, the average temperature is decreased. When the voltage is decreased, the average temperature is increased. Thus, a good result can be obtained. For example, in the case of roast beef, sirloin (maturing) and chicken, if the values of the voltage and the average temperature are selected close to a line of (+1° C., 300V), (±0° C., 500V) and (−1° C., 800V), a good result can be obtained. Further, measured data are not written here, and, however, a good result can be obtained even when the voltage is increased to the level of 2000V.

According to the above consideration, it is understood that, in the case of roast beef, sirloin and chicken, the relationship shown in Table 6 mentioned below is required.

TABLE 6

| Temperature | Voltage |
| --- | --- |
| −2° C. | 800V |
| ±0° C. | 500V |
| +1° C. | 300V |

According to the above results, if freshness keeping and maturing of thawed meat are done on the metal shelf 7 of the apparatus shown in FIG. 1 under the above condition, a good quality can be maintained without discoloration for a long time in comparison with a conventional apparatus.

(C) Method of Thawing and Freshness-keeping Fishes and Shellfishes

Both of thawing and freshness-keeping require a predetermined voltage, and in the case of quick thawing, the temperature is raised. An alternating voltage is impressed thereon in the apparatus in the same manner as vegetable, and the alternating voltage is measured. The freeze-storage temperature is −30° C.−−40° C. in the case of a slice of a horse mackerel, −20° C.−−30° C. in the case of scallop and −55° C. in the case of tuna. Accordingly, in case that fishes and shellfishes are freeze-stored below −5° C., first, the average temperature is determined at ±0° C.−+1° C. and the alternating voltage of 3000V (2000V–5000V) is impressed thereon to thaw them until the core-temperature (temperature of the center portion) is raised to −5° C. Thereafter, thawing is done under the condition mentioned below.

TABLE 7

Thawing test of fishes and shellfishes

| Fishes and shellfishes | Thawing device of this invention | Conventional refrigerator |
| --- | --- | --- |
| Frozen scallop (thawing) +1° C. 2000 V | The scallop was thawed uniformly in twelve hours with a little bit of drip. | The scallop could be thawed in twenty hours with drip and getting out of shape. Some parts are thawed naturally. |
| Frozen scallop (thawing) ±0° C. 2000 V | The scallop was thawed uniformly in fifteen hours without drip. | |
| Frozen scallop (thawing) −1° C. 2000 V | The scallop was thawed uniformly in twenty-four hours without drip. | |

TABLE 7-continued

Thawing test of fishes and shellfishes

| Fishes and shellfishes | Thawing device of this invention | Conventional refrigerator |
|---|---|---|
| Shrimp without head (thawing) +1° C. 2000 V | The shrimp was thawed uniformly in twelve hours with a little bit of drip. | The shrimp could be thawed in twenty hours with getting soft. (Normally, natural thawing and flowing water thawing are used.) |
| Shrimp without head (thawing) ±0° C. 2000 V | The shrimp was thawed uniformly without drip and getting out of shape. | |
| Shrimp without head (thawing) −1° C. 2000 V | The shrimp was thawed uniformly in twenty-four hours with a little bit of drip. | |
| Sole (thawing) ±0° C. 2000 V | The sole was thawed uniformly in fifteen hours without drip. | The sole was thawed in twenty-four hours with drip. |
| Tuna (thawing) ±0° C. 5000 V | The tuna was thawed uniformly in twenty-four hours without drip. | The tuna was not thawed at its core portion with surface thereof getting out of shape. |
| Crab (thawing) ±0° C. 2000 V | The crab was thawed in fifteen hours. | The crab was thawed in twenty-four hours with a specific smell of thawing at the end of thawing (Normally natural thawing and flowing water thawing are used.) |

TABLE 8

Freshness keeping test of fishes and shellfishes

| Fishes and shellfishes | Freshness keeping device of this invention | Conventional refrigerator |
|---|---|---|
| Scallop (freshness keeping) +1° C. 2000 V | There were no discoloration, a bad smell and drip for two days. | The fresh got hard with drip. |
| Scallop (freshness keeping) ±0° C. 2000 V | There were no drip and a bad smell for three days. | |
| Scallop (freshness keeping) −1° C. 2000 V | There were no discoloration, a bad smell and drip for three days. | |
| Raw oyster (freshness keeping) ±0° C. 2000 V | There were no discoloration and a bad smell without the shrinkage of flesh for five days. | There was a bad smell in one or two days. Heating was necessary for food. |
| Shrimp without head (freshness keeping) +1° C. 2000 V | There were no discoloration and a bad smell for five days. There was a case that it discolored and had a bad smell on the fourth day. | There were discoloration and a bad smell in two days. |
| Shrimp without head (freshness keeping) ±0° C. 2000 V | There were no discoloration and a bad smell for five days. | |
| Shrimp without head (freshness keeping) −1° C. 2000 V | There were no discoloration and a bad smell for five days. | |
| Tuna (freshness keeping) +1° C. 2000 V | Freshness was kept for three days with a little bit of drip. There was a case that it discolored on the fourth day. | Freshness was kept only for one or two days and it discolored quickly. |
| Tuna (freshness keeping) ±0° C. 2000 V | Freshness was kept for four days with a little bit of drip. | |
| Tuna (freshness keeping) −1° C. 2000 V | Freshness was kept for four days with a little bit of drip. | |

Figure 5:
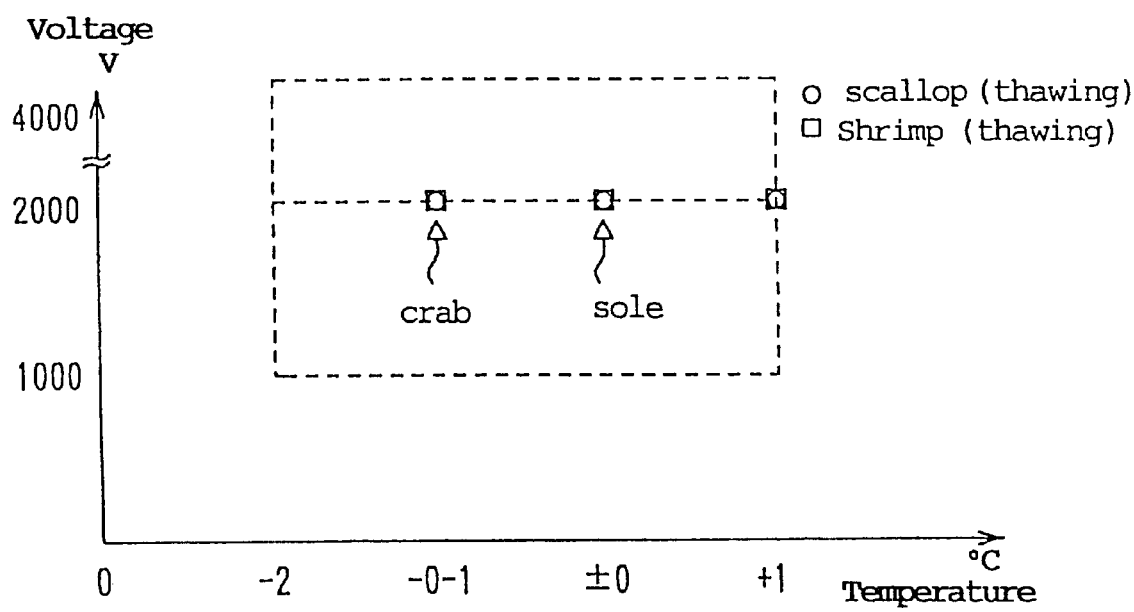
FIG. 5 is a graph showing the relationship between voltage and temperature in method of thawing fishes and shellfishes.
Figure 6:
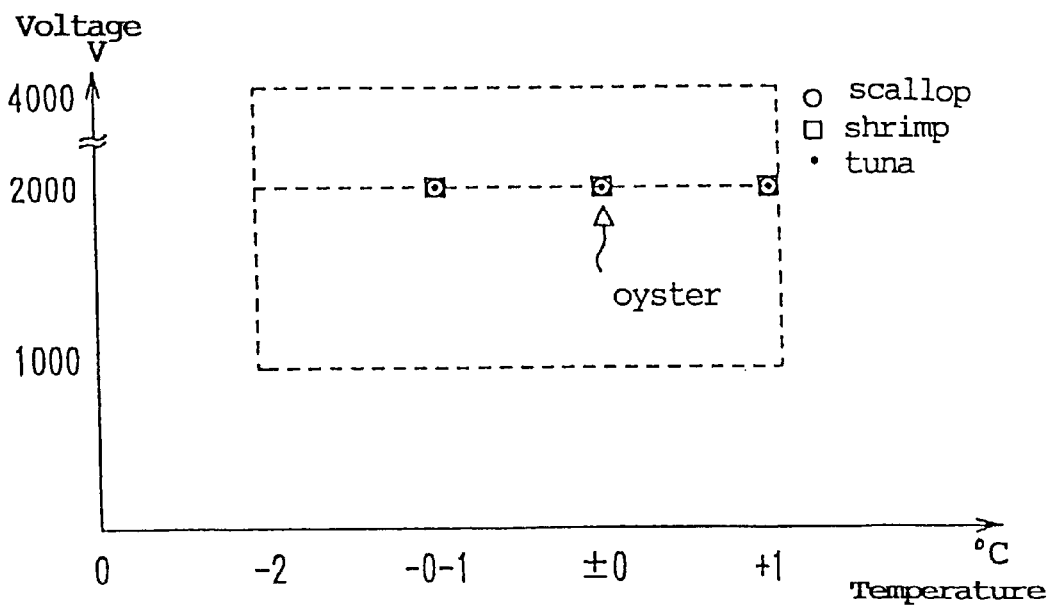
FIG. 6 is a graph showing the relationship between voltage and temperature in method of maintaining freshness of fishes and shellfishes.
Figure 7:
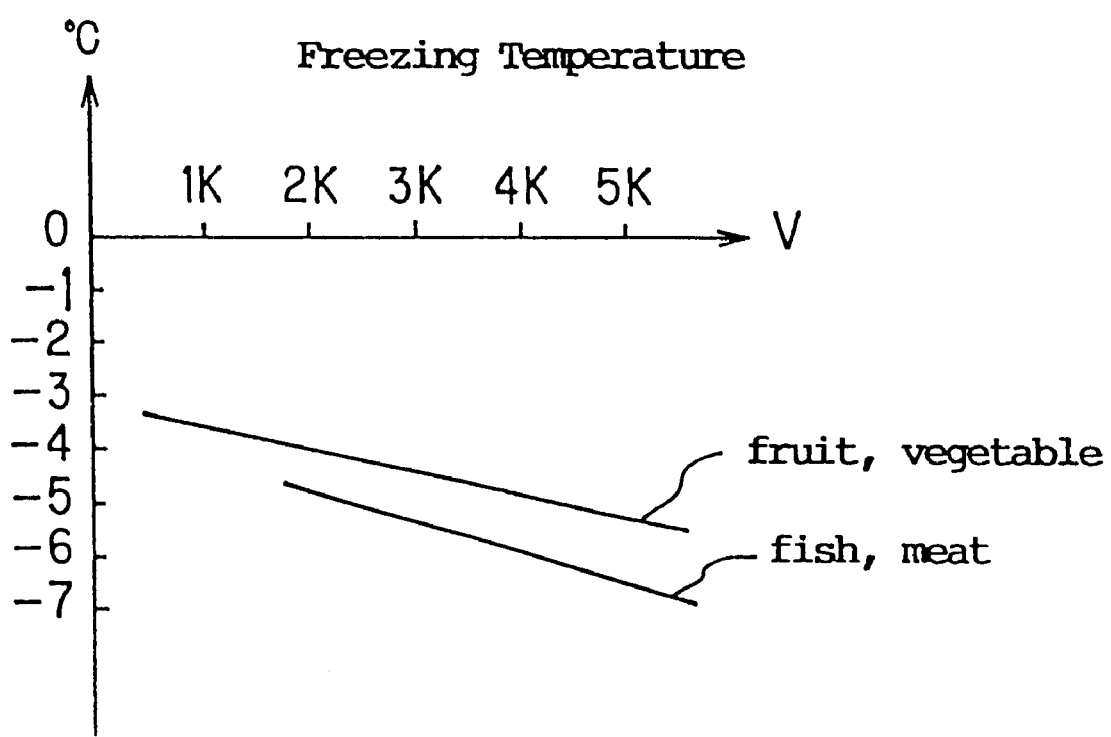
FIG. 7 is a graph showing the relationship between impressed voltage and freezing temperature of fruits, vegetables, fishes and meat.

FIGS. 5 and 6 is a graph showing characteristics of the voltage and the average temperature shown in Tables 7 and 8. It is understood that fishes and shellfishes, having a relatively high freezing temperature, such as scallops, shrimps, etc., can be thawed in the range of the average temperature of −2–+1° C. and at the voltage of approximately 2000V without stains, discoloration and drip in comparison with a conventional refrigerator. Cuttle fish (squid) belong to this sort of fish.

According to the above consideration, it is understood that the relationship of Table 9 mentioned below is required for the thawing of scallops, shrimps, etc.

TABLE 9

| Temperature | Voltage |
| --- | --- |
| −2° C. | 2000V |
| −1° C. | 2000V |
| ±0° C. | 2000V |
| +1° C. | 2000V |

However, if the impressed voltage is determined at a voltage of 1000V–4000V with the center voltage of approximately 2000V, a similar result can be obtained. The condition in this case is the same as that of freshness keeping mentioned after. In general, it is known that, with respect to fishes and shellfishes, the period of thawing is decreased when the voltage is increased, and is increased when the voltage is decreased. A voltage of 3000–5000V is suitable for tuna.

According to the above results, it is understood that if frozen fishes and shellfishes are put on the metal shelf 7 of the apparatus shown in FIG. 1 to thaw them under the above condition, they can be thawed with a good quality and a little bit of drip.

Further, it is understood that fishes and shellfishes can be maintained fresh, at the range of the average temperature of −2–+1° C. and at the voltage of approximately 2000V for a long time in comparison with a conventional refrigeration.

According to the above consideration, it is understood that the relationship of Table 10 mentioned below is required for freshness keeping of fishes and shellfishes.

TABLE 10

| Temperature | Voltage |
| --- | --- |
| −2° C. | 2000V |
| −1° C. | 2000V |
| ±0° C. | 2000V |
| +1° C. | 2000V |

According to the above results, it is understood that if thawed fishes and shellfishes are put on the metal shelf 7 of the apparatus shown in FIG. 1 to be maintained fresh under the above condition, a good quality can be maintained without discoloration for a long time in comparison with a conventional apparatus.

In the above measuring test, only alternating voltage is impressed thereon, and, however, direct voltage may be impressed thereon at the above values of voltage to obtain the same results.

Further, in the measuring test, an electrostatic measuring device is used for measuring voltage impressed on the metal shelf. However, when the door is opened in actual thawing, freshness keeping and maturing operation, a switch is turned off to cut a supply of the voltage to the metal shelf. Therefore, the correspondence between the output voltage of a high voltage generating device and the electrostatic measuring device is measured to determine a predetermined voltage on the metal shelf based on a voltmeter for the output voltage of the high voltage generating device. In addition, the suitable range of temperature is −2° C.–+1° C., and however, data close to the measured result according to this invention were obtained even in the case of temperature of −3° C.

In general, with respect to the freezing temperature of food, the freezing temperature of fruits and vegetables is higher than that of fishes and meat. The freezing temperature of these food depends on the impressed voltage in an electrostatic field. When the voltage becomes high, the freezing temperature becomes low. It also depends on the amount of fat included in food. For example, the freezing temperature of shrimps, crabs and cuttle fishes, etc. having a small amount of fat is higher than that of tuna, sword fish, etc. having a relatively large amount of fat. Accordingly, since the freezing temperature of an object to be treated is established on the basis of the kind of the object and the impressed voltage, the freezing temperature of the object to be treated is obtained on the basis of the relationship therebetween. If the object to be treated is stored at a temperature between 0° C. and the freezing temperature, preferably at a temperature close to the freezing temperature, the object can be stored for a longer period of time. That is, in the electrostatic field, the freezing temperature of food is lowered and the food does not freeze in the electrostatic field at the freezing temperature thereof in a conventional refrigerator. Therefore, it is easy to determine the temperature in a refrigerator.

With respect to the impressed voltage for keeping freshness, generally the voltage of 500V–1000V is suitable for vegetables, especially, leaf type vegetables as well as cakes and confectionery. The voltage of 1.5 kV–2 kV is suitable for beef and pork among meat, Further, the voltage of 500V–1500V is suitable for fruits.

Figure 8:
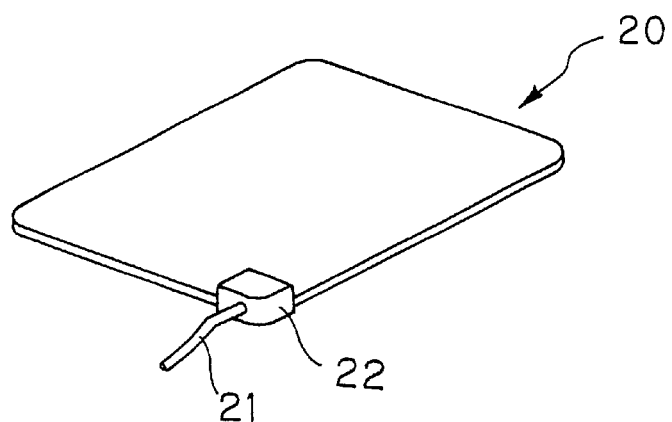
FIG. 8 shows a perspective view of an electrode plate.

In FIG. 1, the metal shelf 7 is set in an insulated state in the refrigerator 1, and, an insulated electrode 20 may be set on the shelves of the refrigerator as shown in FIG. 8.

Figure 9:
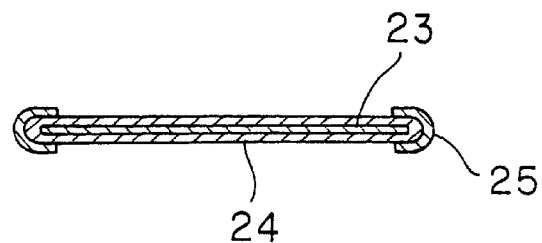
FIG. 9 shows a cross sectional view of the electrode plate.

In FIGS. 8 and 9, the insulated electrode 20 according to this invention is in the shape of a plate, and has a connecting portion 22 to connect a lead wire 21 to the electrode at its one corner. The connecting portion 22 is for connecting the lead wire 21 to a metal plate 23 in a sealed manner. Regarding the metal plate 23, any kind of metal can be used if it is a conductive body. For example, a copper plate, a stainless plate or a titanium plate may be used. The metal plate 23 is completely insulated with an insulating coat 24 which is, e.g., formed in such a manner that the metal plate 23 is dipped into a vinylchloride bath. Instead, the front and back surfaces of the metal plate 23 are covered with insulating plates such as ABS resin with the circumferential portions of the insulating plates being protruded from the edge of the metal plate 23 so that the protruded portions of the insulating plates are heat-sealed. Further, since there is a case that the coating is damaged by the collision of the edge portion of the metal plate 23 with something, it is desired to provide an edge protection member 25.

In this manner, even if the metal plate (conductive body) is covered with the insulating coating, negative electrons go outward to charge environmental air with electrocity when a high voltage is impressed thereon. When food is put thereon, the food is charged with electrocity through the insulating coating to form a part of the electrode plate. Thereby, the food functions as the electrode plate.

Figure 10:
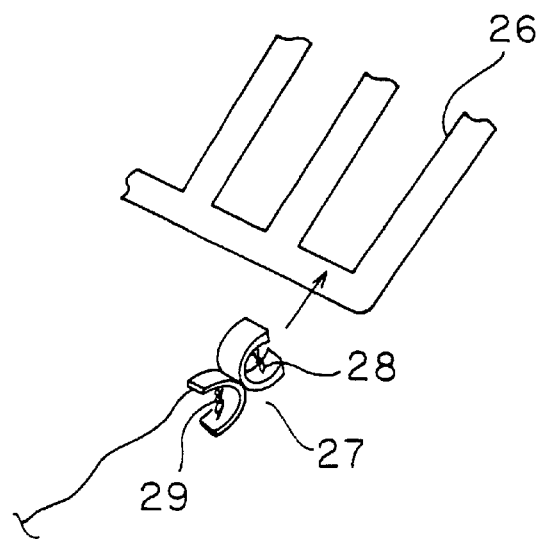
FIG. 10 is a perspective view of a connecting member for connecting the high voltage generating device to the shelf of a refrigerator.

In addition, as shown in FIG. 10, a refrigerator has, therein, a shelf 26 which is so formed that metal bars are assembled in the shape of lattice and to which a dipping treatment is performed.

In case that a voltage is impressed on the shelf 26, the insulated connecting member 27 may be provided on a shelf bar in such a manner that the member bites the shelf bar. In this case, the connecting member is formed as a clothespin, and has, at its biting portion, teeth 28 which pass through the outer coating of the shelf bar to contact an inner metal bar directly. In the opposite side to the biting portion, a compression spring 29 is provided so as to prevent the biting portion from becoming loose.

Figure 11:
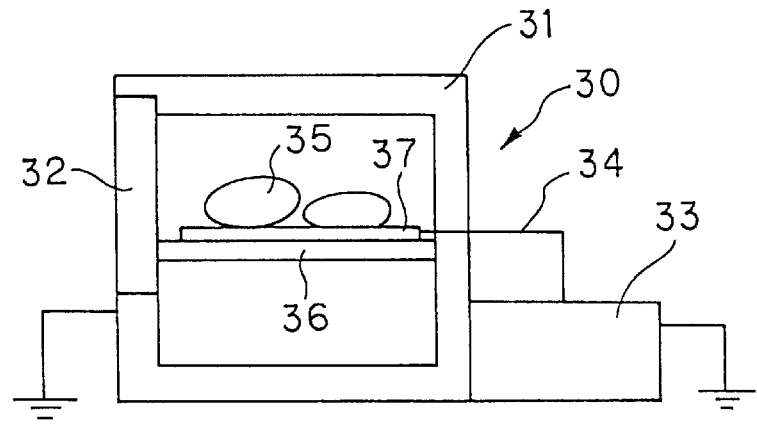
FIG. 11 is a schematic view of a refrigerator of this invention.
Figure 12:
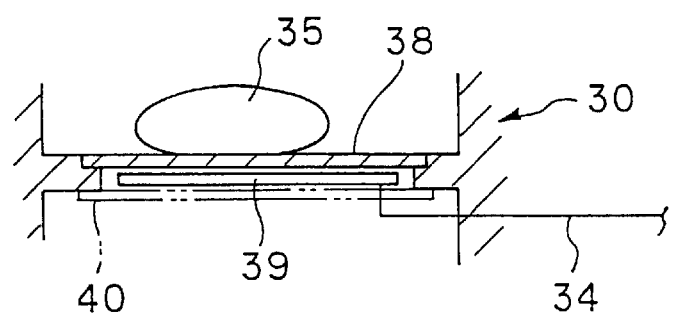
FIG. 12 is a sectional view showing a setting state of an electrode.

FIG. 11 shows another embodiment of a refrigerator 30 in which a bare metal electrode 37 is put on a shelf 36 made of an insulating member in an insulating manner. An object to be treated is put on the electrode 37. In this case, the electrode 37 may be supported in any way, if it is supported in an insulating manner. In order to support the electrode in the refrigerator 30 in an insulating manner, an electrode 39 may be provided, as shown in FIG. 12, on the back side of a shelf 38 made of an insulating member to expose the backside of the electrode 39 to the air.

Instead, an electrode 39 may be covered with an insulating plate 40. Materials such as air, plastic plates, Teflon plates, etc., are insulating materials from the view point of electrocity, and they can make an electrostatic field in an accommodating space.

Figure 13:
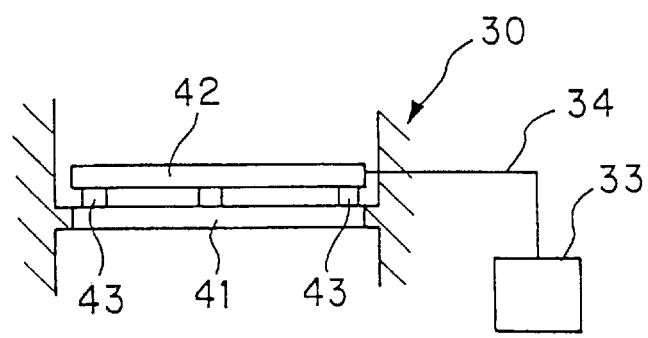
FIG. 13 is a sectional view showing a setting state of an electrode.
Figure 14:
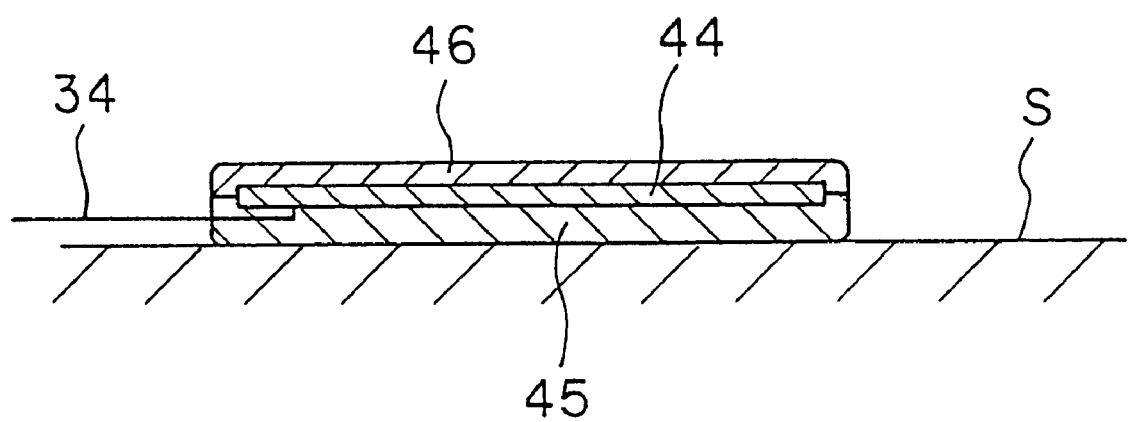
FIG. 14 is a sectional view showing a setting state of an electrode.

A conductive electrode 42 may be set on a conductive shelf 41 via an insulating member 41 made of an insulator, ceramic, Teflon, plastic, etc., as shown in FIG. 13. Further, as shown in FIG. 14, the main body 44 of a conductive electrode may be held between insulating members. That is, in order to make an electrostatic field, the main body 44 of the electrode has at its lower side, an insulating member 45 for electrically insulating it from a set member such as the shelf of a refrigerator and the like, and, at its upper side, an insulating contact protection member 46 to prevent an operator from receiving an electrical shock. The two insulating members 44, 45 are so formed as to attach integrally and uniformly vinyl chloride and the like thereon through, e.g., a dipping operation. Further, Teflon or ceramic may be attached thereon by spraying or banking finish operation.

Figure 15:
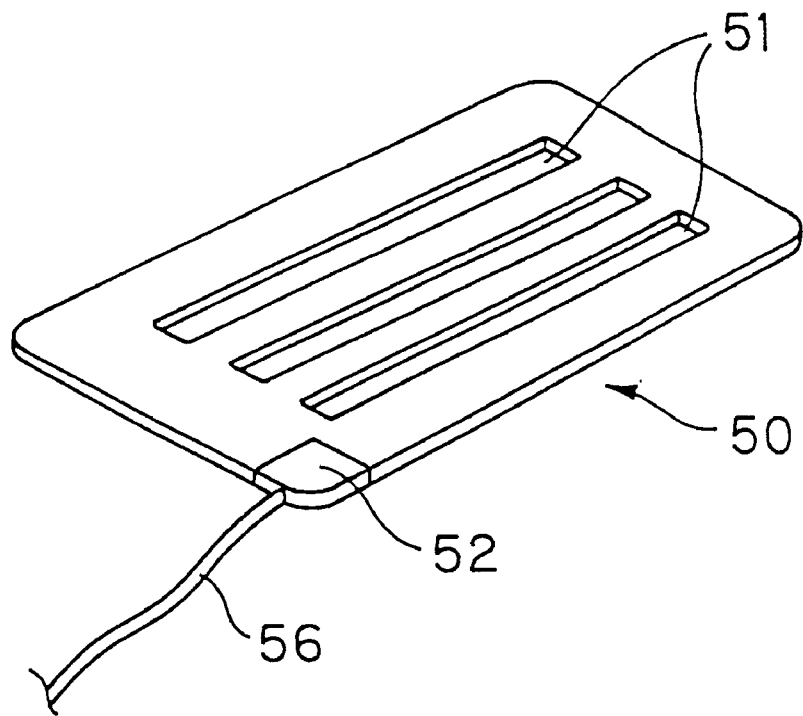
FIG. 15 is a perspective view of an insulating electrode.
Figure 16:
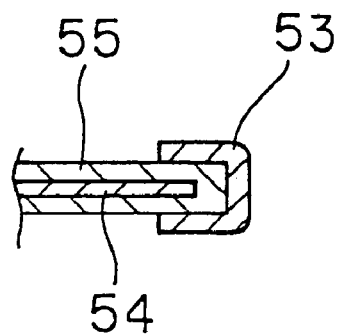
FIG. 16 shows a cross sectional view of the end portion of the insulating electrode.

FIGS. 15 and 16 show an electrode 50 formed by dipping operation, which has a predetermined number of slits 31, 31, - - - 31. The electrode 50 comprises, as shown in FIG. 16, a main body 54 made of a metal plate with slits and an insulating material 55 made of vinylchloride, etc. attached on circumferential surface of the main body 54. If necessary, the edge portion of the electrode 50 may be protected with a protection frame 53. The formation of the slit 51 contributes to form a uniform coating layer. At the corner of the electrode 50 is provided a connecting portion to which a high voltage cable 56 is connected.

Figure 17:
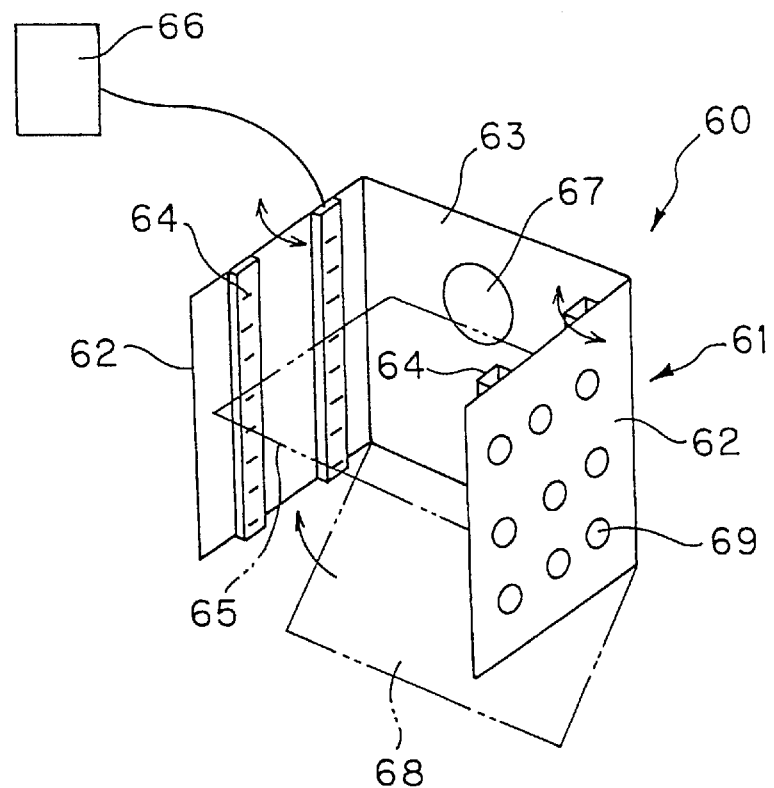
FIG. 17 shows a perspective view of an electrode unit set in a refrigerator.
Figure 18:
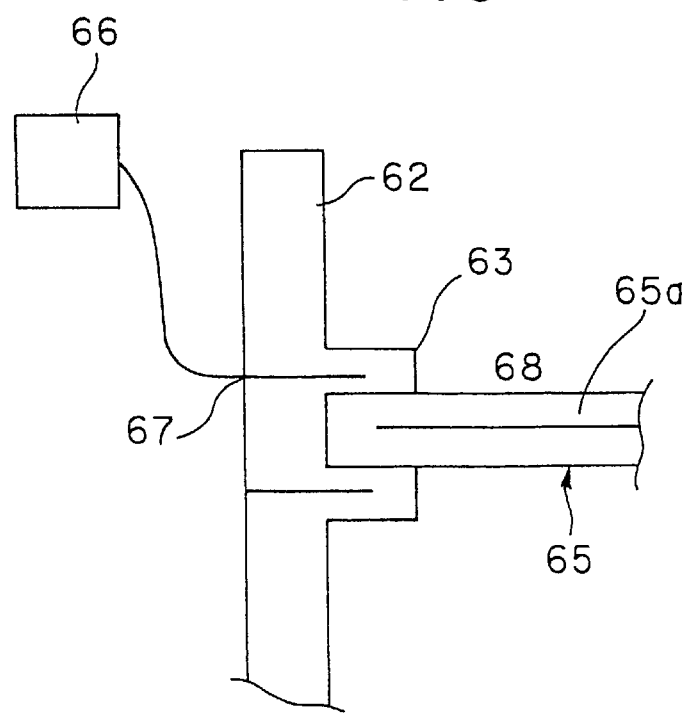
FIG. 18 is an explanatory view showing a state of joining an electrode plate with a slit portion.
Figure 19:
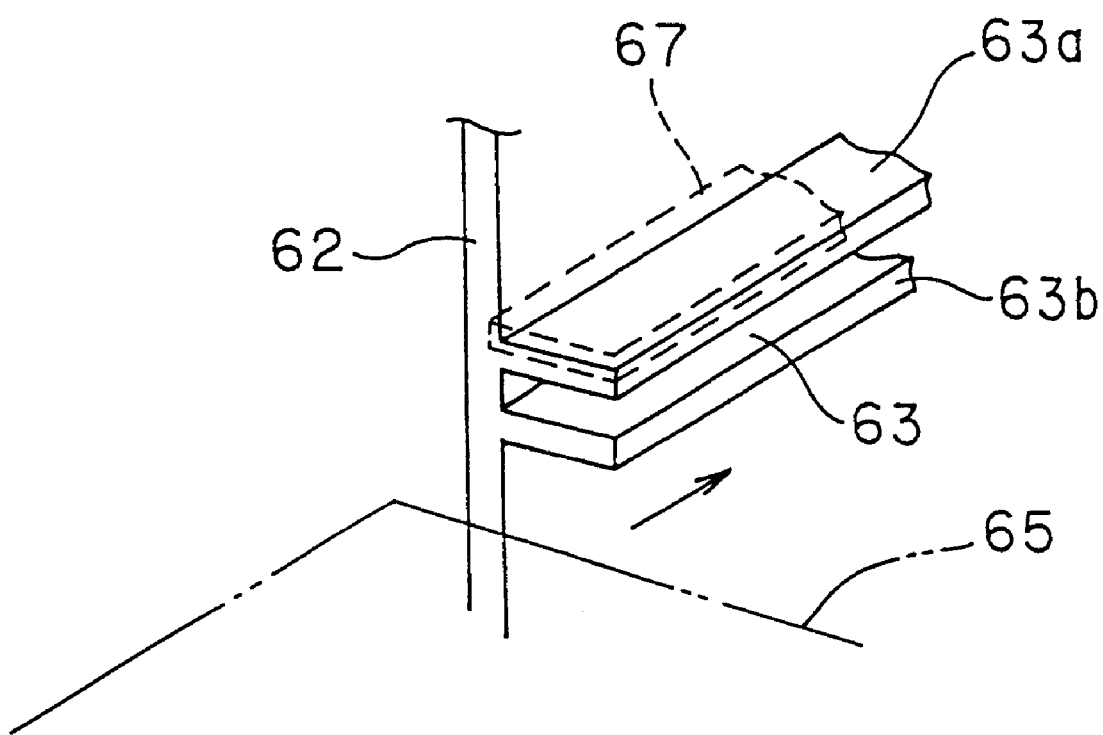
FIG. 19 is a perspective view of the slit portion for receiving the electrode plate in the electrode unit.

FIG. 17 shows an electrode unit 60 for changing easily conventional refrigerator to an electrostatic field refrigerator, and the unit 60 has a frame body 61 made of an insulating plastic plate. The frame body 61 is inserted, as it is, in the space of the conventional refrigerator. The frame body p1 has left and right side plates 62, 62 which are openable to a center plate 63, and on the inner faces of the si de plates are provided supporting bars 64, 64 - - - 64, at predetermined positions of which shelf plates 65 are detachably supported. One of the supporting bars 64 is connected to a high voltage generating device 66, and a high voltage is impressed on the shelf plates 65 through the supporting bars 64. The center plate 63 and the sid e plates 62 have openings 67, 69 not so as to obstruct the circulation of air in the refrigerator. If necessary, a bottom plate 68 is provided, and a high voltage may be impressed on the insulated bottom plate 68. The supporting bars 64 and the shelf plates 65 may be covered with an insulating coating, and voltage is induced on the shelf plates 65 even through the insulating coating in this manner. As shown in FIGS. 18 and 19, slit portions 63 may be provided on the side plates 62 in order to support slidably the shelf plates 65, and metal terminal plates 67 may be buried in the upper and lower walls of each slit portion 63. Further, if the metal electrode plate 65a is buried in the shelf plate 65 covered with an insulating coating and the metal terminal plate 67 is opposed to the end portion of the shelf plate 65, a high voltage is impressed on the shelf plate 65. In this manner, if the terminal plate 67 connected to a high voltage generating device is opposed to the metal electrode 65a of the shelf plate 65 via an insulating coating, a voltage is induced indirectly on the metal electrode 65a.

An indirect induction of voltage will now be explained in more detail.

Figure 20:
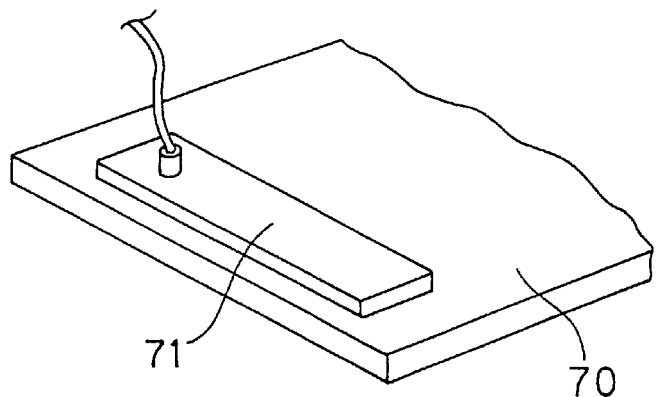
FIG. 20 is a perspective view showing a state in which a voltage is impressed indirectly on the electrode plate.

In FIG. 20, a terminal plate 71 is put on an electrode plate 70, and the terminal plate 71 is connected to a high voltage generating device. The electrode 70 is so formed that a metal plate is covered with an insulating body 75. On the contrary, the terminal plate 71 is also so formed that a metal plate 77 is covered with an insulating body 76. In this manner, even if the metal plate 72 as the main body of the conductive electrode does not contact directly the conductive body (the metal plate 77) of the terminal plate 71 (if an insulating body exists therebetween), a voltage is impressed on the electrode 70. Either the electrode 70 or the terminal plate 71 may have an exposed conductive body without an insulating body.

Figure 21:
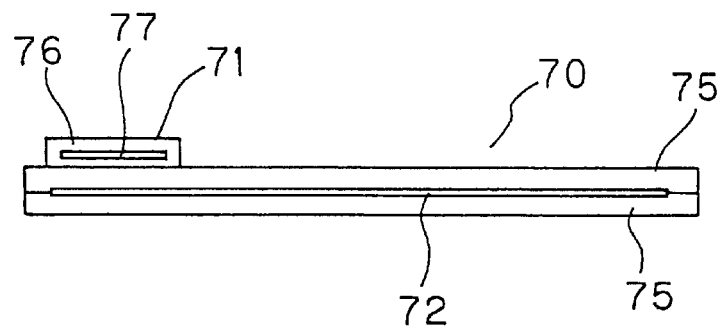
FIG. 21 is a sectional view taken along a line XXI—XXI in FIG. 20.
Figure 22:
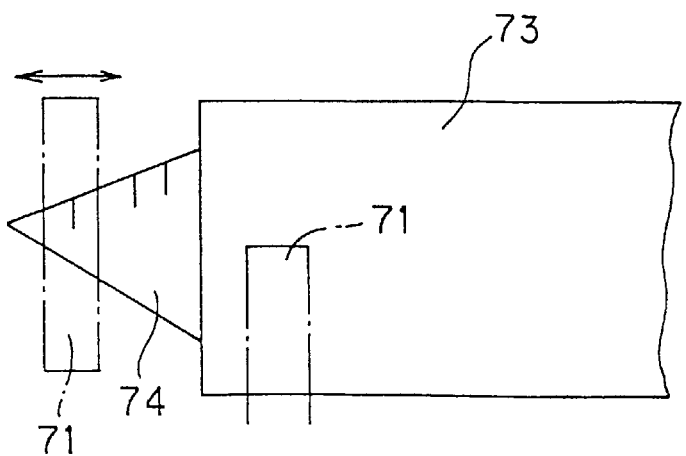
FIG. 22 is an explanatory view showing a state in which an impressed voltage is changeable.
Figure 23:
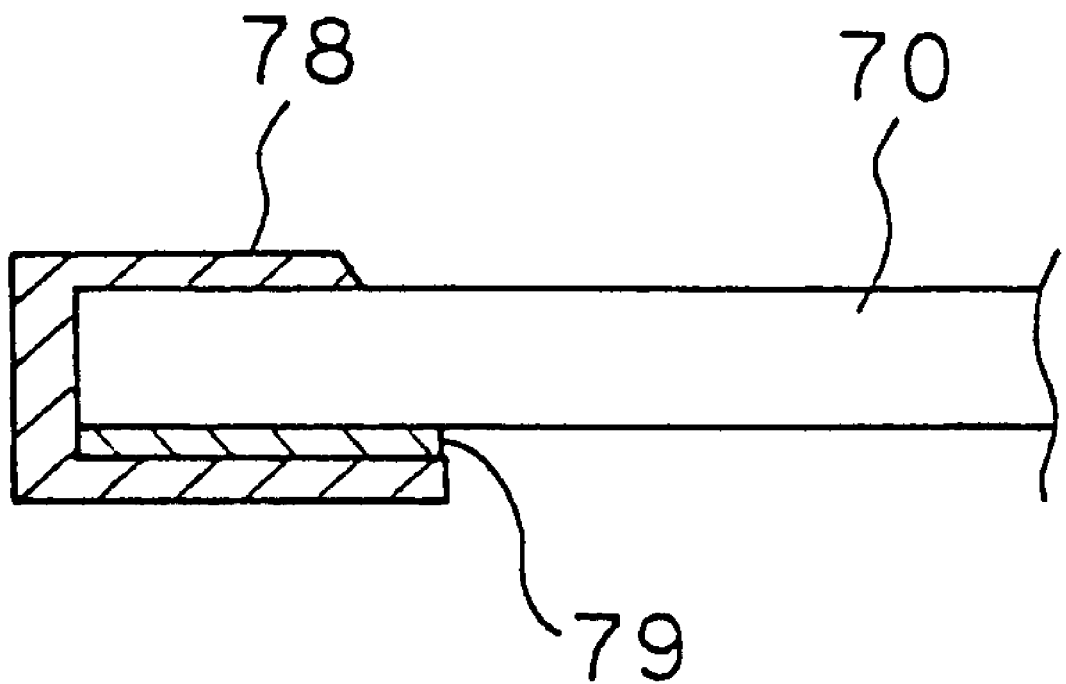
FIG. 23 is an explanatory view showing a state of indirect impression.

The electrode 70 has, as shown in FIG. 21, therein a main body 72 of the electrode, made of conductive film, aluminum foil and other conductive bodies (fine wire, printing pattern) in an insulating body 75 made of resin, glass, silicon, wood, paper, etc. Voltage impressed on the electrode 70 is proportioned to the contacting area between the electrode 70 and the terminal plate 71, and, therefore, as shown in FIG. 22, if a triangular voltage adjusting plate 74 is attached to the electrode 73 and the terminal plate 71 is moved to the left and right to change the contact area between the voltage adjusting plate 74 and the terminal plate 2, a voltage impressed on the electrode 73 can be adjusted. The electrode 73 and the voltage adjusting plate 74 are so formed that, e.g., a conductive film is laminated by an insulating plate such as vinylchloride and the like. The direct contacting area between the electrode and the terminal plate 71 may be changed. Further, as shown in FIG. 23, a frame 78 may be provided on the end portion of the electrode 70 so as to hold a bare conductive body 79 on the electrode 70 therewith.

Figure 24:
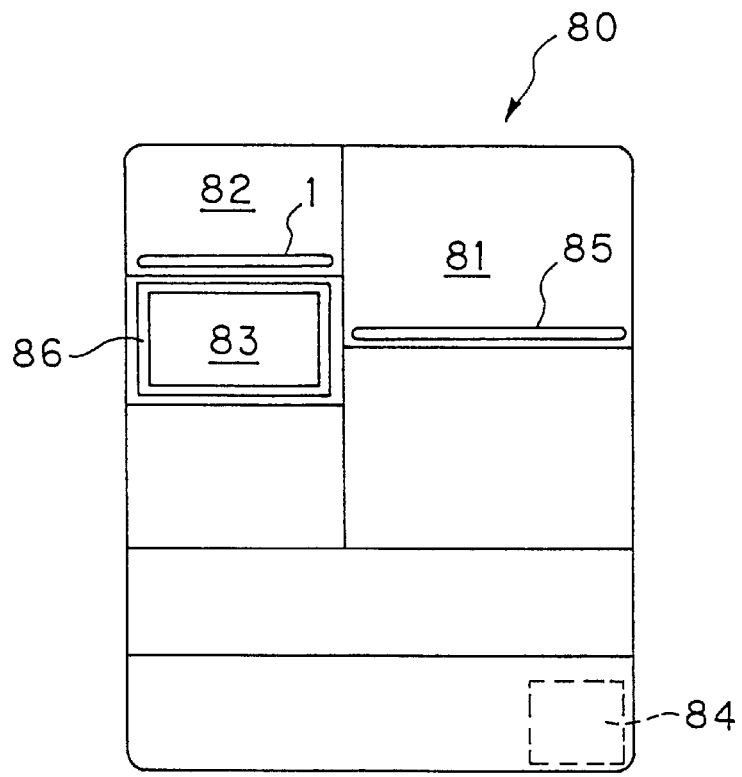
FIG. 24 is a schematic structural view of a refrigerator.

An insulated electrode of this invention can be adapted for refrigerators 80 for business and domestic use shown in FIG. 24, and electrode plates 85, 85 are put on the floors of refrigeration rooms arbitrarily selected. Further, when food is thawed in an electrostatic field, it can be thawed at −2−−3° C. without drip, and, therefore, a thawing room 83 may be provided in the refrigerator 80. The thawing room 83 may have a planar electrode 85 mentioned above on its floor, and, however, a box-like electrode 86 in which an insulating plate is formed in a box with its entrance being opened. These electrode plate 85 and the box-like electrode 86 are connected to a high voltage generating device 84 provided at the lower portion of the refrigerator, respectively. The thawing room 83 can also function as a freezing room, and, e.g., when ice is made therein, the crystal of the ice becomes small, so that the ice does not melt easily. Namely, this invention can be adapted for a special apparatus for freezing and thawing.

Figure 25:
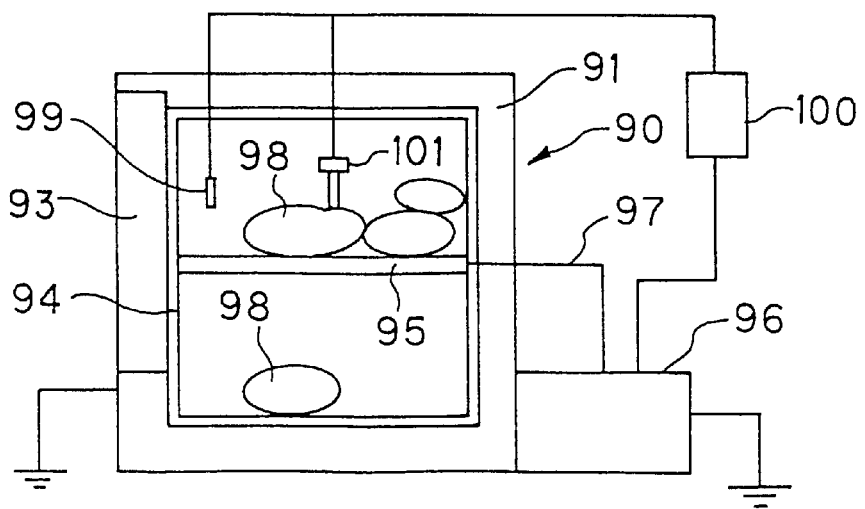
FIG. 25 is a schematic structural view of a refrigerator.

Further, a refrigerator may be formed in the following manner. In FIG. 25, a refrigerator 90 has a casing 91 with a door 93. The inner wall of the casing 91 is coated with an insulating plate 94 and a metal (conductive) shelf 95 is made of, e.g., stainless and the like. The shelf 95 is connected to a high voltage generating device 96 through a high voltage cable 97. Further, a shelf 95 having also a function as an electrode 95 is held, in an insulating manner, by an insulating plate 94 of the inner wall of the casing and air as an insulating gas in the casing. A safety switch 13 (FIG. 2) is provided between the door 93 and the casing, and a high voltage (500–5000V) is impressed on the shelf 95. In this manner, objects to be treated, such as meat, vegetable and fish are put and treated in an electrostatic field. Since the shelf 95 as an electrode is held in an insulating state from the casing as an outer environment in air as an insulating gas, the accommodating space in the casing forms an electrostatic field atmosphere. The objects 98 to be treated, on the shelf 95 must be also held, as a whole, in an insulating state. For example, if the objects contact the inner wall of the casing which is not insulated from an outer environment, electrons move into the casing which is grounded, so that the objects are not charged with electrocity. Therefore, it is necessary that the insulating plate 94 must be attached to a part where the objects may contact the inner wall of the casing. However, in case that the inner wall of the casing itself is made of insulating material, the insulating plate 94 is not necessary.

According to the kind of vegetable and meat, the voltage for freshness-keeping and thawing with respect to the temperature in the refrigerator must be changed. Therefore, a temperature sensor 99 is provided in the refrigerator 1, and the detected signals by the temperature sensor 99 are input to a driving circuit 100 which drives an adjusting knob 15a on the secondary side of the voltage adjusting transformer 15 to change the impressed voltage (FIG. 2).

Further, in case that meat and fish are thawed, a high voltage is necessary when they are thawed in the state of a constant temperature, and, however, in the case of freshness-keeping after thawing, the impressed voltage upon thawing promotes maturing too much. This is no good for freshness-keeping. Accordingly, it is necessary to measure hardness of meat and fish to detect the finish of thawing, so that a proper voltage for freshness-keeping is determined. For example, it is found that an impressed voltage of 5000V is preferable, at approximately −2° C., for beef upon thawing, and however, a voltage of 1500–2000V is suitable for freshness-keeping and maturing of beef. Therefore, a scale 101 of hardness is set in a manner to make a probe contact the surface of meat to measure the repulsive force at that time, so that an impressed voltage can be adjusted according to the hardness signals.

Figure 26:
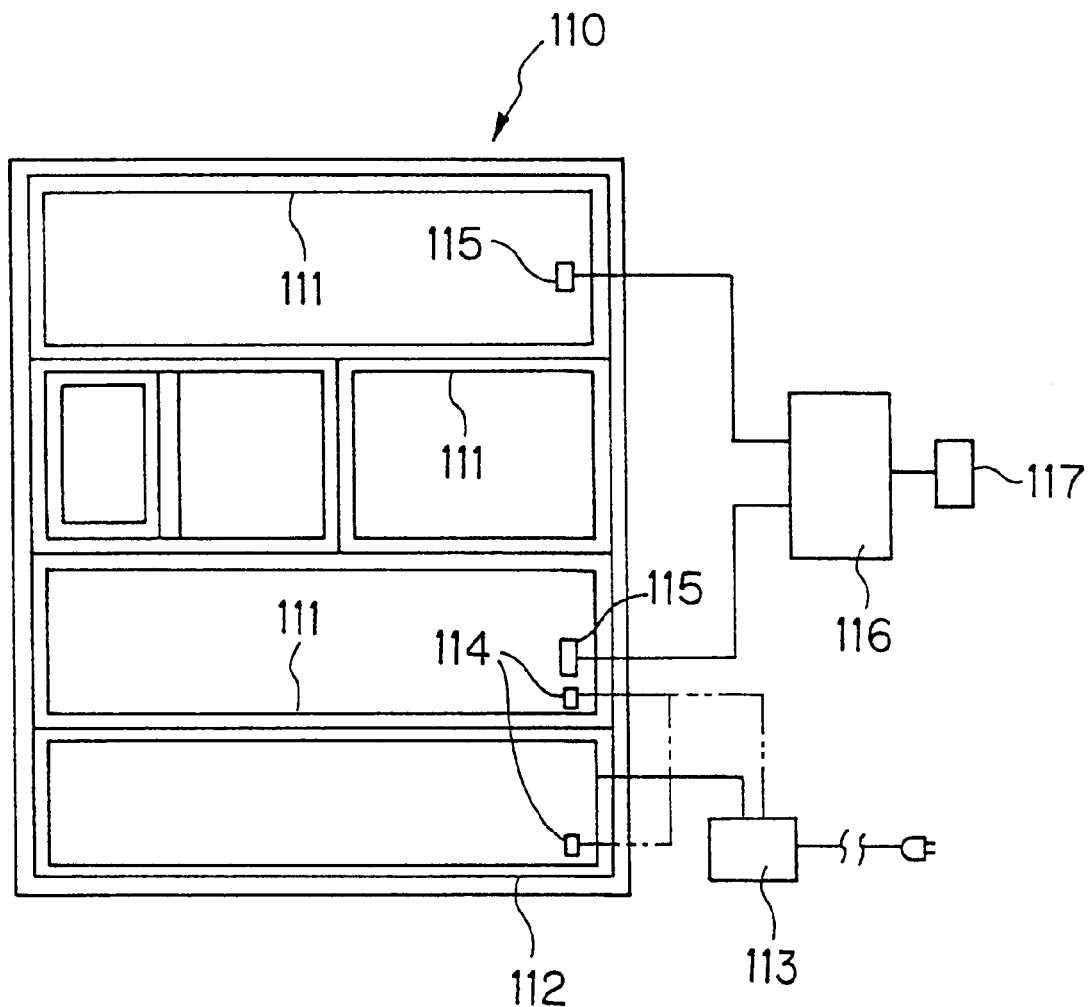
FIG. 26 is a schematic structural view of a refrigerator.

FIG. 26 is a refrigerator 101 for domestic or business use, and the refrigerator has an inner wall therein made of an insulating body 111 such as plastic and the like. An electrode body 112 made of conductive body, e.g., metal is buried in the insulating body 111 or attached to the backside thereof, and the electrode body 112 is connected to a high voltage generating device. Each room of the refrigerator has a sensor for cutting impression of voltage when the door is opened. In order to charge the interior of a domestic refrigerator with electricity, if a conductive thin film made of a plastic plate is attached to the backside of the inner wall thereof so that a voltage is impressed on the thin film, there is no exposed part on which a high voltage is impressed to ensure safety. Further, the impressed voltage of a vegetable room is low while that of a thawing room is high. Therefore, impressed voltage of each room therein must be changed according to the object of use. Even if only one high voltage generating device is provided, the impressed voltage can be changed so as to change the area of the conductive thin film which is attached thereto or buried therein. Each room has a sensor 115 for detecting the amount of an electric line of force to sense an electrostatic atmosphere, and, when the sensor 115 detects that the amount of an electric power is lowered more than a predetermined value, the sensor 115 operates a refrigeration system 116 through a controller 117 to keep the interior of the refrigerator at a plus temperature. That is, food is stored without freezing at a minus temperature in an electrostatic field. In this case, if the electrostatic field is broken, the food is frozen. Therefore, at this time, the refrigeration system is operated. Thus, such a control is necessary.

Figure 27:
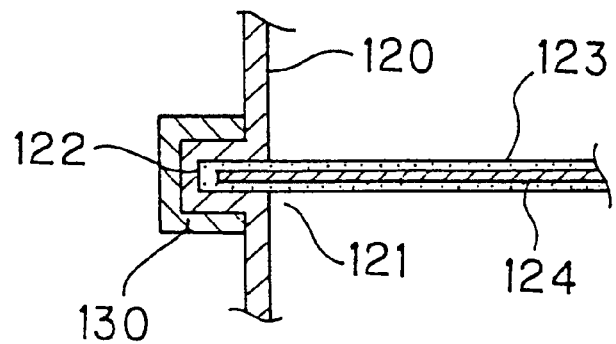
FIG. 27 is an explanatory view showing a state in which an electrode shelf is set on the wall of the refrigerator.
Figure 28:
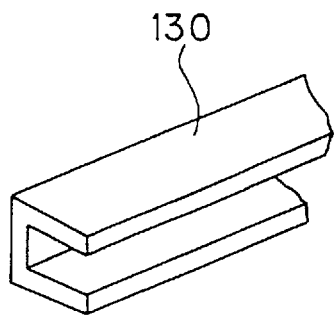
FIG. 28 shows a perspective view of a terminal plate provided on the wall of the refrigerator.
Figure 29:
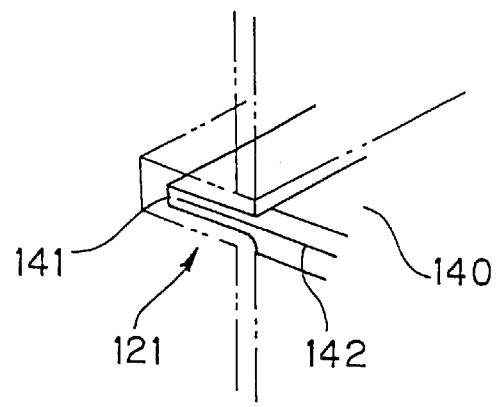
FIG. 29 is a perspective view of a shelf receiving portion of the refrigerator.

The wall 120 of a refrigerator has, as shown in FIG. 27, a shelf receiving portion 121 which projects to the back side of a room, and the shelf receiving portion 121 has a slit 122 in which the end portion of a shelf plate 123 is slidably accommodated. The shelf plate 123 has an electrode plate 124 which is covered with an insulating body 123 so that an operator does not receive an electric shock even when the sensor 114 does not work. The wall 120 comprises an insulating plate, and the projected portion of the shelf receiving portion 121 is engaged with a terminal plate 130 in the shape of layed U as shown in FIG. 28. The terminal plate 130 is connected to a high voltage generation device 130. Further, a voltage is induced by indirect contact between the terminal plate 130 and the electrode plate 124, and, in case that a voltage is not impressed enough on the electrode plate 124, the end portion of the shelf plate 142 is formed thin to be inserted into the shelf receiving portion 121, as shown in FIG. 29, so that an enough voltage is induced through the terminal plate 130. Further, the terminal plate 130 has, at its inner face, projections which correspond to a position of the interior of the shelf receiving portion, where fingers of an operator do not reach, and an insulating material is removed from a slit inserting portion of the shelf plate so that the electrode plate 124 contacts directly the terminal plate 130. Thus, an enough voltage is impressed thereon.

Figure 30:
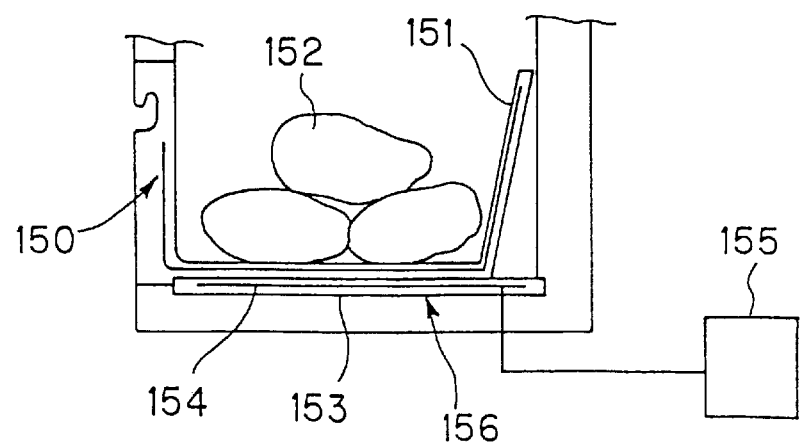
FIG. 30 is a side view of a vegetable room of a home-refrigerator.

FIG. 30 shows a vegetable room 150 of a refrigerator, which is detachably accommodated therein. An electrode plate 151 is buried into the circumferential wall of the vegetable room 150, and the vegetable room 150 has, at its bottom, an electrode 156 which is so formed that an electrode plate 154 is covered with an insulating coating 153. The electrode plate 154 is connected to a high voltage generating device 155. Further, in case that a voltage is impressed enough on the electrode plate 156, the vegetable room 152 is charged with electricity without the electrode plate 151 in the circumferential wall of the vegetable room.

In a domestic refrigerator, when a storing temperature is determined low, a necessary amount of electric power is increased. However, in an electrostatic field, even if the temperature in the refrigerator is determined at a temperature higher by 4–5° C. than a normal refrigerator, a similar result can be obtained. In addition, a flowing electric current is less than 2 mA for making an electrostatic field in a refrigerator, and, therefore, an electric power consumption is approximately 2W. It is ensured that even a low voltage (10V–100V) brings an effective freshness-keeping. It is not necessary that the temperature in a refrigerator is determined at a minus temperature except thawing, and a mode in which the temperature in the refrigerator is determined at +5–+6° C. can be adapted in the case of inexpensive food. Accordingly, as shown in FIG. 26, if a change-over switch 117 is provided in a refrigeration system 116, and a switching operation is performed between a freshness-keeping mode in which a cooling temperature is kept low and a saving mode in which a cooling temperature is kept high, energy is saved.

Figure 31:
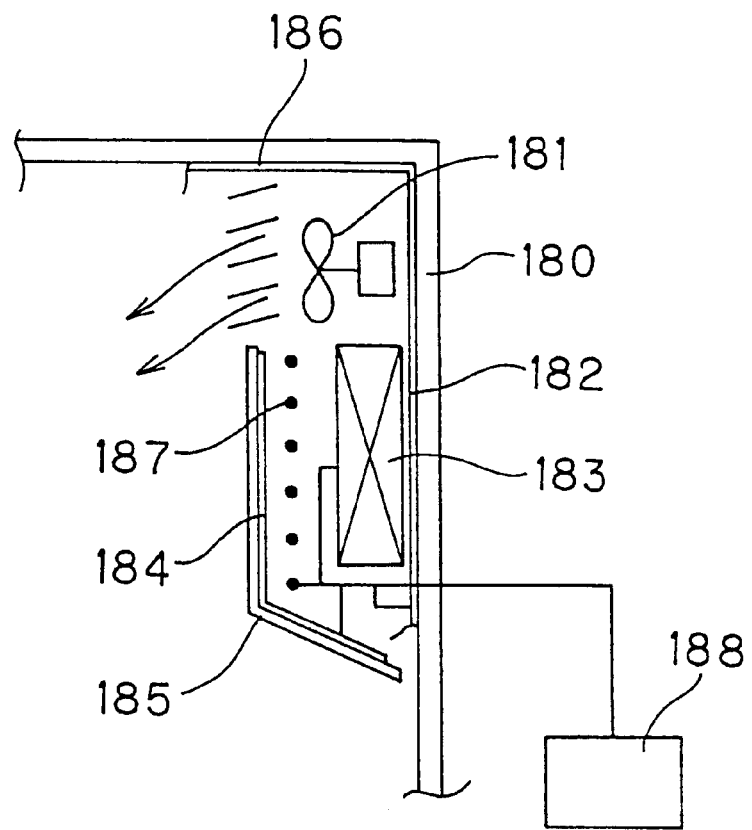
FIG. 31 is a structural view of a space for accommodating the evaporator of a refrigerator.
Figure 32:
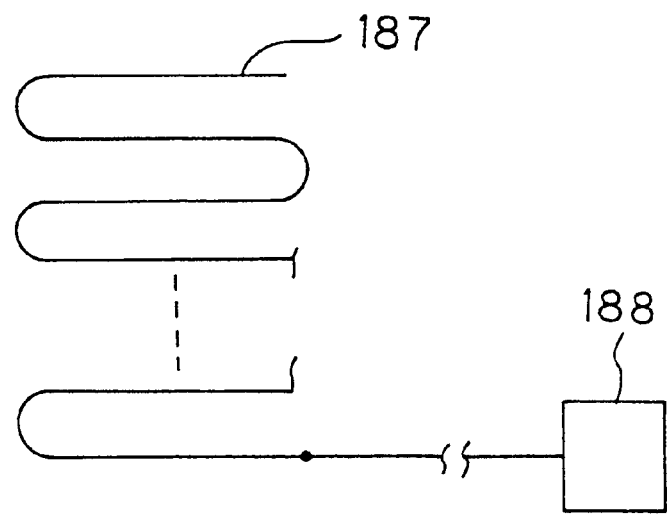
FIG. 32 is a front view of a wire-electrode provided in a space for accommodating the evaporator shown in FIG. 31.

Further, in an electrostatic field atmosphere, since dew is not condensed at a high temperature, as shown in FIGS. 31 and 32, it is preferable that a high voltage (1500–2000V) is directly impressed on an evaporator 183 in a refrigerator or an electrostatic field is formed in a space in which the evaporator 183 is accommodated. That is, the evaporator 183 is provided at an upper and back portion in the refrigerator, and a fan 181 is provided above the evaporator 183 so that cooling air is circulated in the refrigerator. A dash-board 185 is provided in front of the evaporator 183. The inner wall of the refrigerator is made of an insulating material such as plastic and the like, and a conductive thin film 182 such as alminium foil, etc., is attached to the inner wall thereof. Further, a conductive thin film 184 is also attached to the side face of the dash-board 185 opposed to that of the evaporator. There may be provided a conductive wire-like electrode 187, as shown in FIG. 32, between the dash-board 185 and the evaporator 183. Further, a plate-like electrode may be used. These thin film and the electrode 187 are properly provided as occasion demands, and a high voltage is impressed on these thin film, the electrode and the evaporator 183 by a high voltage generating device 188.

Figure 33:
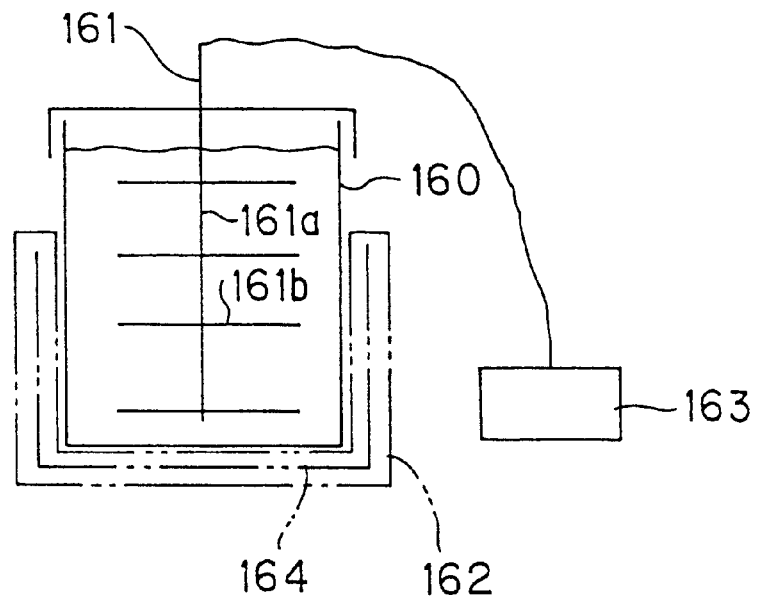
FIG. 33 is a structural view of an oil reduction device.

It is found that edible oil is reduced in an electrostatic field, and, for example, as shown in FIG. 33, edible oil oxydized after cooking "tempura" (Japanese deep-fat fried food) is stored in a tank 160, and an insulated electrode 161 as an oil reduction device is put into the oil to reduce the oil for two or three days to recover the oil to a good condition. The insulated electrode 161 has a bar-like core 161a on which circular insulated electrode plates 161b - - - 161b are fixed at a predetermined space in the upper and lower direction. However, in the case of a small amount of oil, a simple bar-like core 161a may be used. Further, the core 161a is connected to a high voltage generating device 163. The insulated electrode may have any shape if it can make an electrostatic field over the whole of the oil. Instead of the insulated electrode 161, an oil tank 160 may be put in an electrode box 162 in which a metal plate 164 connected to a high voltage generating device is buried, so that the oil is put in an electrostatic field. The electrostatic field prevents the oxidation of oil and, therefore, if oil is put in an electrostatic field, the oil can be stored for a long time without oxidation.

Next, a way in which an electrostatic field is given to a fryer for cooking "tempura" and fry will be explained.

Figure 34:
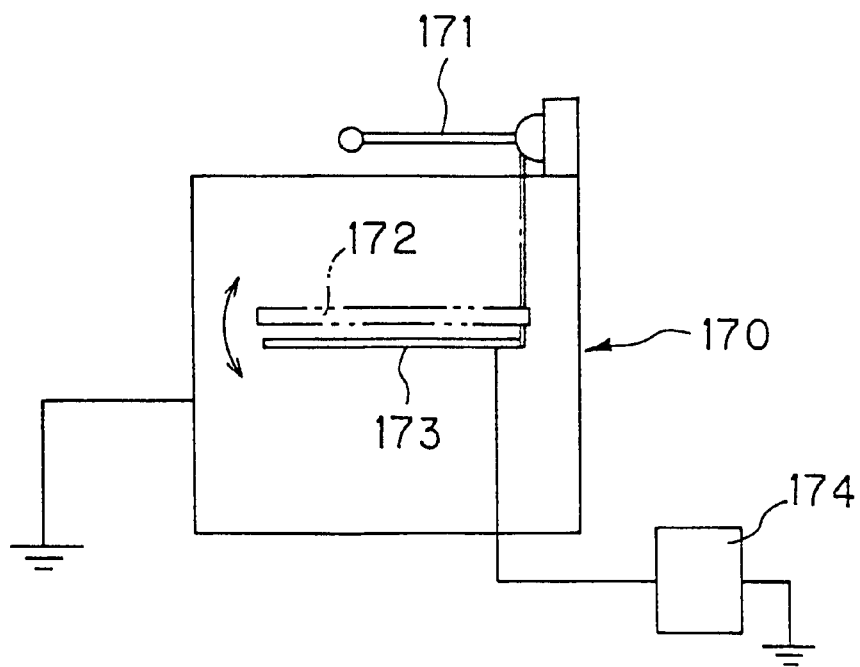
FIG. 34 is an explanatory view showing a state in which an electrode is set in an electric fryer.

FIG. 34 shows an electric fryer 170 in which a heater 172 is inserted into an oil tank and taken out thereof by rotation of a handle 171. Near the heater 172 is provided a plurality of electrode bars 173 which are connected to a high voltage generating device 174. In this manner, an electrostatic field can be made in oil in the oil tank. The casing of the oil tank is grounded, and, in case that a voltage of 1500V–2000V is impressed on the electrode bars 173, even if an operator touches the casing, he does not receive an electric shock. In case that a voltage of 100V–1000V is impressed on the electrode bar, earth is not necessary for the casing. Even a voltage of 500V–600V can prolong the period of use two times. In case that the casing is not grounded, if a voltage impressed by a high voltage generating device 174 is lower than that in case that the casing is grounded, the same level of impression voltage on the oil can be obtained. This is because the amount of electric current dropping through the oil becomes small in the case of no earth for the casing.

Figure 35:
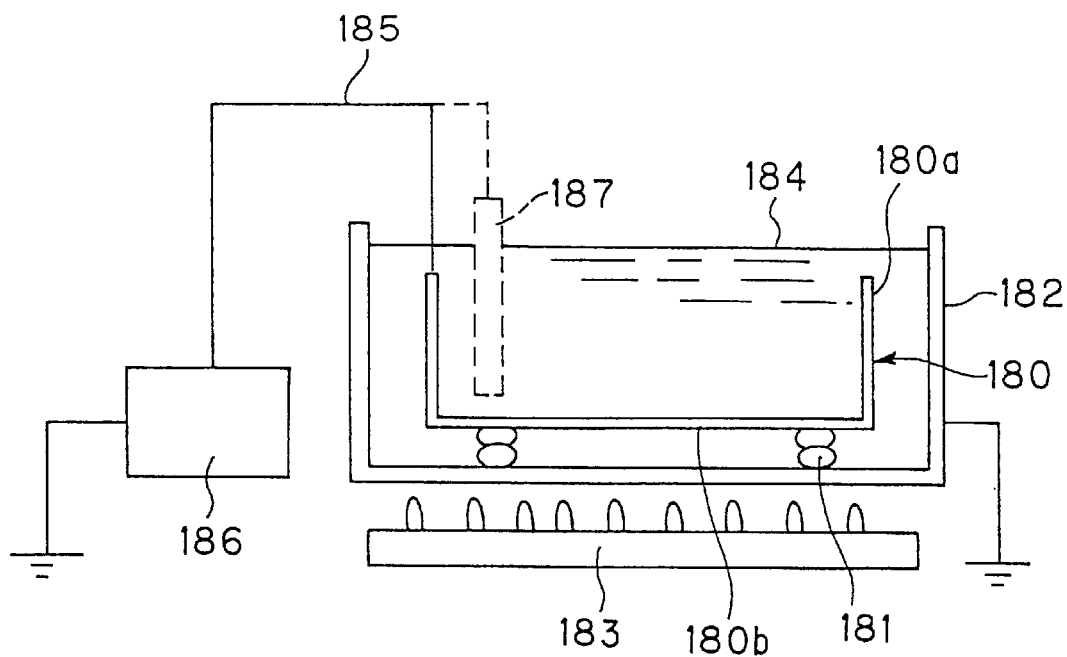
FIG. 35 shows a structural view of a gas fryer having an electrode therein.
Figure 36:
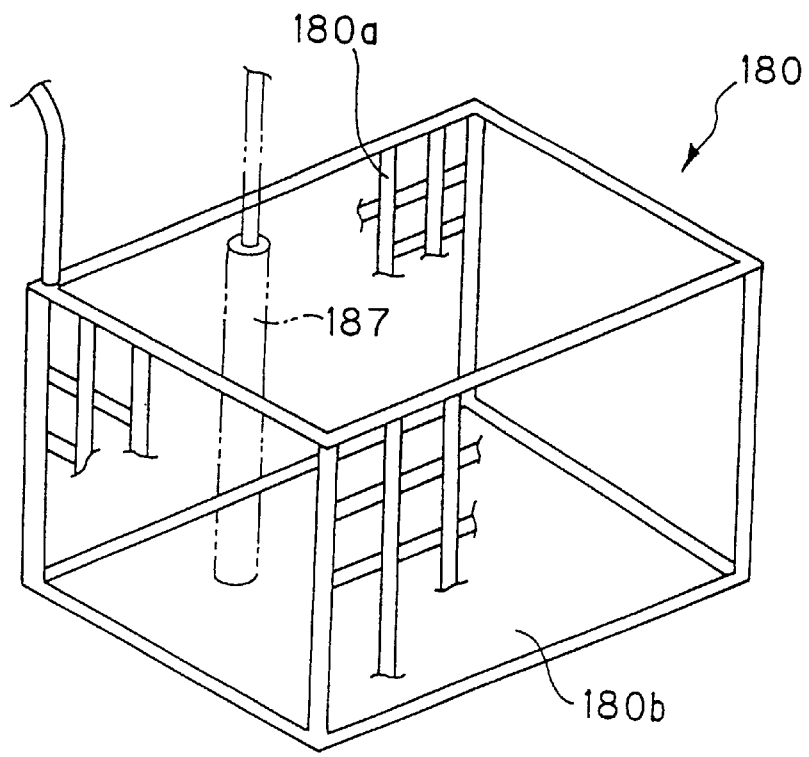
FIG. 36 is a perspective view of an electrode in the shape of a cage.

Next, in a gas fryer, an embodiment in which an electrostatic field is made in oil as an object to be treated in order to decrease deterioration of oil will be explained with reference to FIGS. 35 and 36.

Oil 184 is accommodated in an oil tank 182 earthed in which a cage-like electrode 180 is put through an insulator. When a high voltage is impressed on an electrode 180 by a high voltage generating device 186, a high voltage electrostatic field is formed. At this time, an oil tank 182 is heated by a burner 183 to heat the oil to a predetermined temperature in a short time. If "tempura" is cooked in this electrostatic field, it can be cooked crisply, and the level of deterioration of oil is low to enable use of long time without change of oil. In case that a bar-like electrode 187 is connected to a high voltage generating device and the electrode 180 is formed as a simple cage 180, a voltage is induced to the cage 180 through the electrode 187. In this case, the cage 180 functions as a supplementary electrode.

The mesh-like cage is convenient upon being put in oil, and if the mesh is fine, residuary substances after cooking "tempura" can be removed by lifting the cage from the tank. In order to form a uniform electrostatic field, a lattice in the shape of jungle jim may be put in the cage-like electrode.

Since oil is an insulating material, if a metal electrode is put in oil in an insulating state, an electrostatic atmosphere is formed in oil located around the electrode. If "tempra" and fried food is put therein, they are treated in an electrostatic field. However, when the "tempra" and fried food contact the inner wall of the oil tank 182, a charged state of the "tempra" and fried food is broken. At this time, the vertical circumferential wall 180a of the cage-like electrode 180 forms a dash-board for effectively preventing those from contacting the wall of the oil tank. In addition, the electrostatic field in the upper portion of the oil is weak only with the bottom wall 180b of the cage-like electrode 180, and, however, the vertical wall 180b prevents effectively the electrostatic field from becoming weak. With respect to the earth of the gas fryer, it is the same as that of the electric fryer shown in FIG. 34, and, in FIG. 35, the oil tank 182 is grounded. However, in case that a voltage impressed by a high voltage generating device 186 whose one pole is earthed is low like a level of 100V–1000V, it is not necessary that the oil tank 182 is grounded. The effects are as mentioned above.

In general, a gas fryer has heat pipes for heating oil in an oil tank. A case in which this invention is adapted for this type of the gas fryer will now be explained.

Figure 37:
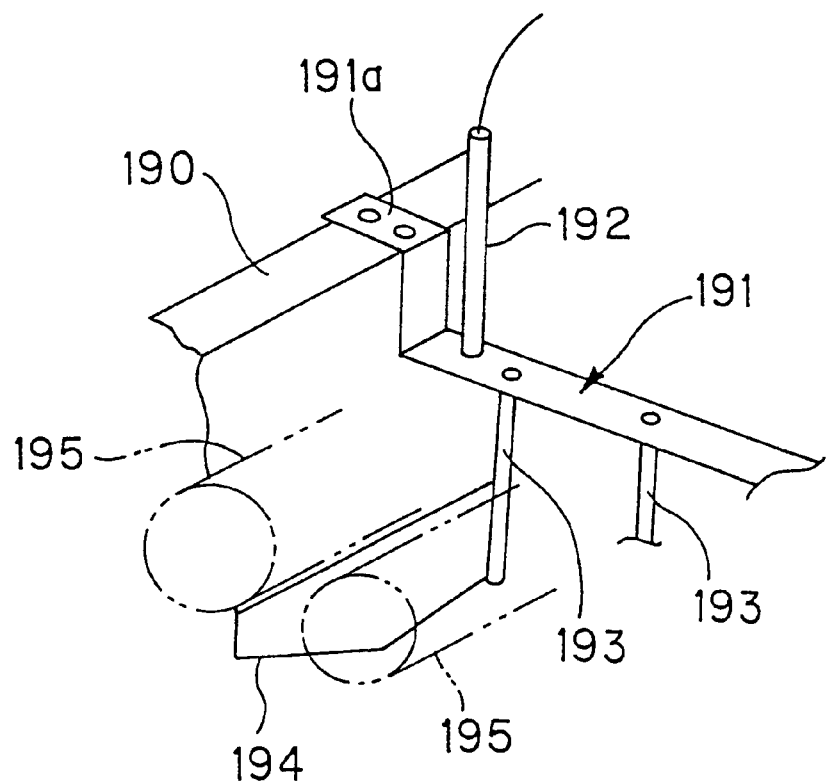
FIG. 37 is a perspective view showing a state in which an electrode is set in a gas fryer.

FIG. 37 shows the electrode of a fryer, and a bracket plate 191 is bridged between the right and left side walls 190. The side end 191a of the bracket plate 191 is fixed on the upper surface of the side wall 190 of the fryer. Support bars 193, 193 - - - 193 are disposed vertically at a portion of the bracket plate 191, opposed to the oil surface so as to be located between the heat pipes 195, 195 - - - 195, and each support bar 193 has an electrode plate 194. On the contrary, an electrode bar 192 having a heat-resistance is provided close to the end portion of the bracket plate 191, and a high voltage is impressed on the electrode plate 194 through the electrode bar 192, bracket plate 191 and the support bar 193. In this manner, since the electrode plate 194 is located under the upper face of the heat pipes and between the heat pipes 195, an operator does not touch the electrode plates 194 to ensure safety.

Figure 38:
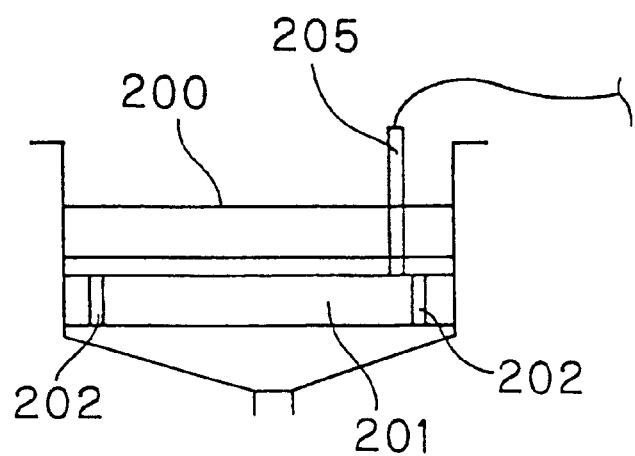
FIG. 38 is a perspective view showing another state in which an electrode is set in a gas fryer.
Figure 39:
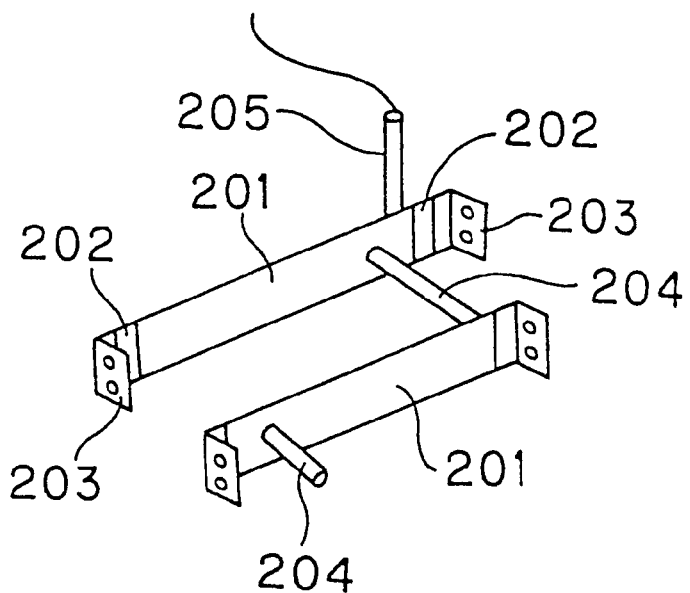
FIG. 39 is a perspective view of the electrode shown in FIG. 38.
Figure 40:
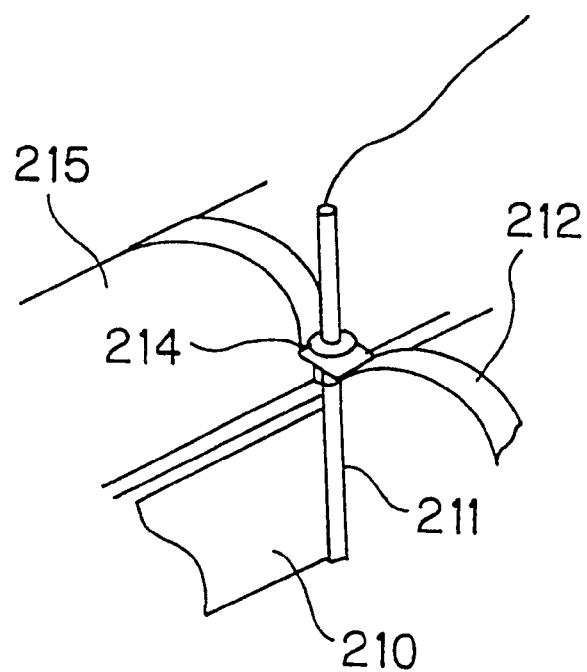
FIG. 40 is a perspective view showing still another state in which an electrode is set in a gas fryer.
Figure 41:
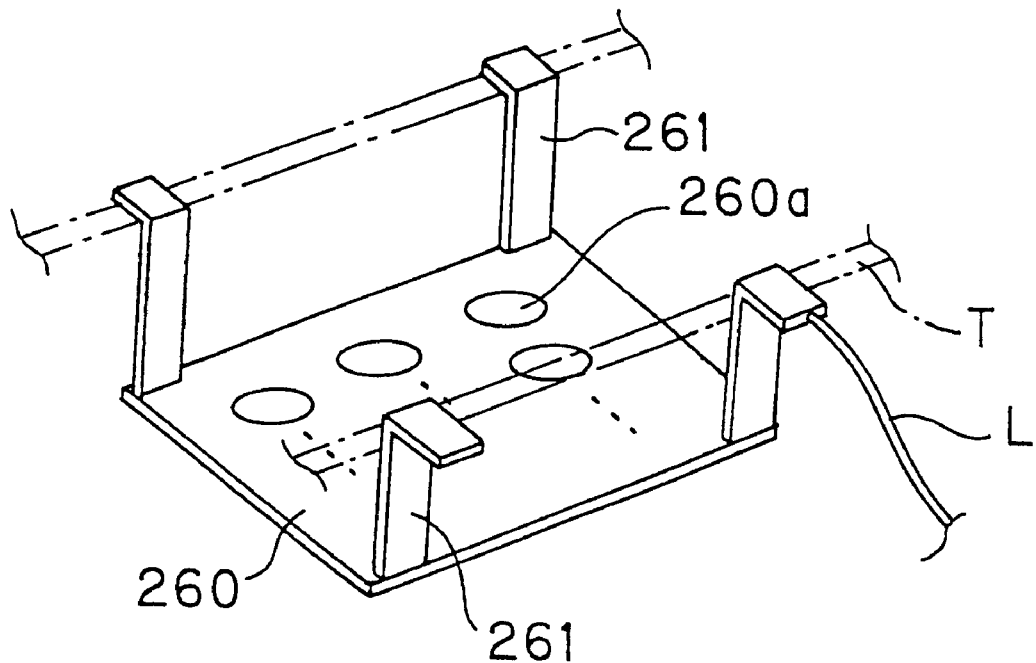
FIG. 41 is a perspective view showing still another state in which an electrode is set in a gas fryer.

As shown in FIGS. 38 and 39, electrode plates 201 made of bare metal plates are disposed in the front and rear direction of the oil tank and under the heat pipes through insulating bodies 202, 202 in a state wherein they are fixed vertically to the wall of the oil tank to ensure more safety. In this manner, if each electrode plate 201 is fixed vertically (upward and downward direction), it neither obstructs circulation of oil nor hold subsidiary substances of "tempra" and the like when the oil is taken out of the oil tank. Further, one of a plurality of electrodes 201 has an electrode bar 205 in an upright state, and connecting bars 204 connect each electrode plate 201 with each other. In addition, an electrode plate 210 may be fixed to a support bar 211, through an insulating piece 214, which is fixed to a middle portion of a bracket plate 212 which is installed on the end portion of the heat pipes 215, between adjacent heat pipes as shown in FIG. 40. As an electrode put in an oil tank, an insulated electrode plate 260 may be used as shown in FIG. 41. That is, adapter plates 261, 261 - - - 261 are provided uprightly at four corners of an insulated electrode plate 260 in which an insulating body is covered with a good conductive body, and the upper end of each adapter plate is bent outwardly to be hung on the upper surface T of an oil tank. Thereby, the insulating electrode 260 is held at a position where the insulating electrode 260 does not contact heat pipes in the oil tank. The electrode plate 260 is treated with coating such as Teflon, ceramic and the like or complex coating thereof, and is provided with a plurality of openings 260a, 260a, -260a, and a lead wire L from a high voltage generating device not shown is connected to one of the adapter plates 261.

Figure 42:
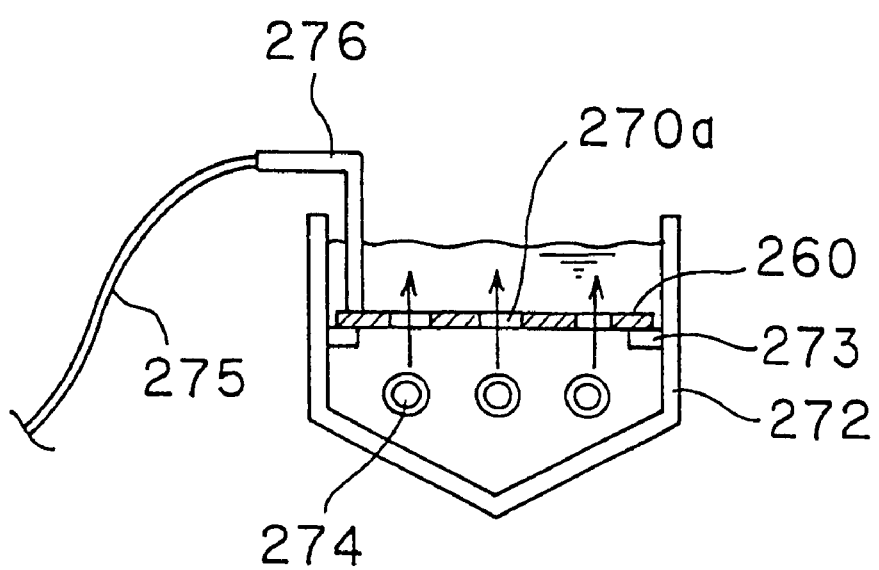
FIG. 42 is a structural view showing a state in which the electrode shown in FIG. 41 is set in a gas fryer.

In the case of no adapter plates 261 shown in FIG. 41, a plurality of projections 273 may be formed on the oil tank 272 as shown in FIG. 42 to hold the insulating plate 260 therewith. In this case, a connecting bar 276 is provided uprightly to be connected to a lead wire 275.

Figure 43:
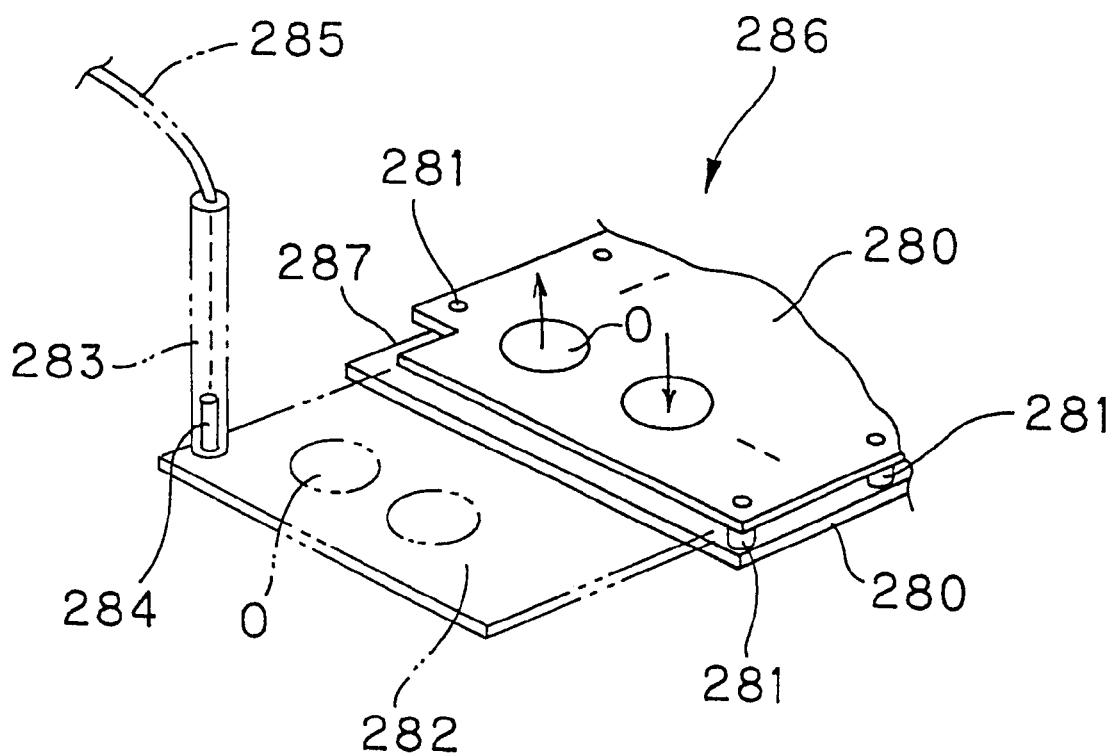
FIG. 43 is a perspective view of an electrode for a fryer.

FIG. 43 shows an electrode 286 in which heat-proof Teflon plates 280, 280 (having a heat-resistance of 260° C.) are joined at a space with spacers 2281, 281 - - - 281 to accommodate therebetween the main body 282 of the electrode 286. A connecting pin 284 is provided uprightly at a corner of the electrode main body 282 to be engaged with a connecting terminal which has a jack portion at the lower end portion of a Teflon bar 283, and a lead wire 285 is extended from the upper end of the Teflon bar. The Teflon plate 280 has a cut portion 287 at one corner so that the electrode main body 282 can be accommodated completely between the two Teflon plates. The electrode main body 282 and the Teflon plates 280 have openings 0, 0, - - - 0 to be registered with each other for ensuring a circulation of heated oil in the oil tank.

Figure 44:
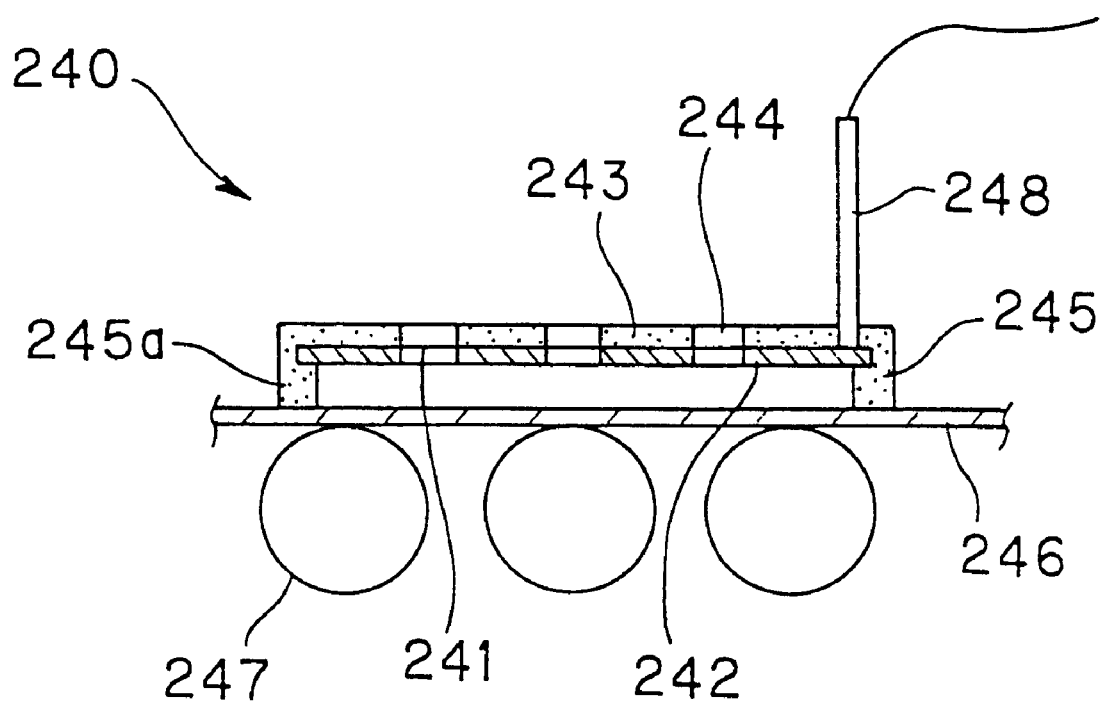
FIG. 44 is a sectional view of another electrode.
Figure 45:
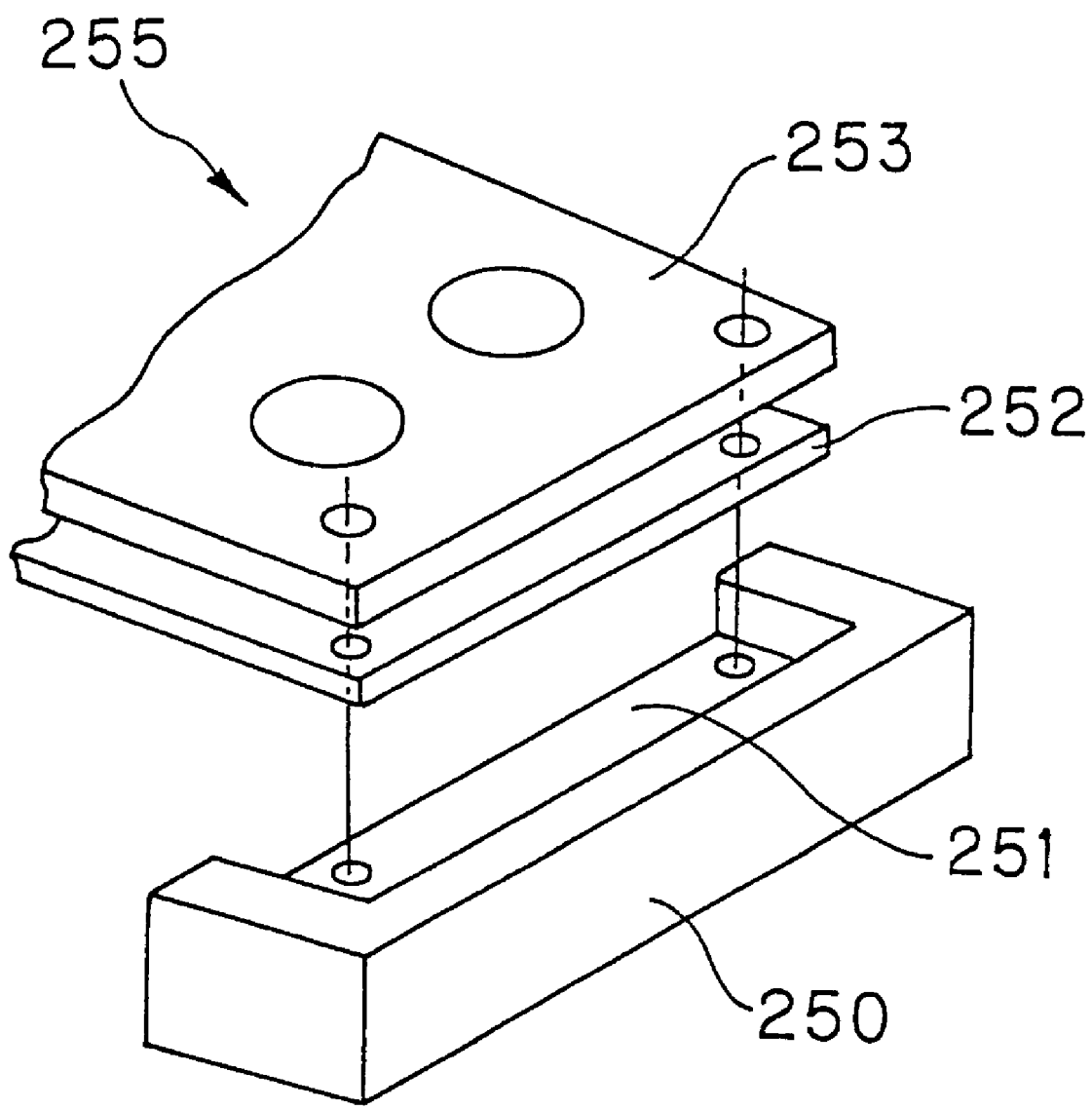
FIG. 45 is a structural view of still another electrode.

FIG. 44 shows an electrode 240 of another type of fryer which has a metal electrode 242 with circulating holes 241, and the metal electrode 242 is held detachably in a cover plate 245 which has leg portions 245a and is made of, e.g., china, porcelain, insulator, ceramic and the like. The cover plate 245 has holes 244 in registration with the holes 241. The leg portions 245a of the cover plate may be provided at both side ends of the cover plate 245, opposed to each other. Further, the leg portions 245a may be provided at three sides of the cover plate 245 so that the metal electrode 242 can be put into and taken out of the remaining one side of the cover plate 245. The cover plate 245 is held on a metal net 246 mounted on heat pipes 247. The upper surface of the electrode 242 is protected by an insulating body, and, therefore, a tool which an operator uses does not contact the electrode 242 on which a high voltage is impressed directly. Furthermore, the lower surface of the electrode 242 is opened to oil, so that sufficient electrostatic field is formed in the oil. The electrode 242 is connected to a high voltage generating device not shown through a connecting bar 248. Further, as shown in FIG. 45, two left and right leg members are prepared and an electrode plate 252 is put between a leg portion 251 of the leg member 250 and an insulating, cover plate 253 which are screwed with each other to form an electrode 255. This facilitates its manufacturing.

Figure 46:
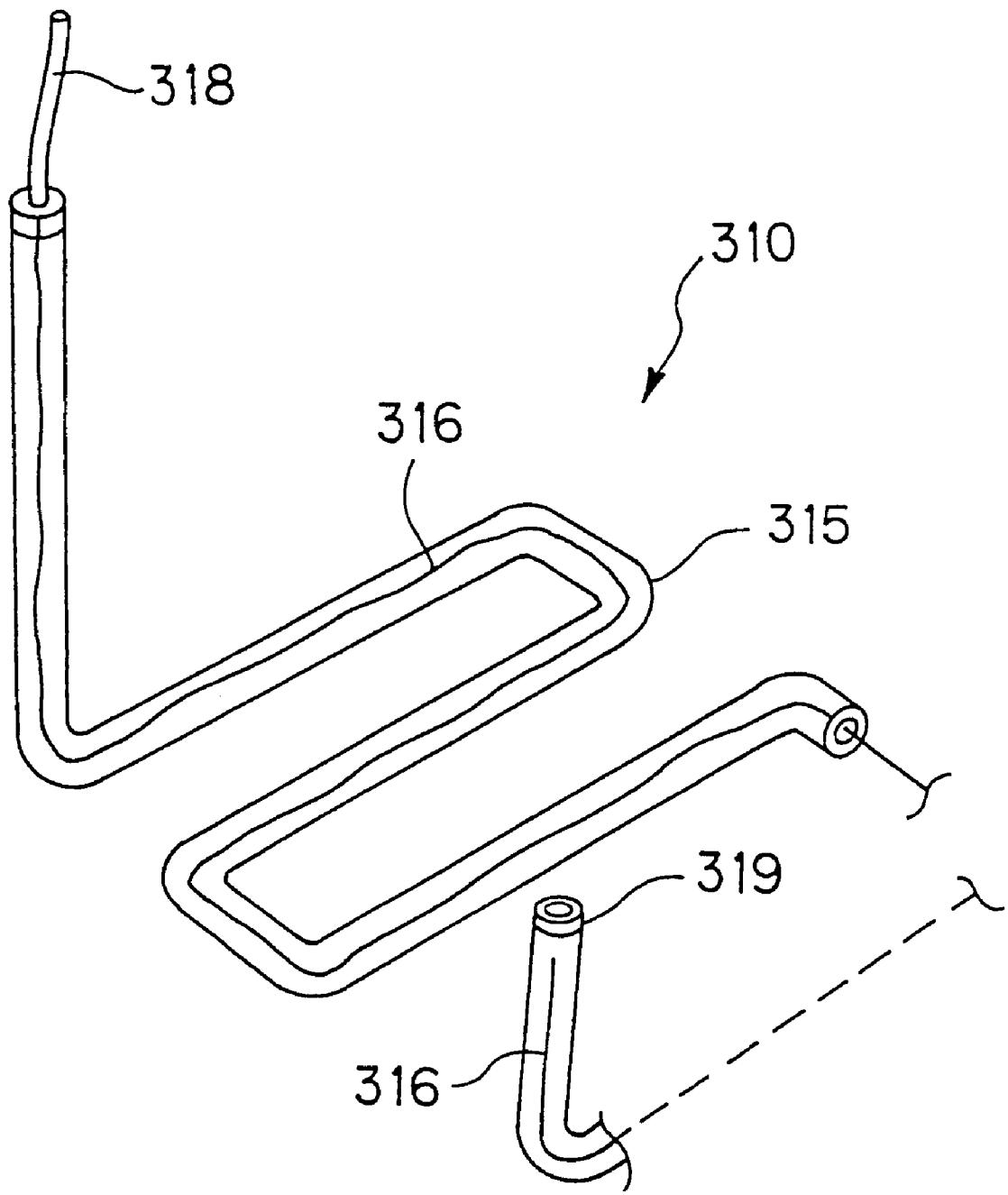
FIG. 46 is a perspective view of a glass electrode.

FIG. 46 shows an electrode 310 in which a heat-resistance glass tube 315 is deformed by heat in a desired shape, and a metal wire 316 as a conductive electrode is passed through the tube 315. The both ends of the electrode 310 are extended upwardly, and a lead wire 318 is connected to the entrance side thereof while the exit side thereof is closed by a plug 319. Subsidiary substances of "tempra" and fried food do not adhere such a glass electrode easily, and the glass electrode has a beautiful appearance.

Figure 47:
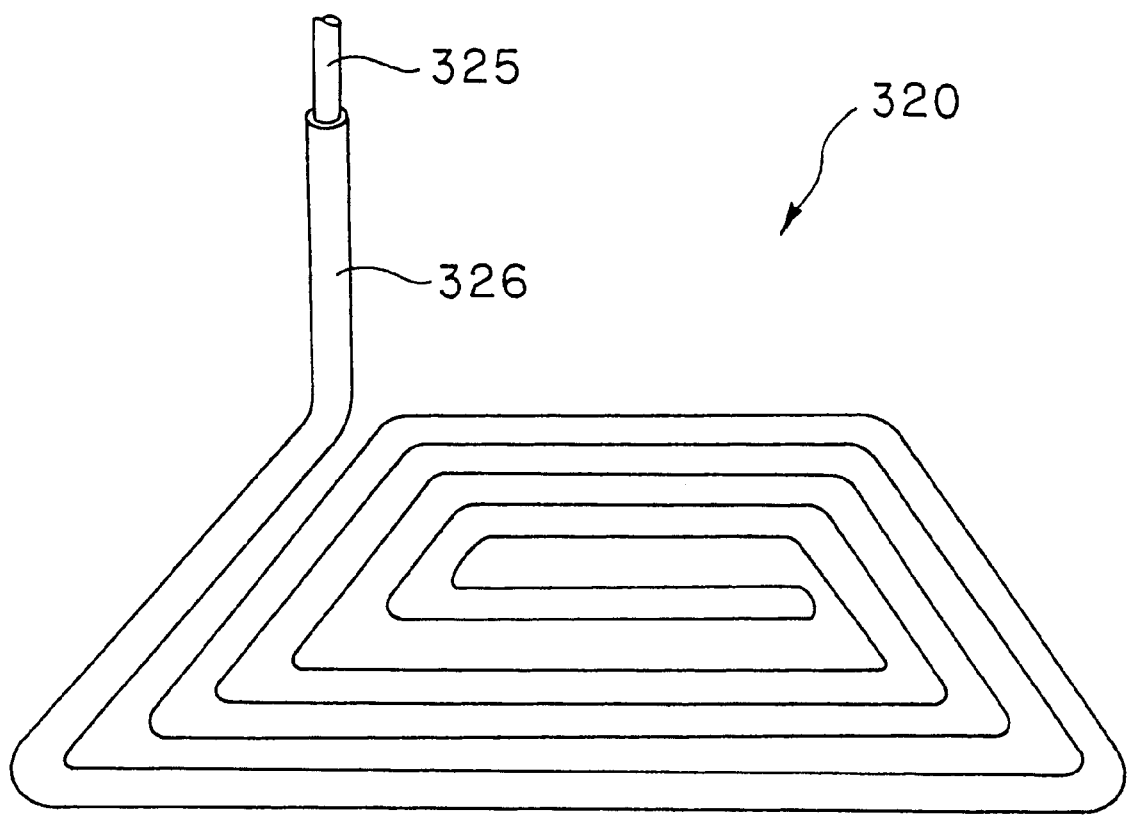
FIG. 47 is a perspective view of a wire-electrode.

An electrode for generating an electrostatic field in an oil tank may be formed as an electrode 320, as shown in FIG. 47, in which a conductive wire-like or bar-like electrode main body 325 is covered with, e.g., heat-proof and insulating coating 326 to be bent in various shapes. In case that this shape of electrode is used in a refrigerator, the insulating coating may be plastic such as vinylchloride, etc., and, however, in case that it is used in a fryer, Teflon or ceramic layer each having a heat-resistance is preferable. The electrode 320 can be formed inexpensively if the electrode main body 325 is inserted into a conventional vinylchloride or Teflon tube to be bent by a bender.

Figure 48:
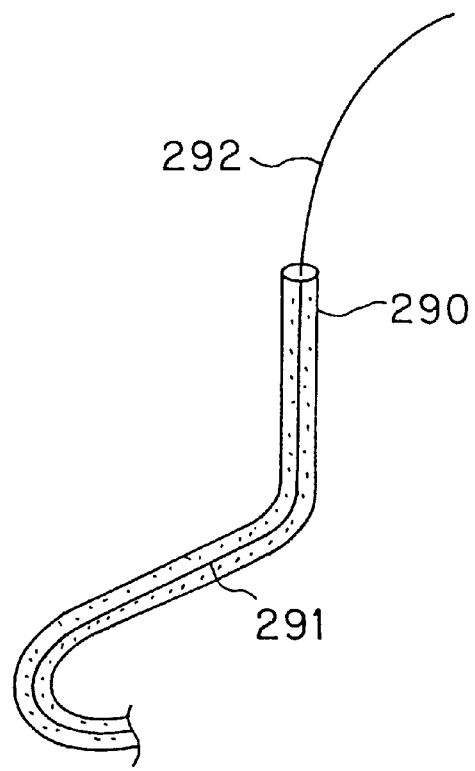
FIG. 48 is a perspective view of a glass electrode.
Figure 49:
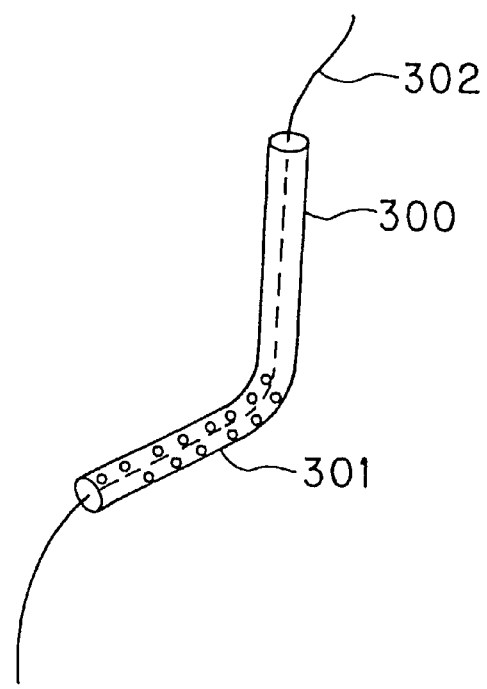
FIG. 49 is a perspective view of another glass electrode.

If a conductive body such as iron powder and copper powder and the like as well as a connecting wire 292 is put into a heat-proof glass tube 290 to form an electrode for a fryer, the drop of impressed voltage thereon is decreased, and the electrode does not move easily in oil because of the increase of its weight (FIG. 48). Further, as shown in FIG. 49, when the drop of impressed voltage is large, a number of small holes 301 may be formed on the glass tube. Also in this case, instead of the connecting wire 302, silver plating may be performed to form an electrode. Such a glass electrode can be used to form an electrostatic field in water.

Figure 50:
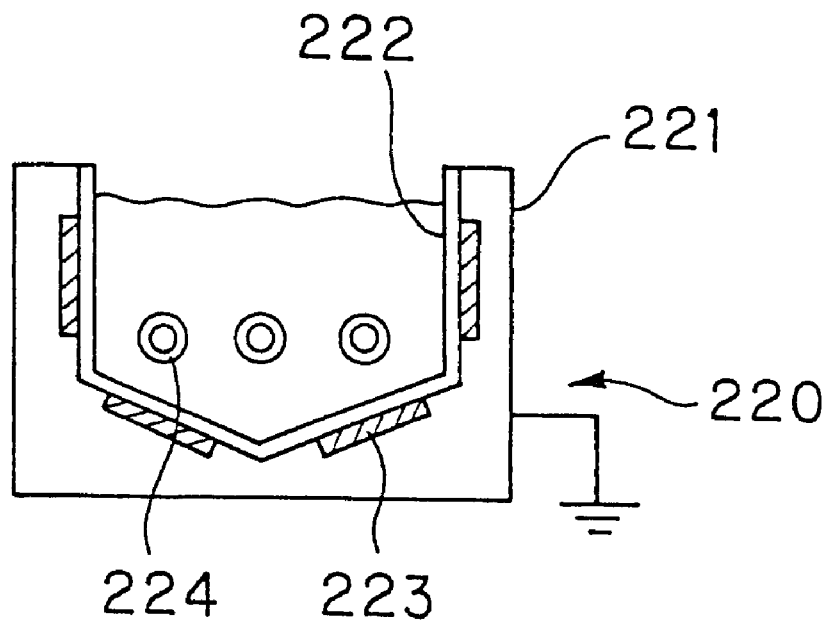
FIG. 50 shows a structural view showing a disposition of an electrode in the oil tank of a fryer.
Figure 51:
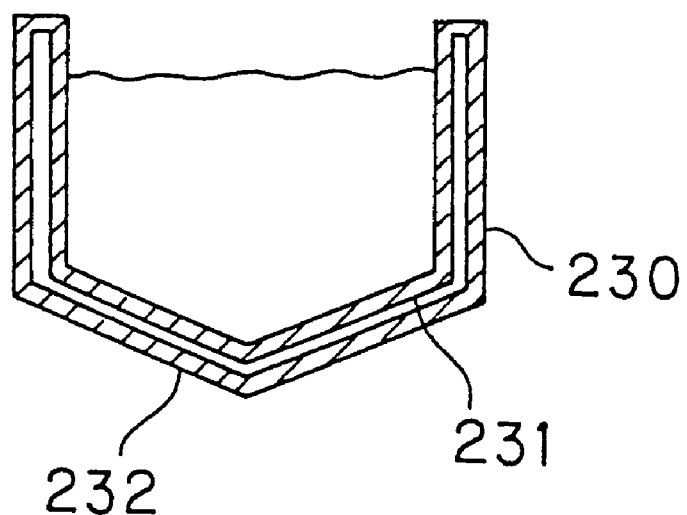
FIG. 51 is a sectional view showing a state in which an electrode is buried in the tank wall of a fryer.
Figure 52:
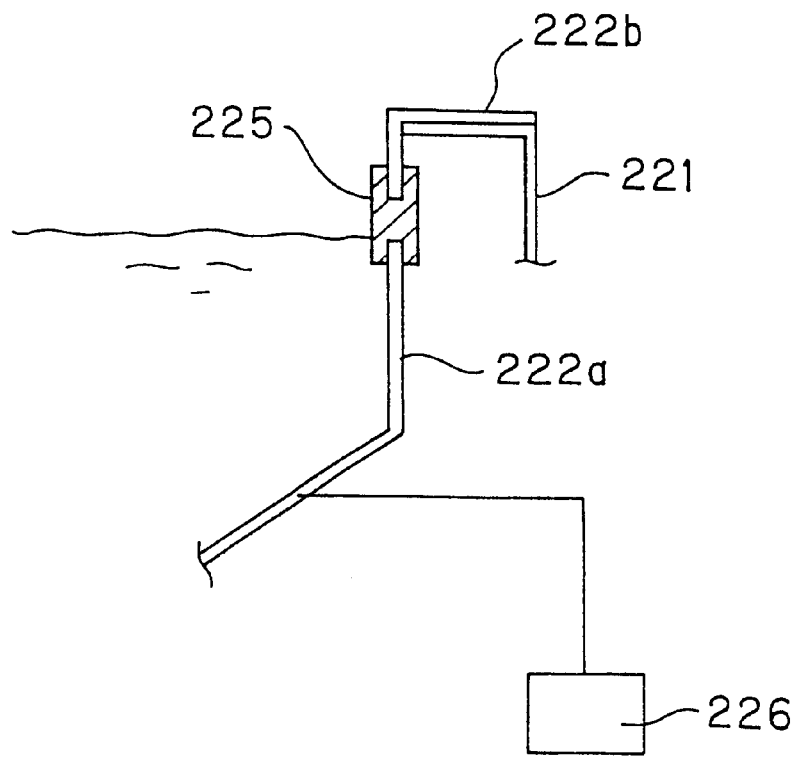
FIG. 52 is an explanatory view showing a state in which the tank wall of the fryer is insulated from the outer wall thereof.
Figure 53:
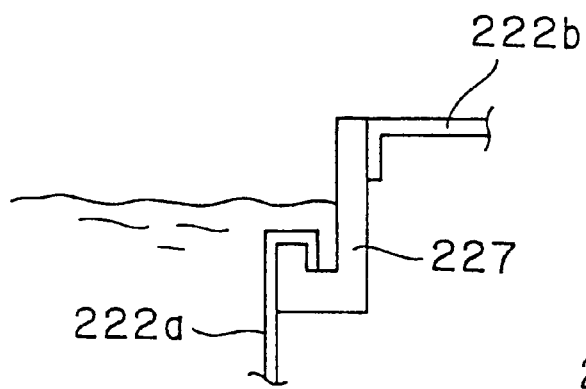
FIG. 53 is an explanatory view showing another state in which the tank wall of the fryer is insulated from the outer wall thereof.
Figure 54:
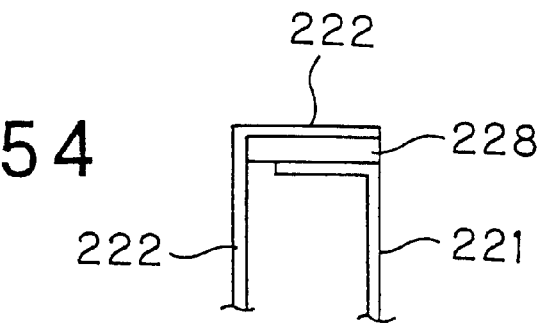
FIG. 54 is an explanatory view showing still another state in which the tank wall of the fryer is insulated from the outer wall thereof.

The above is an explanation for a case in which an electrode is inserted into an oil tank to charge oil with electricity, and, however, a high voltage is impressed on an oil tank itself. That is, a fryer 200 has, as shown in FIG. 50, an outer casing 221 in which an oil tank 222 is accommodated, and heat pipes 224, 224, - - - 224 are provided in the lower portion of the oil tank 222. Insulating electrode plates 223 - - - 223 are adhered on the outer wall of the oil tank 222 to form an electrostatic field in the oil tank. As shown in FIG. 51, the whole part of the oil tank may be formed as an electrode in such a manner that a metal plate 231 is covered with an insulating coating 232. The oil in the oil tank is heated to a high temperature (160–200° C.), and, therefore, the insulating coating 232 must be heat-proof, and, for example, Teflon, ceramic or a complex coating thereof is used. In these cases, the oil tanks 222, 230 are supported in an insulated state with respect to the outer casing 221. Concretely, as shown in FIG. 52, a connecting member 225 made of an insulating body is provided along the circumferential portion of the oil tank and at the upper portion of the wall 222a of the oil tank, and the connecting member 225 is connected to an upper wall 222b which is supported on the outer casing 221. A high voltage generating device may be directly connected to the wall 222a of the oil tank. The connecting member is formed in hook-shape of L, as shown in FIG. 53, and the hook-shaped upper portion of the wall 222a of the oil tank is hung on the lower portion of the connecting member, so that the leakage of oil from the connecting portion of the tank wall can be prevented. The upper bent portion of the oil tank 222 may be connected to the outer casing 221 through an insulating body as shown in FIG. 54. In this case, a voltage is also impressed on the upper bent portion, and, therefore, a voltage of approximately 500–700V is impressed thereon. A user does not acknowledge an electrostatic field to be safe with such level of voltage. Accordingly, at this time, the earth of the oil tank is not necessary. The oil tank wall and heat pipes are generally connected, by welding, with each other, and a high voltage is also impressed on the heat pip No cut vegetables es to form uniformly an electrostatic field in oil in the oil tank.

Figure 55:
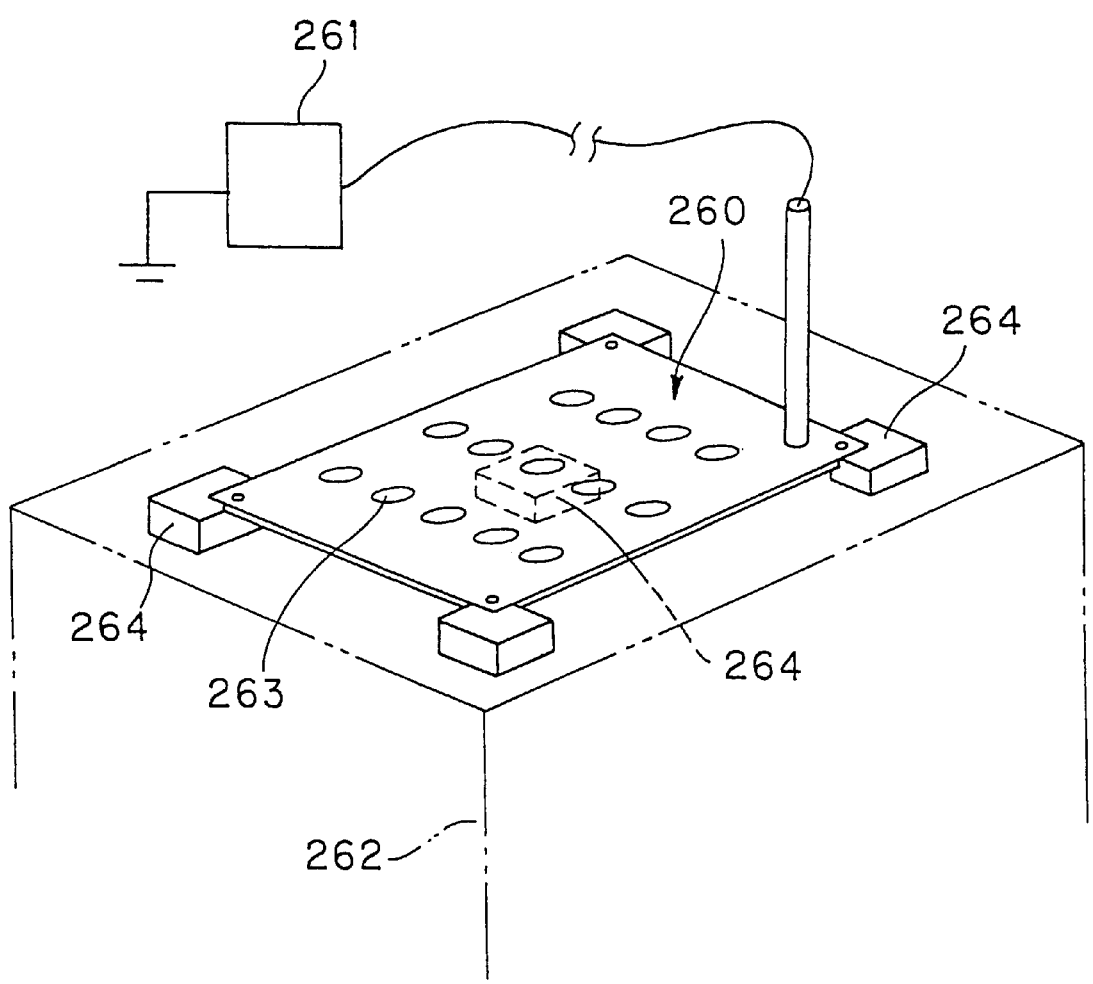
FIG. 55 is an explanatory view showing a state in which an electrode plate is set in a fryer.

In the case of a relatively low voltage (300V–700V) as shown in FIG. 55, even if an operator touches a bare metal electrode plate 260 with metal chopsticks, he does not receive an electric shock. Therefore, for example, one pole of the secondary side of a high voltage generating device 261 is earthed, and, however, the casing 262 of the oil tank is not necessarily earthed to facilitate its construction work. In this manner, even a relatively low voltage can prevent the oxidation of oil to extend the life span of oil at least two times without electric shock of an operator. The electrode plate 260 is made of a stainless plate and has a number of openings 263 and insulating pieces 264 - - - 264, at its corners, which are made of ceramic or Teflon and which are protruded outwardly so that the electrode plate 260 does not contact the circumferential wall of the oil tank. The insulating pieces 264 function to hold the electrode plate 260 in an insulating state from the heat pipes in the oil tank, and an insulating piece is provided on the center of the backside of the electrode plate 260 as occasion demands.

Also in the case of a relatively low voltage, there is no doubt that only the upper surface of the electrode plate 260 may be covered with an insulating material or a coating. The insulating material effectively functions to prevent an operator from touching directly the electrode plate with chopsticks, and it is preferable that the back surface thereof is opposed to the oil because the oxidation of oil located under the electrode plate is effectively prevented.

Figure 56:
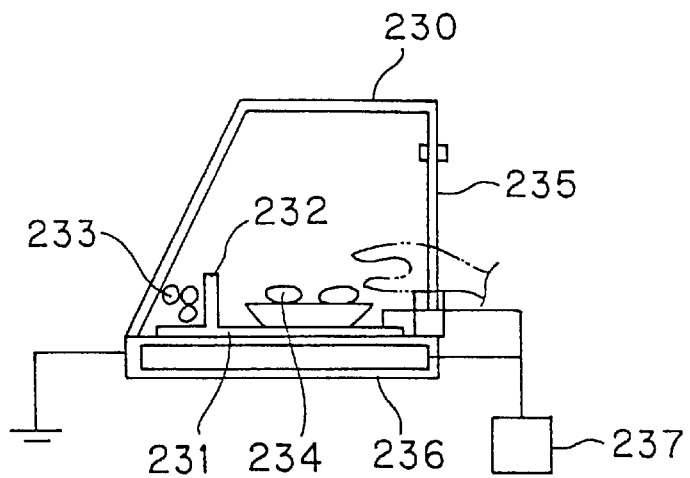
FIG. 56 is an explanatory view showing a state in which an electrode is set in a sushi-case.
Figure 57:
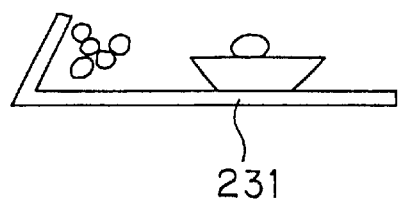
FIG. 57 is a side view of an electrode set in a sushi-case.

FIG. 56 shows a fish case as a food storing apparatus which has an insulating electrode 231 which is provided with a screen bulkhead 232 in front of which ornaments such as leaves of Japanese cedar or bamboo are located. The screen bulkhead 232 is for avoiding contact between an object 234 to be treated and the frame of the fish case which is grounded so that the object is not grounded. An earthed part, e.g., rail of the fish case, located under the opening door 235, where a hand may touch is insulation-treated (the rail itself may be made of or covered with an insulating body) so that the object on the electrode 231 is not grounded even when an operator grasps that object in a state wherein his hand contacts the rail simultaneously. The insulated electrode 231 may be one shown in FIG. 15 and one in which a conductive film is laminated with upper and lower plastic plates. In the laminated type of electrode, a method of connecting an electrode as shown in FIGS. 20 and 21 is preferable. The insulating electrode 231 is connected to a high voltage generating device 237 to form an electrostatic field in an space for accommodating a cooling device at the lower portion of the fish case by adhering a conductive thin film 236 on the circumferential wall of the space and to function to prevent dew condensation for the cooling device. As shown in FIG. 57, the front portion of the electrode 231 may be bent backward.

Figure 58:
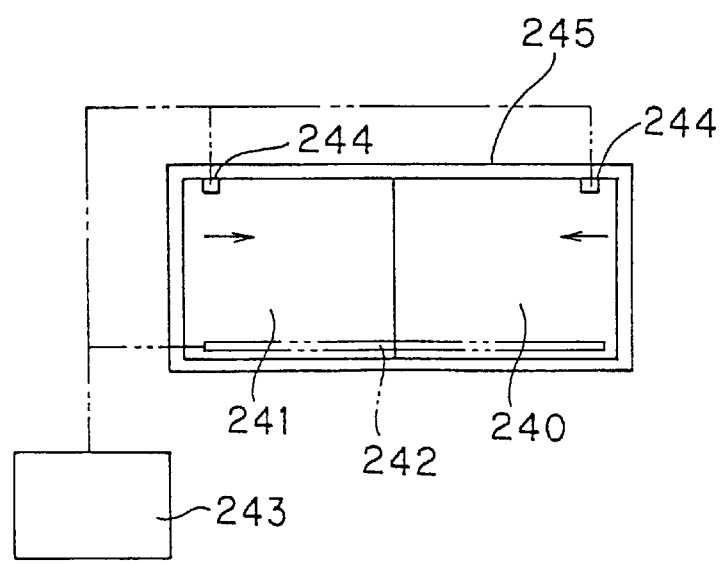
FIG. 58 is an explanatory view showing a state in which a sensor is set on the door of a sushi-case.

FIG. 58 shows a back face of a fish case in which sliding doors 240, 241 and proximity sensors 244, 244 are provided on the left and right sides of an upper frame 245. When either the door 240 or 241 is opened, the impression of voltage on the electrode 242 from a high voltage generating device 243 is stopped. Instead of the proximity sensors, limit switches may be provided.

Figure 59:
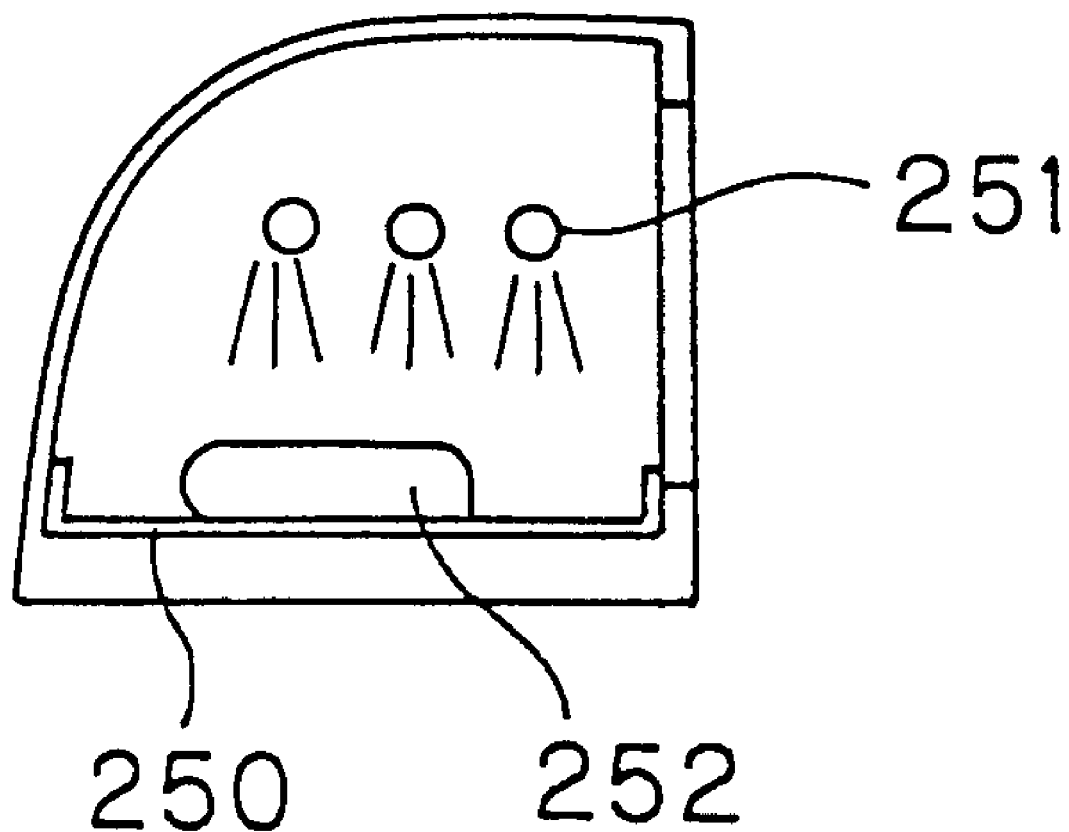
FIG. 59 is an explanatory view showing another state in which an electrode is set in a sushi-case.

FIG. 59 shows a fish case which is installed in a sushi-restaurant, and on its bottom face is provided an insulating plate 250 on which fishes are put. Further, an electrode bar 281 is disposed in a space of the fish case, and the electrode bar 281 is connected to a high voltage generating device not shown. The electrode bar may be so formed that silver plating is performed in a hollow glass tube and also that a copper wire is disposed in the hollow glass tube. Such an electrode bar 251 can be also disposed in a refrigerator. In this manner, an electrostatic field can be formed in the whole part of the fish case.

Figure 60:
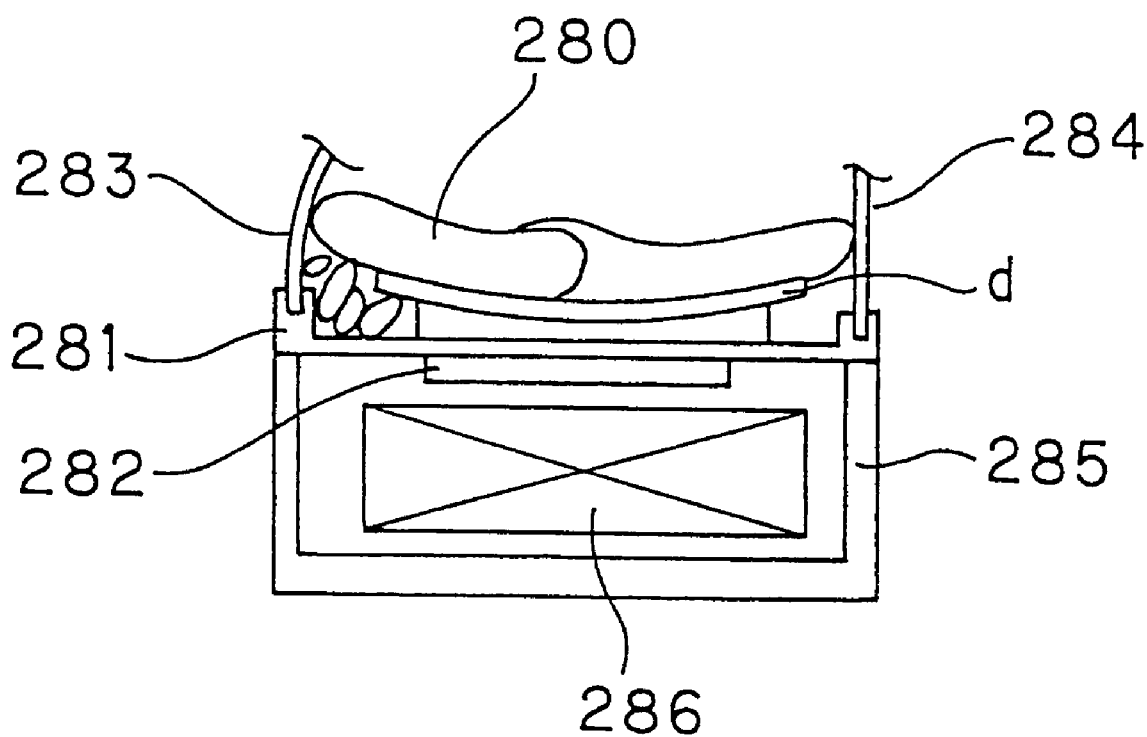
FIG. 60 is an explanatory view showing still another state in which an electrode is set in a sushi-case.

However, as shown in FIG. 60, an object 280 to be treated, put on a dish d in the fish case often contacts the circumferential wall thereof, and, if the contact part is conductive body, the voltage impressed drops therefrom. Therefore, it is preferable that at least an upper frame 281 is made of an insulating material, and an electrode plate 282 is attached to the center of the back side of the upper frame 281. In addition, the upper frame 281 has a glass plate 283 and a glass door 284 (the rear portion of the upper frame 281 is formed as a rail), and a cooling device 286 is accommodated in a lower frame 285 supporting the upper frame 281. An electrostatic field is so formed in the space of the lower frame 285 as to prevent effectively frost attachment on the cooling device.

Next, a showcase having an electrostatic field therein will now be explained.

Figure 61:
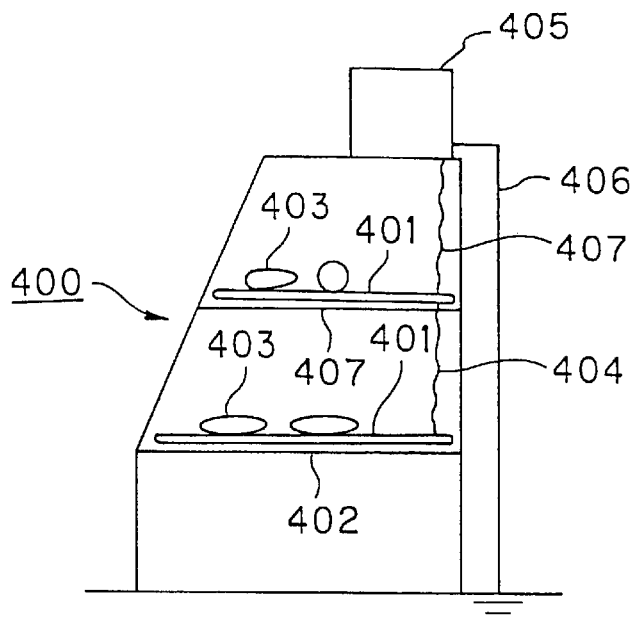
FIG. 61 is a side view showing a state in which an electrode is set in a showcase.

FIG. 61 shows a showcase (open case) 400 having upper and lower shelves 402, 402 therein on which insulated electrode plates 401, 401 are mounted, and food 403 is located on these electrode plates. Any food such as fishes, vegetables and cakes, etc., can be freshness-kept. On the top plate of the showcase is mounted a high voltage generating device 405 to which electrode plates 401, 401 are connected through lead wires 404, 404 and which is grounded through an earth wire 406. In general, a voltage of 2000–5000V is impressed on the electrode plates 401 by the high voltage generating device 405.

Figure 62:
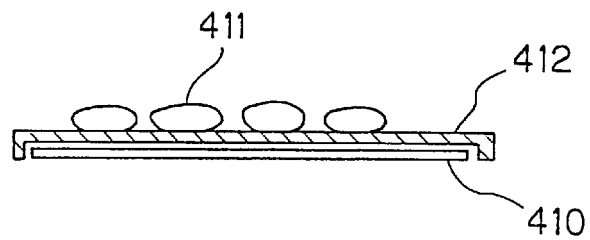
FIG. 62 is an explanatory view showing a state in which an electrode is set in a showcase.

In the case of the showcase, an electrode plate whose whole surfaces are covered with an insulating coating is not necessarily used, and, as shown in FIG. 62, a shelf itself made of an insulating body may holds a metal plate 410, in an attaching state on its backside so as to expose the lower face of the metal plate 40 to air. Furthermore, the shelf itself may be made of an insulating body, and the metal plate 410 may be pushed into the insulating shelf In many cases, vegetables are treated with an impressed voltage of 10 V–700V and, in this case, a bare metal plate may be put on the shelf. At this time, an operator never feels an electric shock, and the showcase itself does not need an earth.

Figure 63:
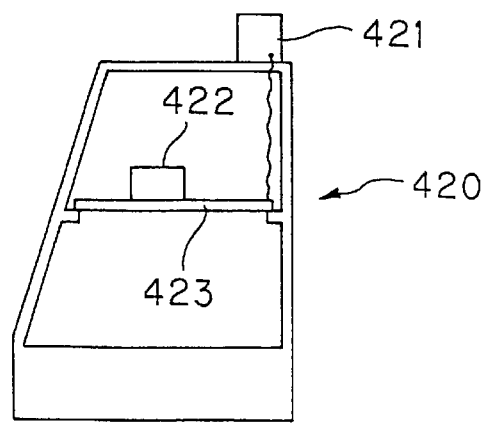
FIG. 63 is a side view showing a state in which a glass electrode is set in a showcase.
Figure 64:
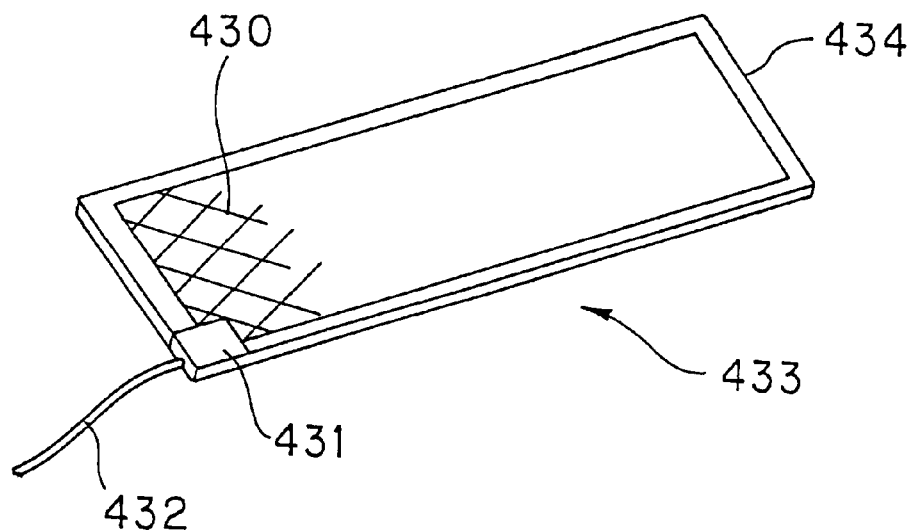
FIG. 64 is a perspective view of a glass electrode.
Figure 65:
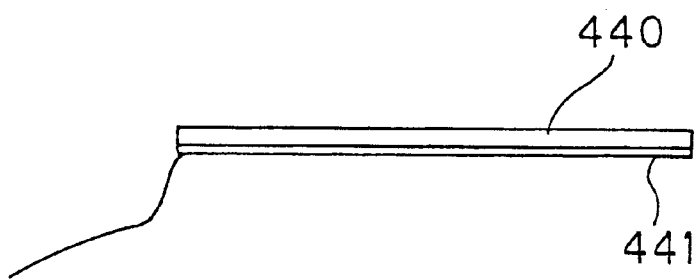
FIG. 65 is a side view of another electrode.

FIG. 63 shows a showcase 420, and, in the case of meat and fish it is preferable that, a shelf is so formed that a metal plate is covered with an insulating body. However, in the case of western cakes and Japanese cakes 422, a glass shelf or a transparent shelf is generally used. An electrostatic field of a voltage of 300–600V is optimum for freshness-keeping of cakes, and, in this case, as shown in FIG. 64, metal fine wires 430 are disposed in a transparent or opaque glass plate or acryl plate so as to be connected to a lead wire 432 through a connecting portion 431 for impressing a voltage on the fine wires 430. The electrode 433 thus formed can be used as a shelf itself. In case that metal fine wires located at the circumferential edge of the glass plate are exposed barely, an insulating circumferential frame is attached thereto. However, in the case of 500–700V, the frame is not necessarily provided. Further, a metal foil such as aluminum or tin may be attached to the whole surface of a glass plate or a resin plate so that a voltage is impressed on the metal foil. Instead, metal may be evaporated on an insulating plate.

Figure 66:
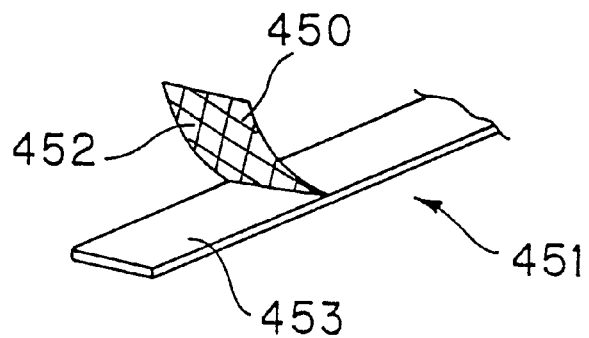
FIG. 66 is a perspective view of still another electrode.

Further, as shown in FIG. 66, an electrode 451 may be so formed that a resin film 450 having a conductive pattern, on its inner surface, obtained by evaporation or printing is adhered on a glass or resin plate 453. In addition, the electrode may be so formed that printing is performed on the glass plate 453, or conductive ink or coating material is painted on the glass plate 453 or the film 450. Metal film may be formed by evaporation. Instead of the glass plate, a conductive film or pattern may be formed on various insulating materials such as china, stone, etc., by various means. An insulating ink coating material may be mixed with conductive powders to be printed or painted on an insulating material. Instead of the film 450, a conventional film (tape) may be attached thereto, and an insulating thin film may be further attached on a metal foil which is adhered on a glass plate 453.

Figure 67:
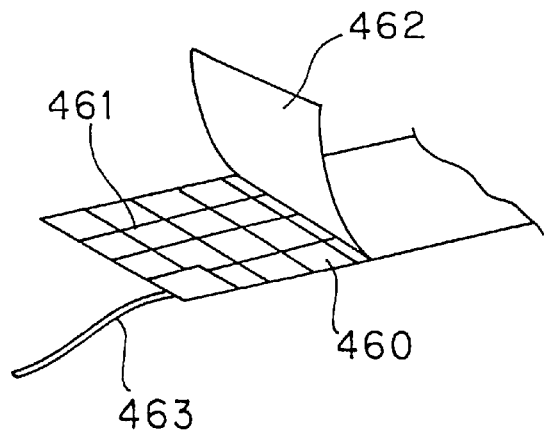
FIG. 67 is a perspective view of still another electrode.
Figure 68:
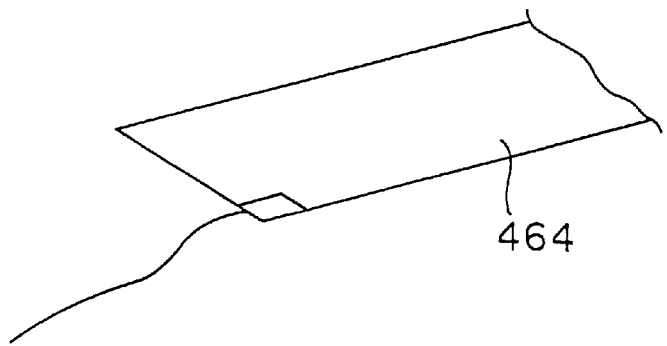
FIG. 68 is a perspective view of still another electrode.
Figure 69:
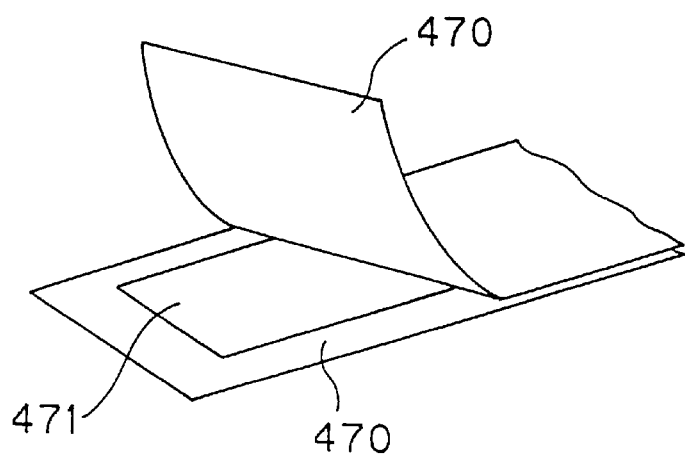
FIG. 69 is a perspective view of still another electrode.

As an electrode used in an open case or a flat case for a supermarket, as shown in FIG. 67, the electrode is so formed that a conductive pattern 461 is printed or evaporated on an insulating film 460 such as vinylchloride resin. This kind of electrode is useful because it has a certain level of strength. A conventional thin film 464 for protection of charging may be used as an electrode so as to be protected with other members (FIG. 68). A laminate type of electrode can be used, as shown in FIG. 69, in such a manner that a conductive film 471 is held between two upper and lower plastic films whose circumferential portions are adhered with each other.

Next, a case in which a glass electrode is installed in a showcase will now be explained.

Figure 70:
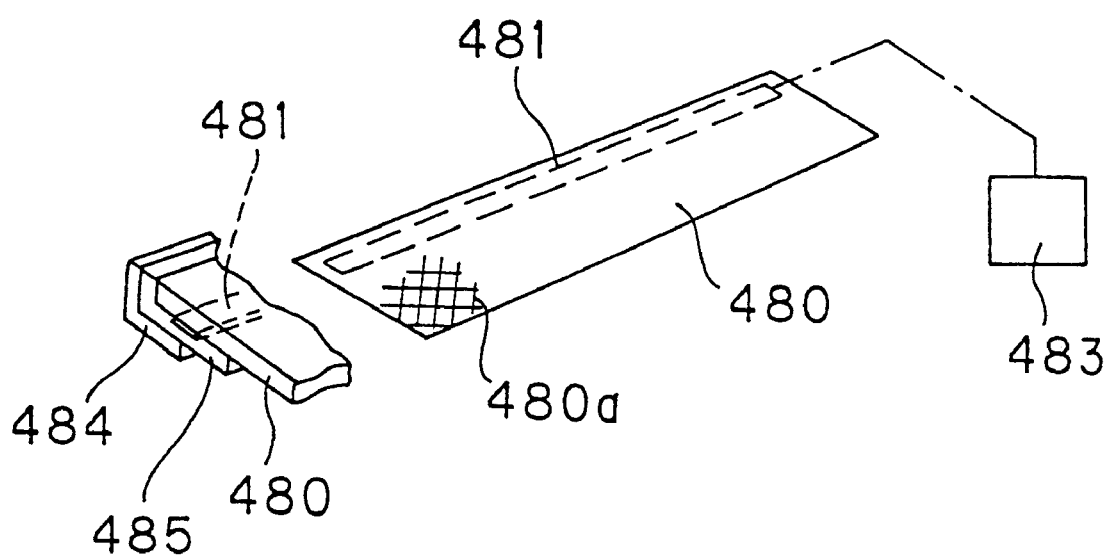
FIG. 70 is a perspective view showing a state in which a glass electrode is set in a showcase.
Figure 71:
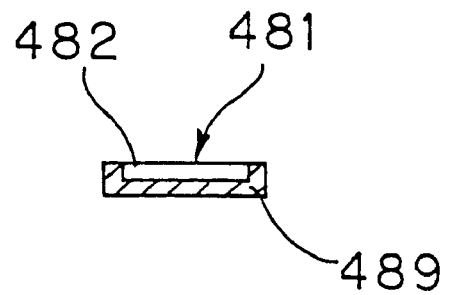
FIG. 71 is a cross sectional view of a terminal plate used for a showcase.

As shown in FIGS. 70 and 71, it is preferable that a long terminal plate 481 is located under a glass electrode plate in an insulated state. This terminal plate 481 has a stainless plate 482 whose side and lower surfaces are covered with an insulating coating 489. If the upper face of the stainless plate 482 contacts directly the lower face of the glass plate, the drop of voltage is little. On the contrary, if the upper face of the stainless plate 482 is covered with an insulating plate, a voltage impressed on the glass electrode plate 480 decreases. However, if the terminal plate 481 is formed long in a longitudinal direction of the glass electrode plate, the glass electrode plate 480 can be easily accommodated in a showcase in a state wherein the glass electrode plate is divided in its longitudinal direction. The glass electrode plate 480 is put on the terminal plate 481 which is put on an insulating plate 481 which is put on an insulating plate 485 made of vinylchloride which is put on a support frame 484 provided on both sides of a showcase. The circumferential face of the glass electrode 480 is ground to avoid danger of fine wires.

Figure 73:
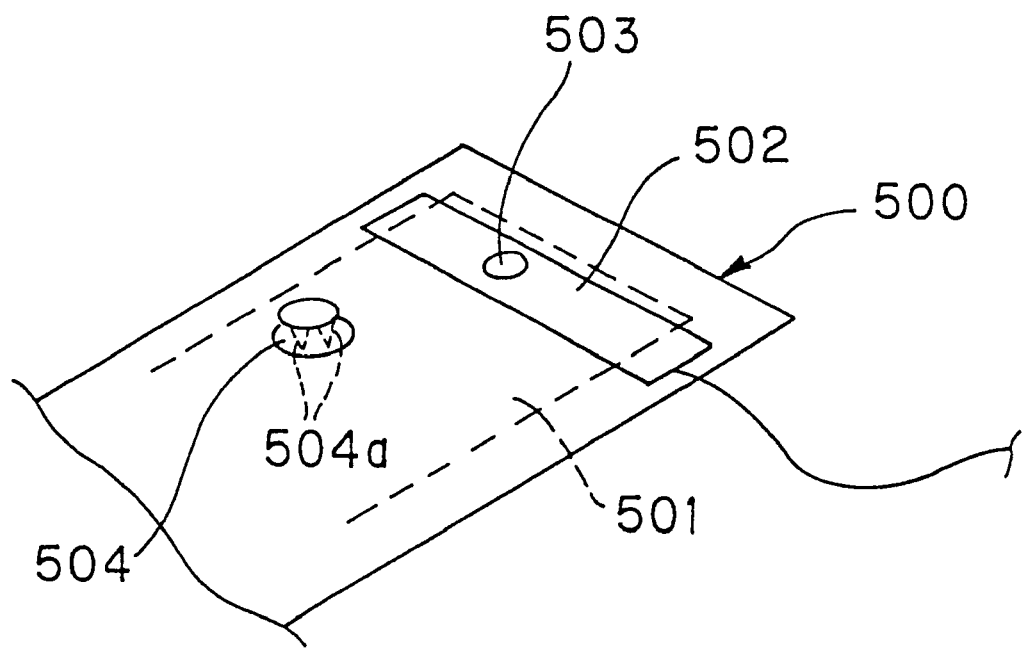
FIG. 73 is a perspective view showing a state in which a terminal plate is put on a laminate electrode plate.

FIG. 73 shows an laminated electrode plate 500 used instead of the glass electrode plate 480, and the electrode plate 500 is so formed that a conductive sheet 501 is laminated with an insulating plastic. When a voltage is impressed on the laminated electrode 500, a terminal plate 502 is just put thereon. In case that a sufficient voltage cannot be obtained with an indirect contact, a hole 503 is provided in a laminating plastic film in order to expose the conductive sheet outward, and a conductive body such as conductive paints are buried in the hole 503 so that the conductive body contacts the lower face of the terminal plate 502. The terminal plate 502 is so formed that a metal plate is covered with an insulating coating. The insulating coating of the terminal plate is partly removed to expose the metal plate outwardly, and the metal plate is directly brought into contact with the conductive sheet 501 of the laminated electrode plate 500 through an intermediate conductive body such as conductive paints to decrease dropping of an impressed voltage. The lowest step of the showcase forms a floor, and glass is not used for the floor. Therefore, the laminated electrode 501 is used instead of the glass electrode.

Instead of the terminal plate 502, there may be used a connecting tool 504 on the bottom face of which teeth 504*a* are projectingly formed. The teeth 504*a* bite the laminated electrode so as to project to the backside thereof, and the projected portions of the teeth are bent to prevent them from coming out. In this method, the teeth 504*a* contact directly the conductive sheet 501 so that a voltage can be surely impressed thereon.

Figure 72:
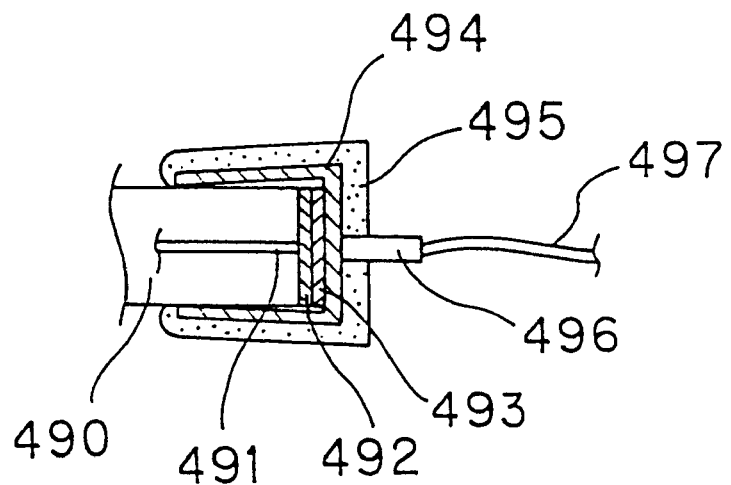
FIG. 72 is a sectional view showing a state in which a clip plate is connected to the end face of a glass electrode including a fine wire therein.

In order to impress a voltage on the glass electrode plate 490, as shown in FIG. 72, conductive paints are coated or sprayed to form a conductive layer 492 which contacts the distal end exposed at the side end face of the glass electrode plate 490 and to which a chip plate 494 is connected through a conductive rubber 943. The clip plate 494 is provided with cable receiving portion 476 to which a cable 497 is connected, and the cable 497 is connected to a high voltage generating device not shown.

Figure 74:
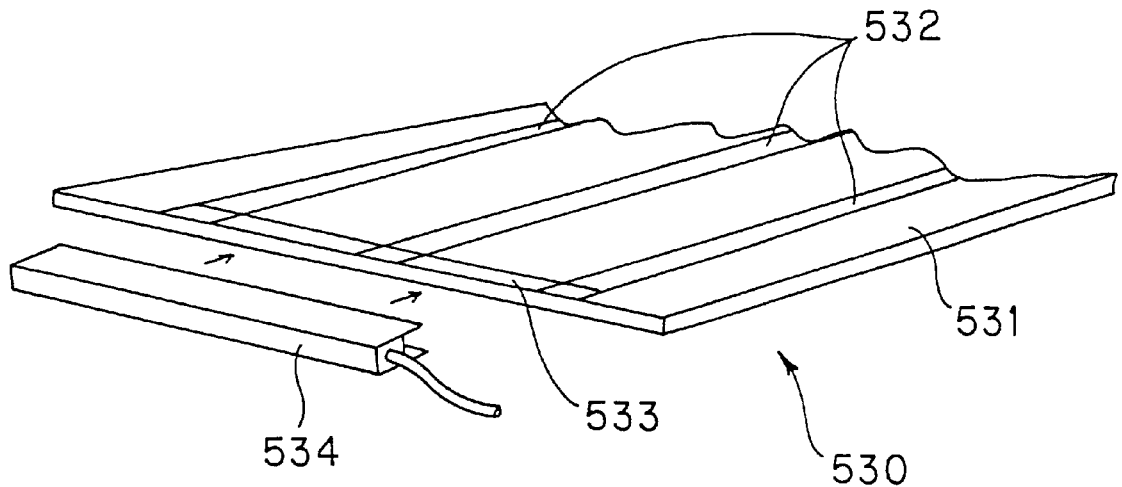
FIG. 74 is an explanatory view showing a state in which a terminal is connected to another glass electrode.
Figure 75:
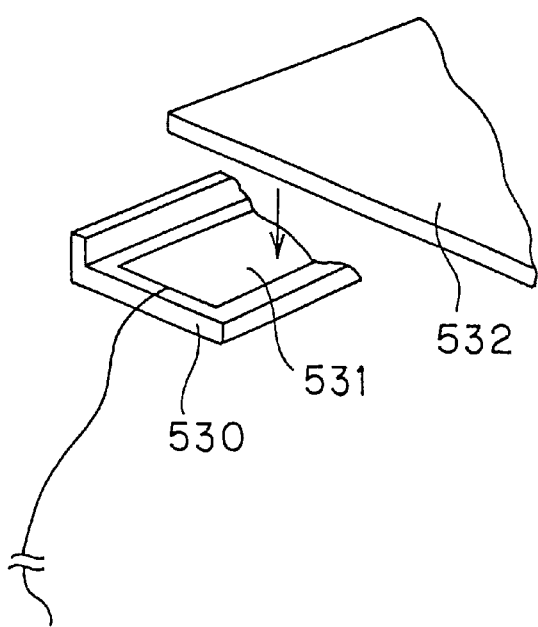
FIG. 75 is an explanatory view showing a case in which a terminal is connected to a normal glass plate.

FIG. 74 shows a glass electrode 530 for a showcase, on which conductive tapes 532, 532, 532 are adhered, on the end portion of which a connecting tape 533 is provided to connect each conductive tape with each other. A connecting terminal 534 of layed U-shaped in section is detachably attached on the tape 533, and the terminal 534 is connected to a high voltage generating device.

It is possible that the glass plate 531 is charged with electrocity in such a manner that an insulated metal terminal 531 is attached to the frame 530 of a conventional showcase, and a glass plate 532 (conductive treatment is not performed) is simply put on the terminal plate 531. The terminal plate 531 can be set on a frame not shown on the opposite side of the glass plate 532. In this case, strength of charge is large at a position close to the terminal plate 531 and the strength of charge becomes small as a position goes far from the terminal plate 531.

Further, the installation of an electrode plate on a showcase will now be explained.

Figure 76:
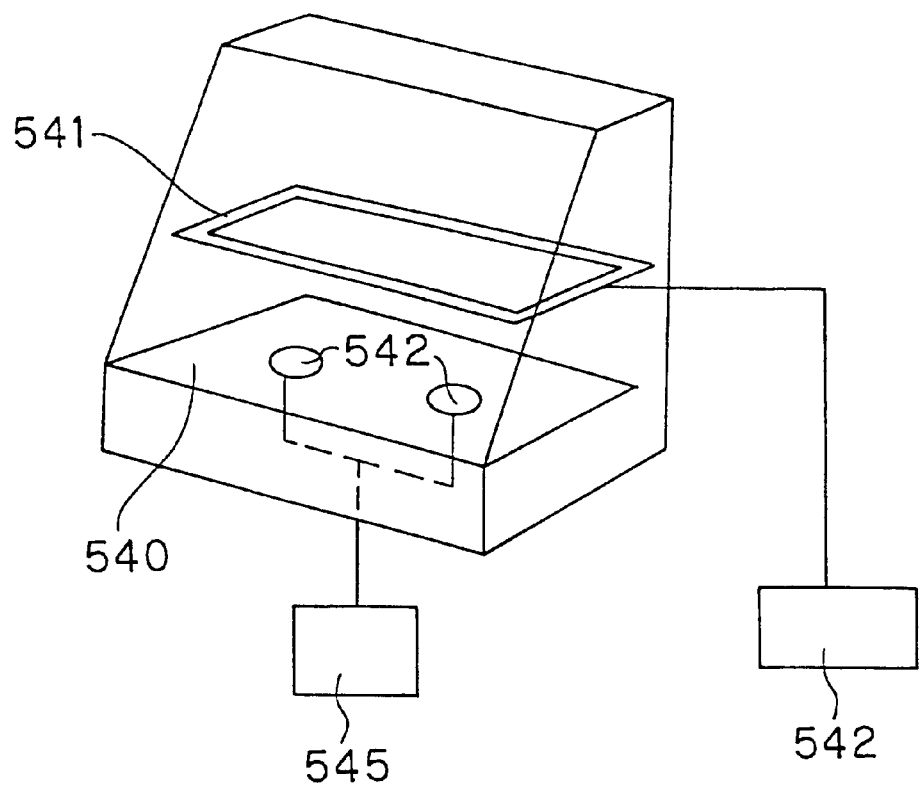
FIG. 76 is an explanatory view showing a case in which a terminal is disposed in a showcase.
Figure 77:
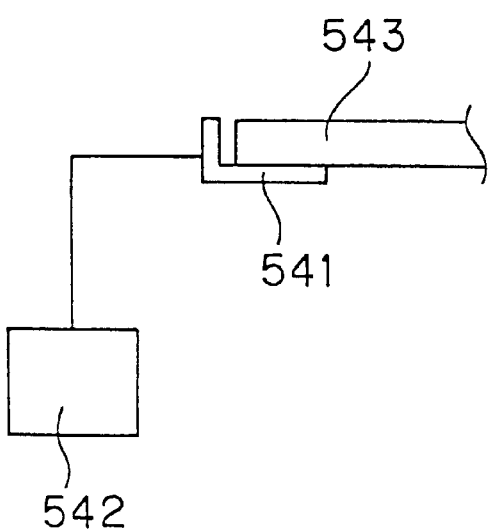
FIG. 77 is an explanatory view showing a case in which a terminal is disposed in a showcase.

As shown in FIGS. 76 and 77, a terminal plate 541 connected to a high voltage generating device 542 is put at the bottom of the showcase, open case or flat case, and an insulating electrode is put on the terminal plate 541. Terminal plates 542, 542 connected to a high voltage generating device 545 can be set on the floor of the showcase so as to contact the electrode plate. This way is suitable for the laminated electrode shown in FIG. 69.

Next, the formation of electrostatic field on a rotary sushi-apparatus will now be explained.

Figure 78:
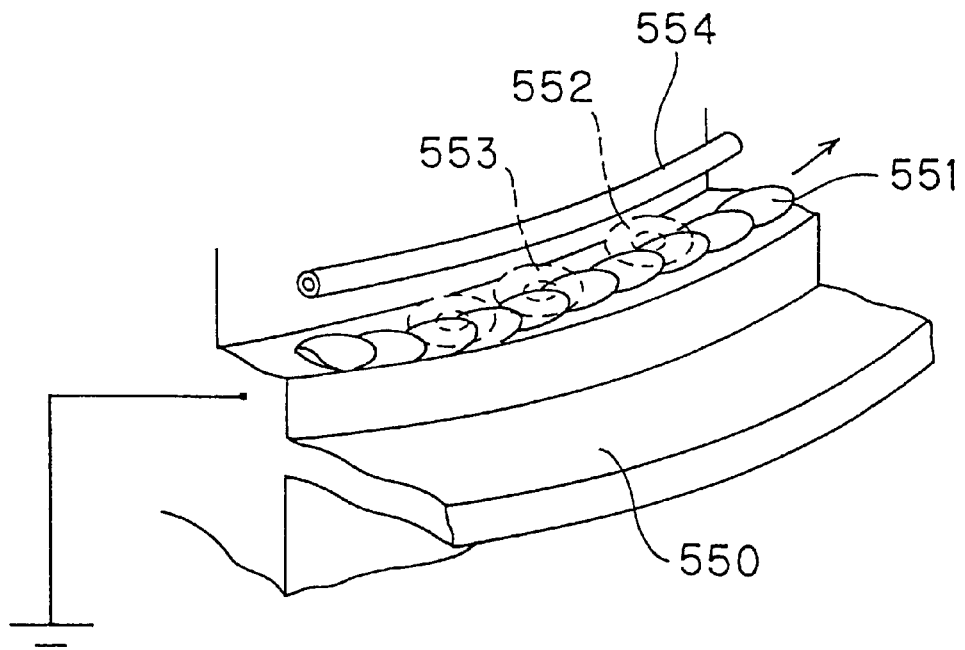
FIG. 78 is a perspective view showing a state in which an electrode is disposed in a rotary-sushi device.
Figure 79:
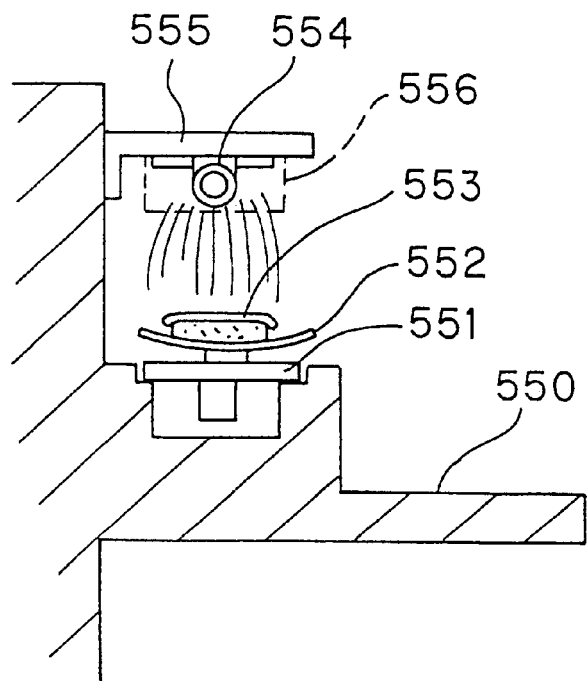
FIG. 79 is a side view of the rotary-sushi device shown in FIG. 78.
Figure 80:
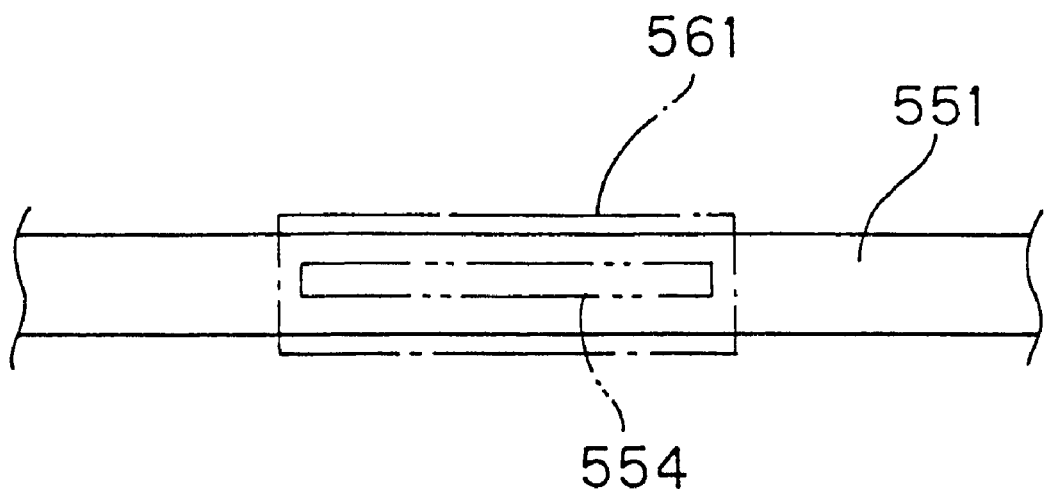
FIG. 80 is an explanatory view showing a state in which an electrode is disposed on the way of a transport path of a rotary-sushi device.

In FIGS. 78 and 79, a numeral number 550 shows a counter of the rotary sushi-apparatus, and a conveyor 551 in the shape of scales is installed adjacent the counter 550. A dish 552 is set on the conveyor as a transfer path, and has a sushi 553 thereon. The counter is grounded, and a pipe-shaped electrode 554 is disposed over the conveyor so as to be supported by a support 555. The electrode 554 is preferably so formed that a good conductive metal is evaporated on the inner surface of the strenghened glass because of a good appearance. A high voltage (1 kV–3 kV) is impressed on the electrode 554 to form an electrostatic field around the electrode 554. Since the electrode 554 is formed in an insulating glass body, a guard 556 is not necessarily required and, however, the guard 556 is preferably provided to prevent hands of guests from contacting the electrode for more safety. Instead of the tube-shaped electrode 554, a normal wire or plate may be used, that is, any conductive bodies can be used. The electrode may be so formed that a conductive body is simply covered with an insulating coating or that conductive body is exposed to air. The guard 556 is not necessarily required in the case of the electrode covered with the insulating coating. The electrode 554 may be provided, as shown in FIG. 80, at a part of the transfer path to form an electrostatic field treatment portion 561 without being provided over the whole of the sushi-transfer path. The electrode 554 is not necessarily provided over the transfer path, that is, it may be provided under and on the side of the transfer path, at any place so long as an electrostatic field is generated.

Figure 81:
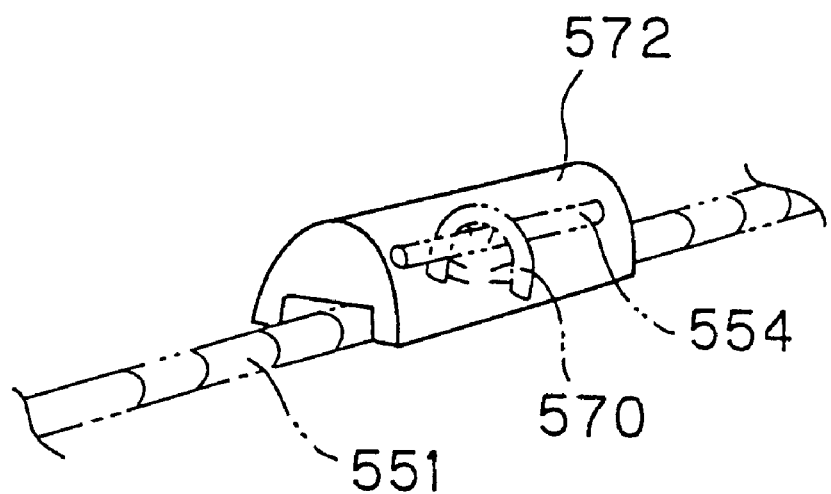
FIG. 81 is a perspective view showing a state in which a dry protection device is disposed on the way of a transport path of a rotary-sushi device.
Figure 82:
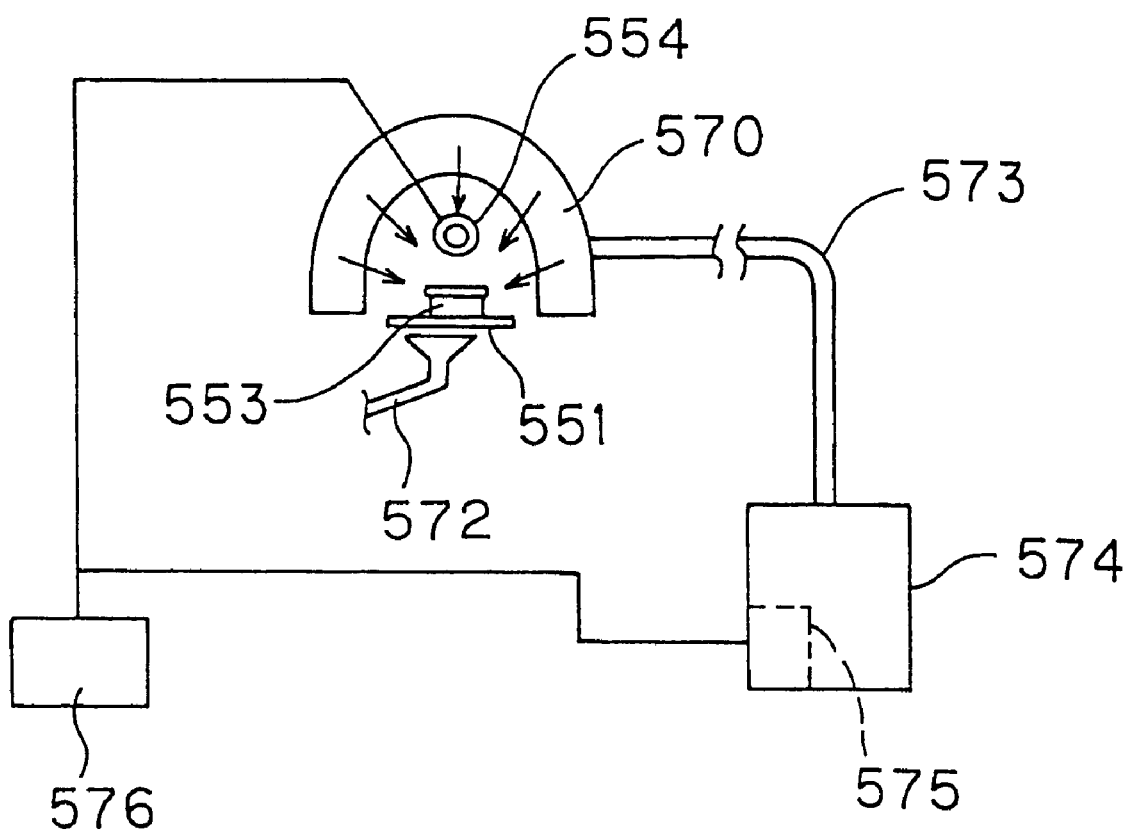
FIG. 82 is a system structural view of a dry protection device of a rotary-sushi device.

The electrostatic field treatment apparatus functions to prevent food from drying. Further, for prevention of drying, as shown in FIGS. 81 and 82, if an electrostatic field is formed in a semicylindrical dome 572 which functions as a drying preventing apparatus for covering a part of the conveyor 551 therewith and fine waterdrops are attached to the sushi 553, drying of sushi can be effectively prevented. That is, an electrode 554 is provided in an upper space of the semicylindrical dome in its longitudinal direction, and a high voltage generating device 526 is connected to the electrode 554. The electrode 554 may be so formed that a metal coating is adhered on the interior of a hollow tube or may be a hollow conductive bar. In its dome 572 is provided a spray tube 570 in the shape of arch, on the inner circumferential surface of which a number of fine holes are provided. The spray tube 570 is connected to a supersonic wave spray apparatus 574, through a tube 573, which has a water tank 575 connected to a high voltage generating device 576. Thereby, electron-charged water is made. As a method of making the electron-charged water, the water may be so made that an electrode is directly inserted into water or it is attached to the outer wall of the water tank in a state wherein the whole of the water tank 575 is in the state of insulation. The electron-charged water is changed into fine waterdrops, by a supersonic vibration, which are supplied to the electrostatic field atmosphere from the spray tube 570 through the tube 573 to be charged with electrocity and to be attached on the sushi 553 charged with a reverse voltage. A suction tube 572 may be provided at a proper position to prevent the waterdrops from flowing out of the dome 570.

Next, the disposition of an insulating electrode in a refrigerator or case will now be explained.

Figure 83:
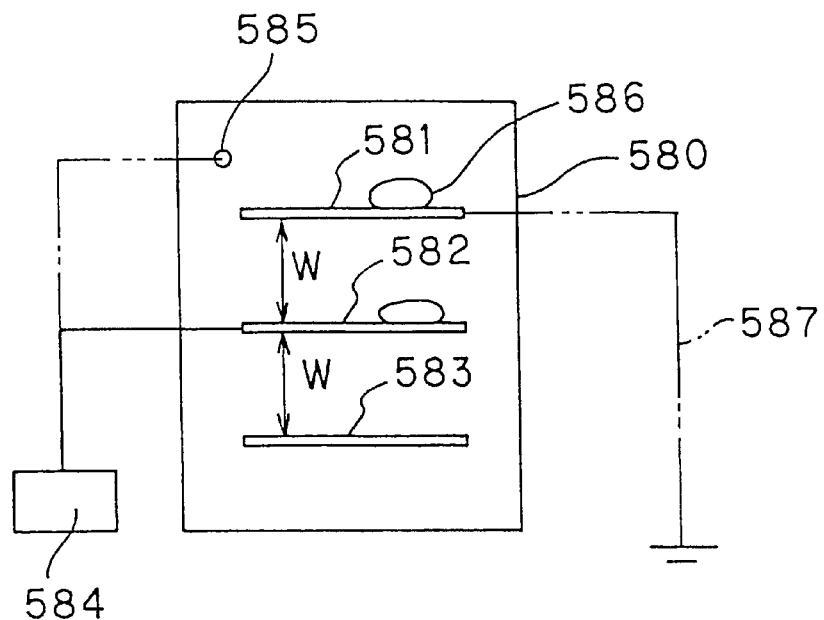
FIG. 83 is an explanatory view showing a state in which an electrode is disposed in a refrigerator.
Figure 84:
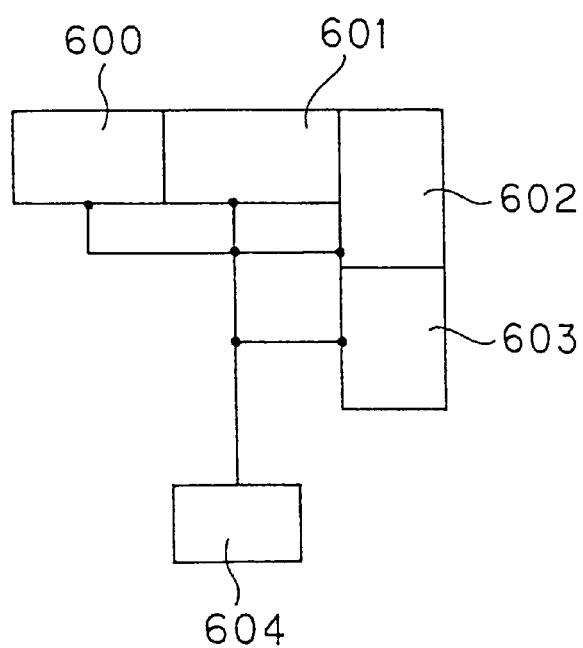
FIG. 84 is an explanatory view showing a system in which a charged voltage is changeable.

FIG. 83 shows a refrigerator (case) 580 as a food storing apparatus In which three electrodes 581, 582, 583 forming three shelves are disposed in an upper and lower direction (the shelf itself is an electrode plate), and the center electrode 582 is connected to a high voltage generating device 584. An electrostatic field is generated at upper and lower positions of the electrode plate 582 to induce the upper and lower electrodes 581, 583. The induced voltage of the electrode plates 581, 583 is inversely proportional to the square of distance W separated from the center electrode 582. That is, as the distance W becomes large, the voltage in the electrostatic field decreases to lower the induced voltage. If the distance W separated from the electrode plate 582 connected to the high voltage generating device 584 is adjusted in this manner, the adjustment of voltage impressed on an object 586 to be treated becomes possible. In this case, the upper and lower electrode plates 581, 583 are simple shelves, and, however, they must be held in the refrigerator in an insulated state. If the upper shelf 581 is grounded by an earth wire 587, the voltage drops through the shelf 581, and, therefore, the upper position of the shelf 581 is not charged with electricity. Namely, if it is desired that a part of the refrigerator is not charged with electricity, the part is partly grounded. Especially, alcohol is matured in a refrigerator for domestic use. If the maturing of alcohol is not desired, a room for alcohol is grounded to protect the influence from an electrostatic field. For example, in a refrigerator, a voltage of 5000V is impressed on the lowest shelf connected to a high voltage generating device to use the lowest, intermediate and the upper shelves for thawing, freshness-keeping and freshness-keeping, respectively. Namely, when the thawing of an object on the lowest shelf is finished, it is moved to a shelf of low voltage on which a voltage is not directly impressed for freshness-keeping. The optimum voltage depends on the kind of vegetable and meat, and, therefore, various voltages can be impressed on shelves in a refrigerator according to the above way. At a proper position of the refrigerator is provided a light sensor 585 by which the high voltage generating device 584 is turned off when a door is opened. It is possible that the high voltage generating device 584 is connected to either the upper or lower electrode plates 581, 583.

Figure 85:
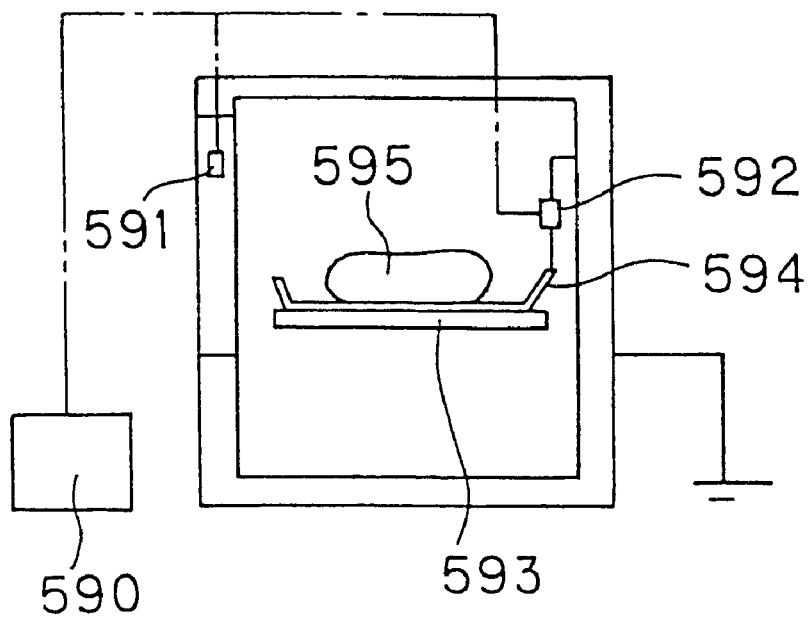
FIG. 85 is a structural view of a refrigerator in which a direct current power source is used as a high voltage generating device.
Figure 86:
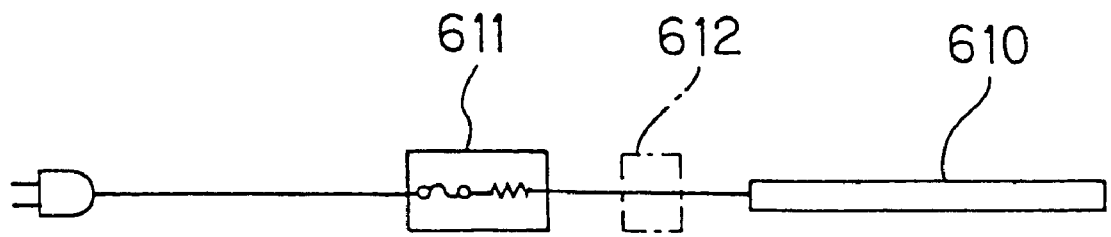
FIG. 86 is an explanatory view showing a state in which an electrode is directly connected to a power source for domestic use.

FIG. 85 shows an electrostatic treatment method of using a high voltage generating device of direct current, and a shelf 593 forming an insulating electrode has a pan 594 thereon in which an object 595 to be treated is accommodated. The pan 594 is connected to a switch circuit 592 which is connected to a wall of a refrigerator and a high voltage generating device 590 and also connected to a sensor 591 provided on the door of a refrigerator. When the door is opened, a switch circuit 592 is turned on, and the pan 594 is grounded. In the case of the use of a direct current electric power, electric charge of the same pole is stored in the object 595, and it is necessary that the object 595 is discharged through the pan 594. In the case of the use of a bare electrode 593, the pan 594 is not necessary, and the electrode 593 is directly connected to the switch circuit 592. Normally, electric charge is changed alternately to plus and minus values to be preferably neutralized, and a direct electric current is suitable for some objects. It is found that the freshness of plants such as fruits, flowers, etc. can be kept in a weak electrostatic field, and, therefore, as shown in FIG. 86, the electrostatic field treatment apparatus may be so formed that a normal domestic electric power (100V) is connected to an insulating electrode 610 through a safety device 611 for prevention of an overcurrent. This apparatus can be effectively used as an electrostatic field mattress. That is, the electrode 610 may be formed as a thin electrode plate to be set between a sheet and a mattress. Furthermore, it can be adapted for a cushion and a bustle for a chair. Food including much water such as malts and radishes can be freshness-kept by a voltage of less than 100V, and, therefore, in this case, a domestic electric power of 100V is used so that the voltage is decreased with a transformer.

Figure 87:
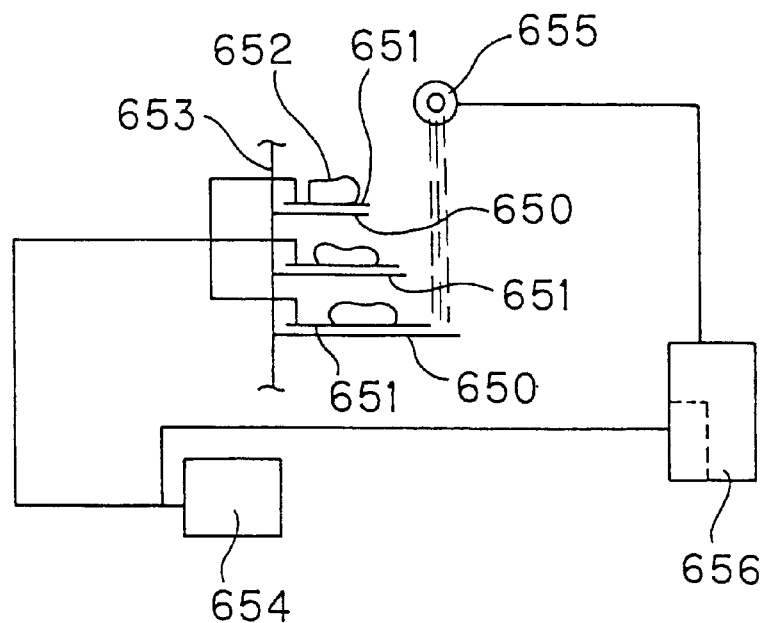
FIG. 87 is a system view showing a state in which an electrode plate and a spray pipe are disposed in an open showcase.

FIG. 87 shows an open case for a supermarket.

An open case 653 has shelves 650, 650, 650, on which electrode plates 651 are mounted, and objects 652 to be treated are put on the electrode plates 651 which are connected to a high voltage generating device 654. At the front and above position of the open case 653 is provided a spray member 655 to which waterdrops are supplied from a supersonic spray device 656, and the fine waterdrops sprayed from a spray tube are charged with electrocity by an electrostatic atmosphere formed above the shelves so as to be attached to food displayed on the shelves. Since the electrostatic field has an antibacterial function, the waterdrops sprayed can be effectively prevented from being polluted from bacillus. If an electrostatic field is formed in the supersonic spray device 656 to make electrostatically charged water therein, more effect can be obtained.

Figure 88:
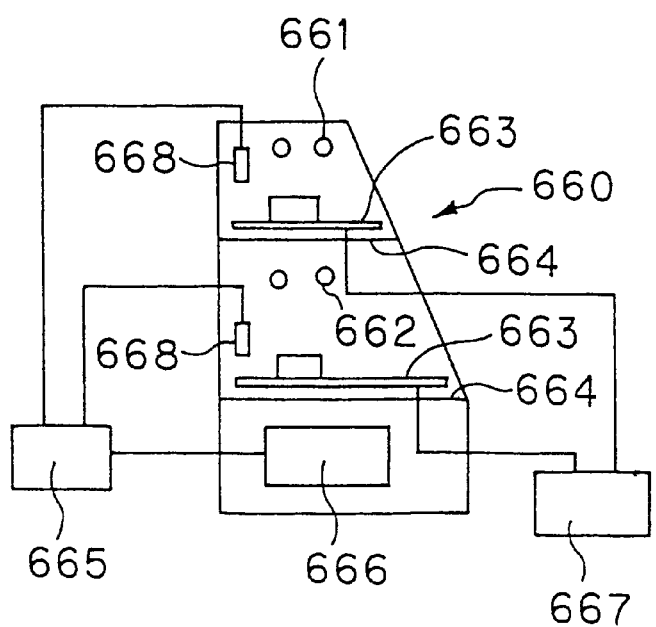
FIG. 88 is an explanatory view showing a control system for a showcase.

FIG. 88 shows a closed-type showcase 660 in which insulating electrodes 663, 663 are put on the shelves 664, 664 of the showcase, and the electrodes are connected to a high voltage generating device 667. Instead of (or In addition to) an electrostatic atmosphere being formed in the showcase by the insulating electrode 663, electrode bars 661, 662 which are connected to a high voltage generating device 667 may be disposed in the showcase. In the showcase are provided sensors 668, 668 which control a refrigeration system 666 through a controller 665 when the electric field intensity becomes lower than a predetermined value. That is, in an electric field, cakes are not frozen at a temperature of approximately −3° C., and, accordingly, they can be stored at such a temperature. In this manner, in case that it is desired that they are stored at a minus temperature, they are frozen when the electric field strength becomes small. Therefore, at this time, the sensors 668 detect its decrease to operate the refrigeration system 666 so as to raise the temperature of the interior of the showcase to a plus range of temperature. For example, in this case, the rotational number of a compressor in the refrigeration system is decreased or an expansion valve is operated. The cakes are not frozen instantly when an electric field is broken because of residual effect. If the eletrodes 663, 663 on each shelf are connected in series to a high voltage generating device 667, the sensor 668 may be provided on one of the shelves.

Figure 89:
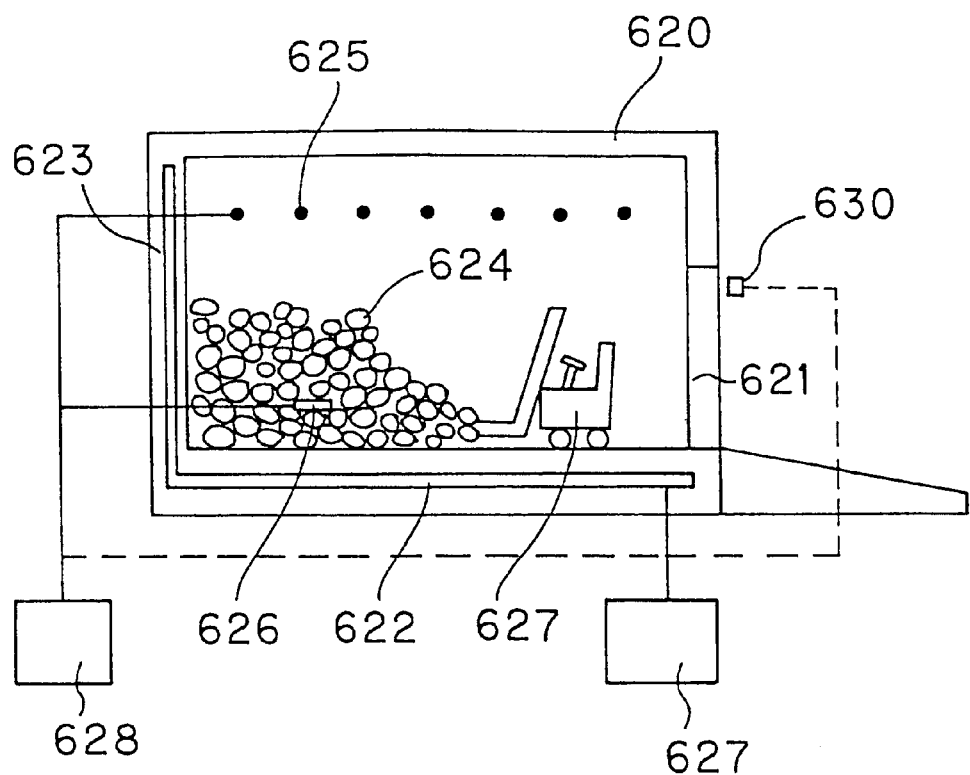
FIG. 89 is an explanatory view showing a structure for making an electrostatic field atmosphere in a large-size refrigerator.
Figure 90:
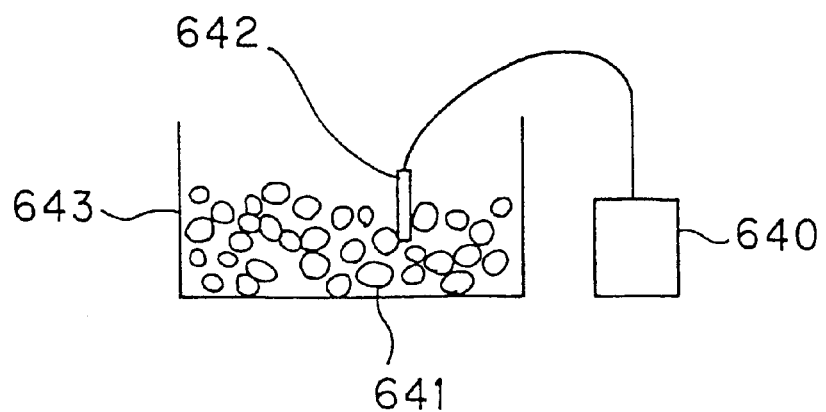
FIG. 90 is an explanatory view showing a way in which a voltage is impressed on potatoes and oranges.
Figure 91:
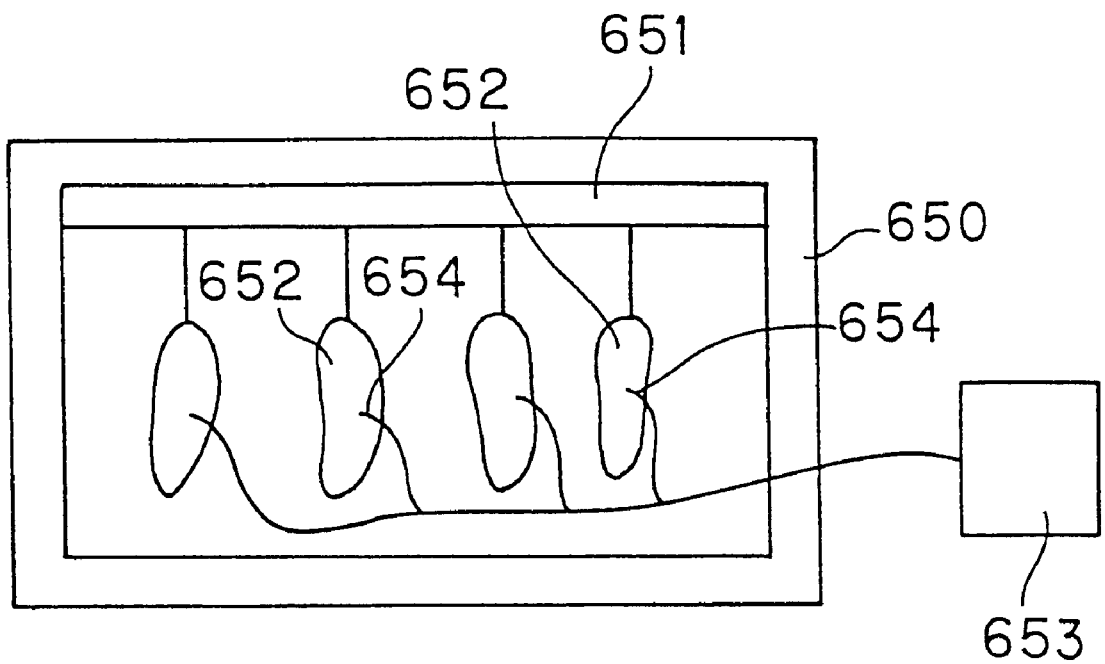
FIG. 91 is an explanatory view showing a way in which a large object is treated in an electrostatic field.
Figure 92:
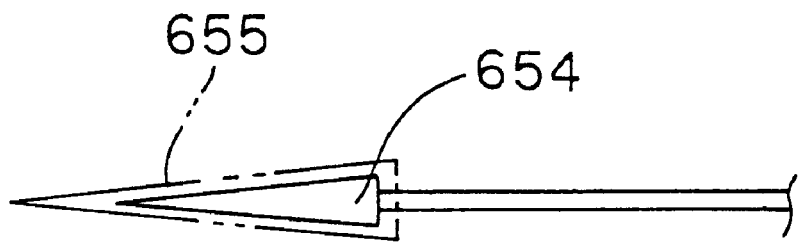
FIG. 92 is an explanatory view of a needle which is used for the electrostatic field treatment shown in FIG. 91.

FIG. 89 shows a large warehouse which has an outer wall 620 whose part forms a door 621. The floor of the warehouse is made of insulating member, and a conductive electrode plate 622 is buried in the floor. The electrode plate 622 is formed uprightly in the side wall of the warehouse. The side wall 623 of the warehouse is also made of an insulating member and vegetables such as potatoes and onions are accommodated in the warehouse. Insulated (bare) electric wires 625 are disposed in the warehouse to form an electrostatic field in the air of the warehouse. A bar-like or plate-like electrode 626 which is bare or covered with an insulating coating is inserted into the vegetables 624. The electrode 626, insulated (bare) electric wire 625 and the electrode plate 622 are connected to high voltage generating devices 628, 629, respectively, to impress a high voltage on the respective electrodes 622, 625, 626. It is not necessary that all these electrodes are provided, and either one may be provided. The door 621 has a safety switch 630 which stops the impression of a voltage thereon from high voltage generating device 628, 629 when a forklift goes into the warehouse with the door being opened. In order to form an electrostatic field to objects such as potatoes and oranges, accommodated in a large case, as shown in FIG. 90, an electrode 642 which is bare or covered with insulating coating is inserted into the objects 641, to be treated, contacted with each other in an insulating box 643, and the electrode is connected to a high voltage generating device 640. With respect to a method of impressing voltage on large pieces of meat such as beef and pork, as shown in FIG. 91, the large pieces of meat are suspended from a ceiling 651, and a needle 654 as shown in FIG. 92 for each piece 652 is connected to a high voltage generating device 653. In case that each piece contacts with each other, and one of them is stuck with the needle 654, all pieces can be charged with electrocity because the piece includes water to facilitate the flow of an electric current.

Figure 93:
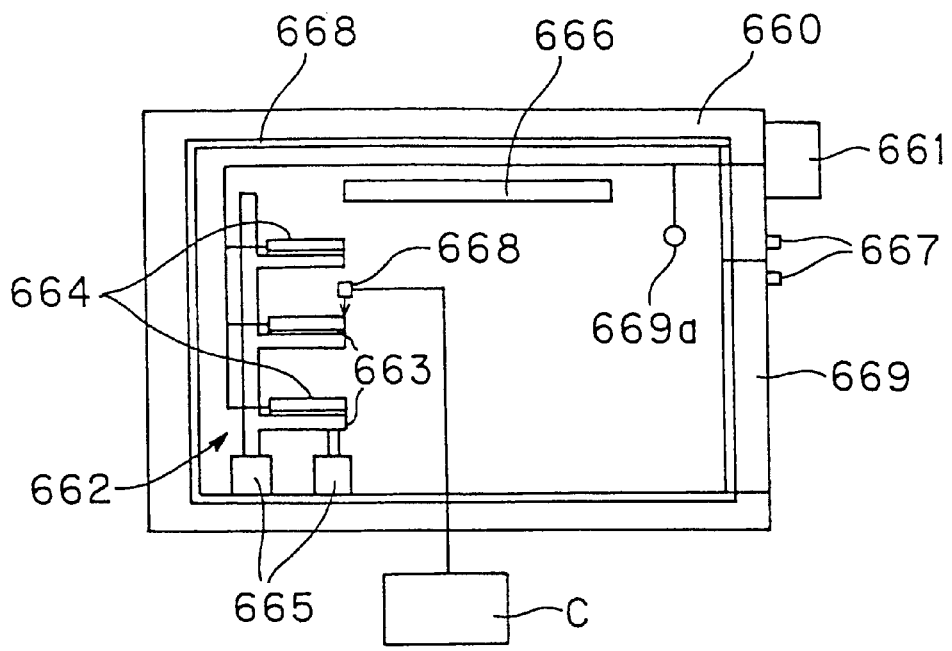
FIG. 93 is a structural view of a prefab refrigerator.

FIG. 93 shows a prefab refrigerator which has a diabetic wall 660 whose inner surface is, as occation demands, covered with an insulating plate 668 such as vinylchloride plate. A movable rack 662 is disposed in the refrigerator, and is insulated from the floor with insulating legs. The rack 662 has shelves 663, - - - 663 on which the above insulated electrodes 664 - - - 664 are put on the shelves 663, and an object to be treated is put on each insulated electrode 664. As occasion demands, an electrode may be eliminated from one shelf so that a voltage of the electrode on the shelf is induced on the other metal shelf. In order to form an electric field in the whole portion of the refrigerator, an electrode 666 may be suspended from the ceiling as occasion demands. Each electrode 664 is connected to a high voltage generating device 661 which is turned on or off in response to the operation of a proximity switch (limit switch) and a light sensor 669a. That is, when the door 669 is opened, the high voltage generating device 661 is turned off, and when the door is closed, the high voltage generating device 661 is turned on. A known sensor 668 is provided above at least one electrode 664 on the shelf to measure electric line of force thereof, and when the measured value becomes a value less than a predetermined value (when the electric field is broken), the refrigeration system is operated to raise a temperature in the refrigerator to a temperature more than 0° C., so that the objects to be treated are not frozen.

Figure 94:
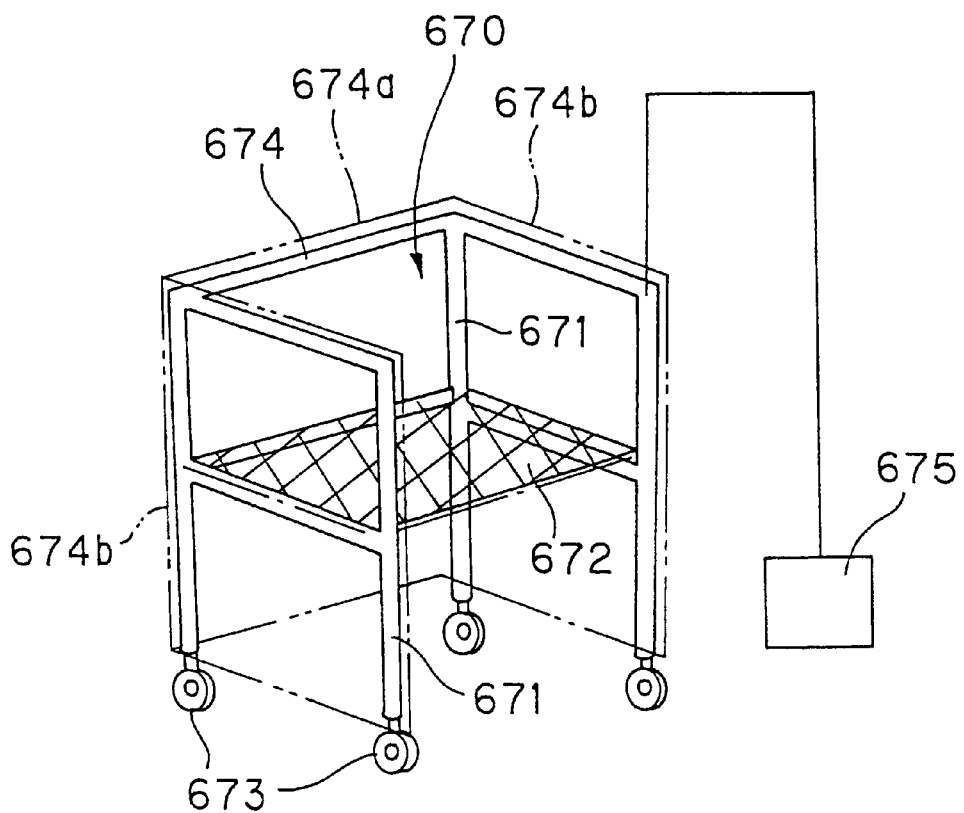
FIG. 94 is a perspective view of a rack which is provided in a prefab refrigerator.

With respect to a rack accommodated in a large refrigerator including a prefab refrigerator, a rack 670 shown in FIG. 94 has supports 671, 671 - - - 671 made of metal pipes which hold a metal shelf 672. Each support 671 has, at its lower end, a caster 673 made of insulating body, which supports the rack from the floor in the refrigerator in an insulating state. The back face and both side faces are covered with an insulating plate (body) 674 such as vinylchloride, ABS resin and the like in such a manner that an electric current does not flow when the object to be treated contacts a conductive thing located around the rack. The insulating body 674 is not necessary in case that the inner wall of the refrigerator is covered with an insulating plate and the rack is separated enough from the inner wall of the refrigerator. The shelf 672 may be detachably disposed on the supports 671 in a sliding manner, and may be disposed so that its vertical position can be adjusted with respect to the supports 671.

Figure 95:
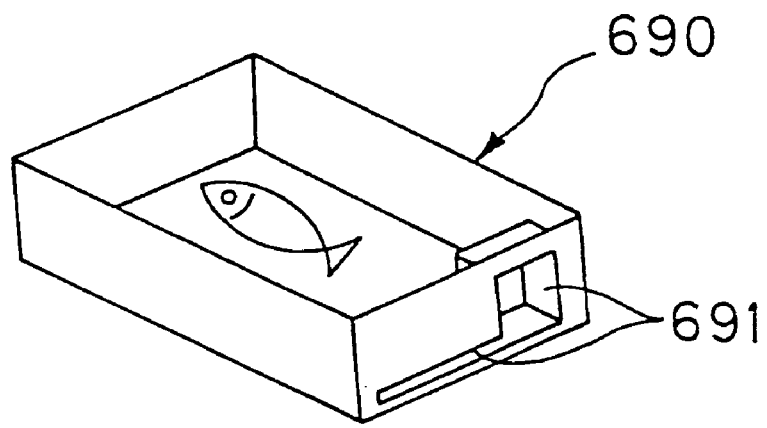
FIG. 95 is a perspective view of a fish box which is so formed that an electrode is arranged therein.
Figure 96:
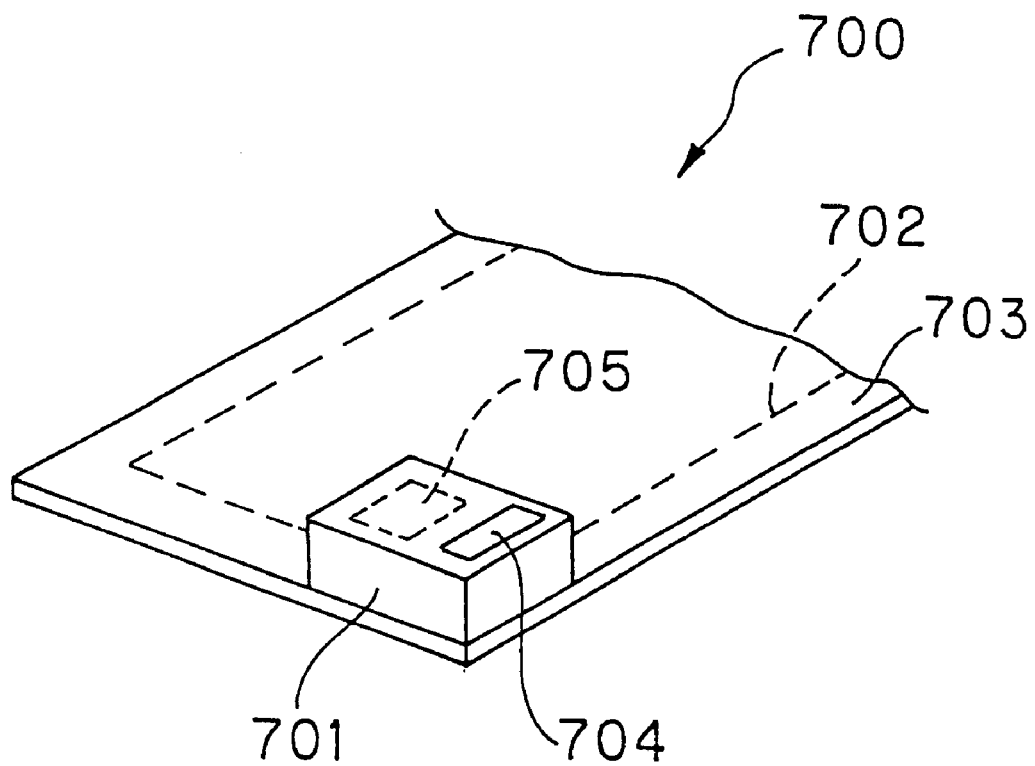
FIG. 96 is a perspective view of an electrode with a battery.
Figure 97:
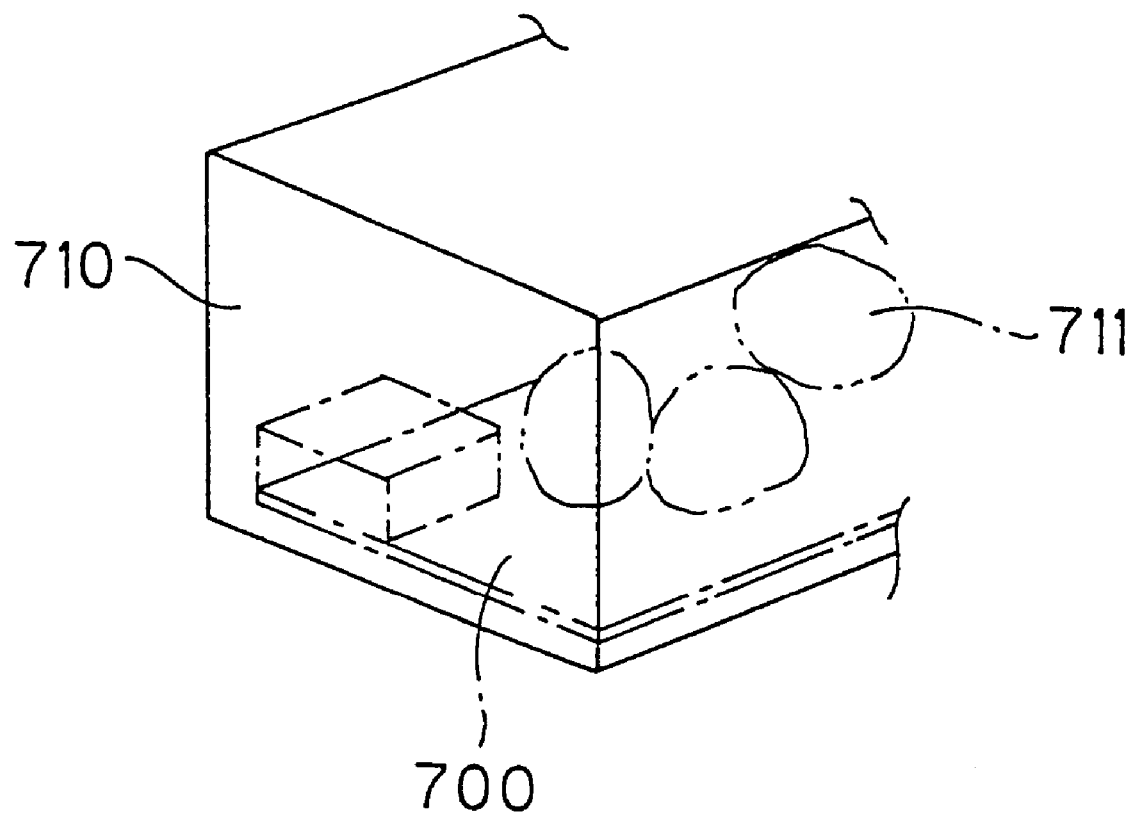
FIG. 97 is an explanatory view showing a state in which an electrode with a battery is arranged in a cardboard box.
Figure 98:
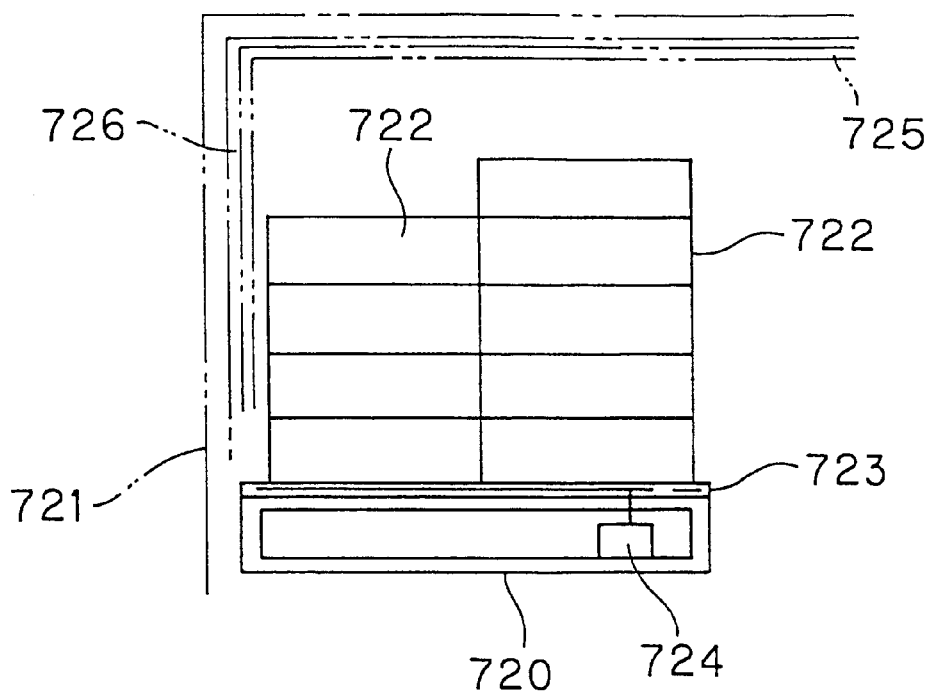
FIG. 98 is an explanatory view showing a state to form an electrostatic field in a refrigeration container.

FIGS. 95 and 96 relate to an electrostatic field freshness-keeping system in distribution process of food, and FIG. 95 shows a fish, vegetable or fruit box 690. At the bottom of the fish box 690 is sidably provided a portable electrode 700 which has a machine portion 701 provided with a battery-type transformer, and an electrode plate 702 covered with an insulating coating 703 is connected to a high voltage generating device. The machine portion 701 comprises a battery accommodating portion 704 and a transformer accommodating portion 705. As a battery, a solar cell can be used, and the electrode 700 is inserted into an opening of the side face of the fish box through an opening 691. Fishes may be freshness-kept in a manner that the electrode 700 is put directly on the fish box 690 on which fishes are located directly. FIG. 97 shows a state in which fruits are put into a cardboard box 710, on the bottom of which the electrode 700 is located. The electrode 700 must be provided per each box when a box for accommodating food is delivered by itself. That is, as shown in FIG. 98, when boxes 722 are delivered in a refrigeration container, the boxes 722 which are formed conductive are piled up on a pallet 720, and these boxes 722 are put on an electrode 723 located on the pallet 720. In the pallet is provided a high voltage generating device 724 of charging type by which a high voltage is impressed on the electrode 723 to form an electrostatic field in the whole portion of a box through the circumferential wall of each box 722. It is preferable that the inner wall 725 of the container 721 is covered with an insulating plate such as vinylchloride. In order to form an electrostatic field in the whole portion of the container, an electrode 726 may be buried in the wall of the container so that a high voltage is impressed on the electrode 726.

Figure 99:
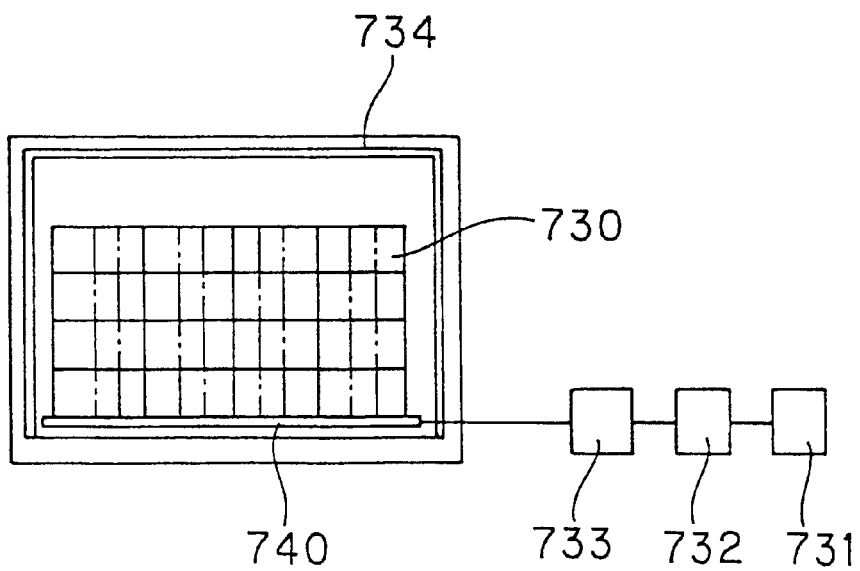
FIG. 99 is an explanatory view showing another state to form an electrostatic field in a refrigeration container.

In case that a pallet is not used in a refrigeration container such as a truck, as shown in FIG. 99, an electrode plate 740 is provided on the floor of a refrigerator or a container in an insulating state, and cardboard boxes 730 are mounted on the electrode 740. At this time, the electrode 700 in FIG. 97 is not necessary. In case that only a direct current power source 731 can be obtained in a truck and the like, a high voltage generating device 733 is operated through an alternating electric current transducer 732. Also in this case, the inner wall 734 of the container is preferably made of an insulating body.

Figure 100:
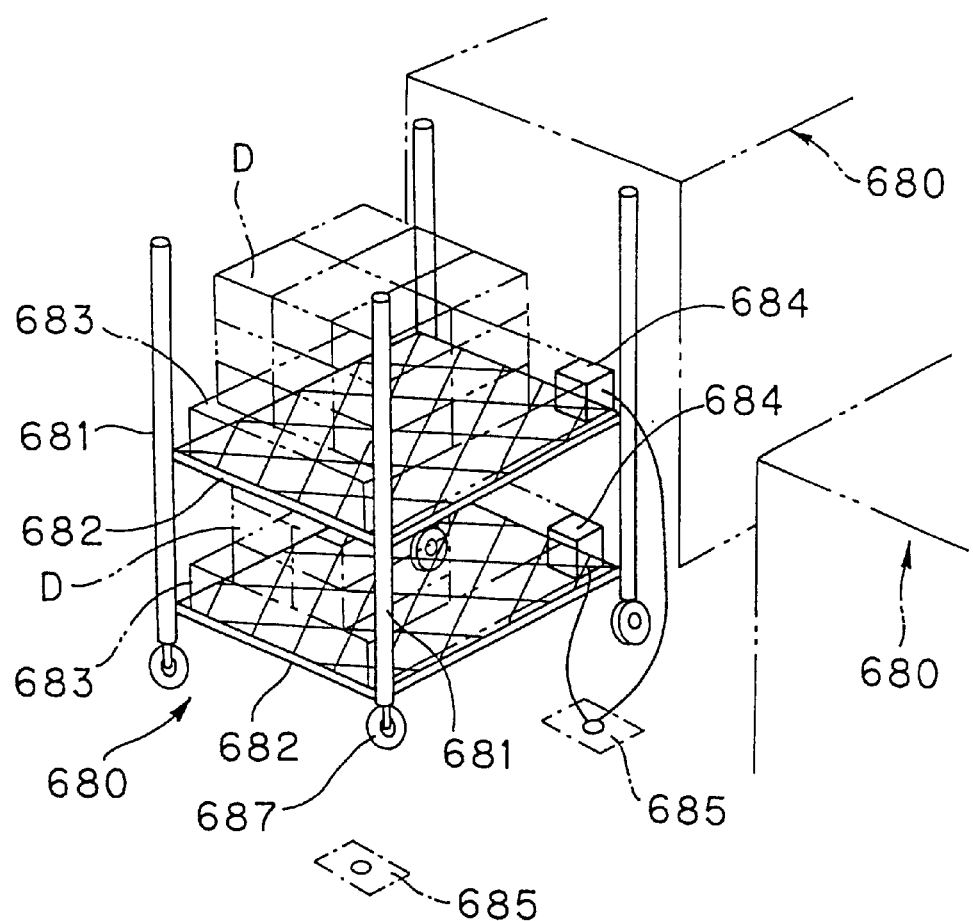
FIG. 100 is a perspective view of the interior of a large-size refrigerator in which an electrostatic field is formed.

FIG. 100 shows a state in a large refrigerator such as a refrigeration warehouse. In general, fruits such as apples and a kind of vegetables are stored in a refrigeration warehouse in a state that they are accommodated in cardboard boxes. Cardboard boxes D put on pallets 683, - - - 683 are piled up on, e.g., shelves 682, 682 - - - 682 of support frames 680.

Each support frame 680 has vertical supports 681, -681, which hold the shelf 682, and insulating casters 687 - - - 687 are provided at the ends of the supports 681. The support frames 680 are disposed in raw in the refrigeration warehouse, and control boxes 68S are provided at an intermediate position of the floor between the disposition of the support frames 680. Voltage of 100V is supplied to a high voltage generating device 684 from a control box 685. The control boxes are buried in the floor so as not to obstruct the movement of a forklift. The control box may be suspended at a predetermined distance from the ceiling.

Figure 101:
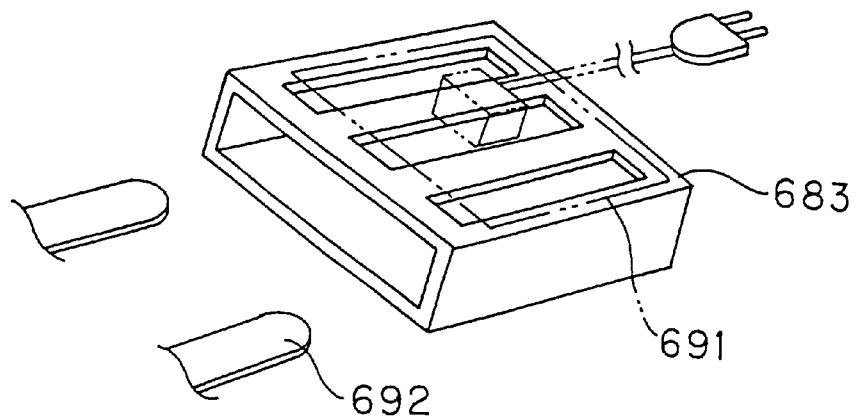
FIG. 101 is a perspective view showing a state in which an electrostatic field is formed in a pallet.
Figure 102:
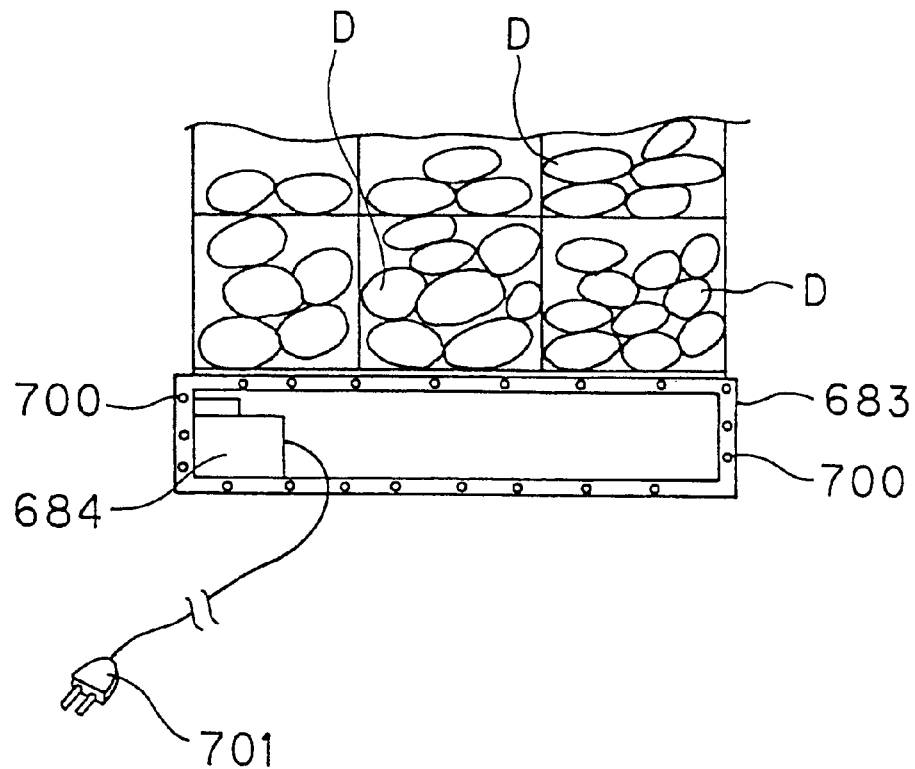
FIG. 102 is a explanatory view showing a state in which cardboard boxes are piled on a pallet.
Figure 103:
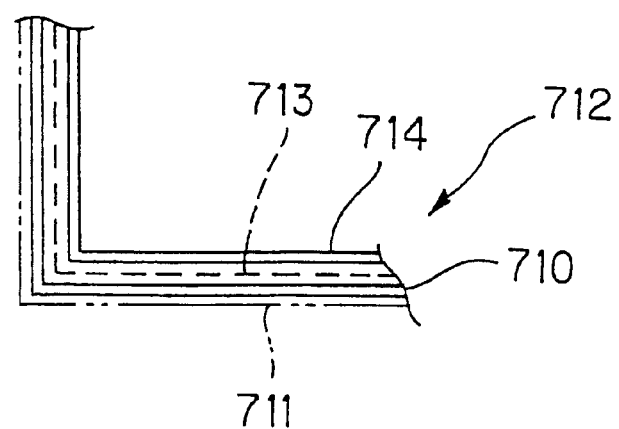
FIG. 103 is an explanatory view showing a state in which an electrode is arranged in a cardboard box.
Figure 104:
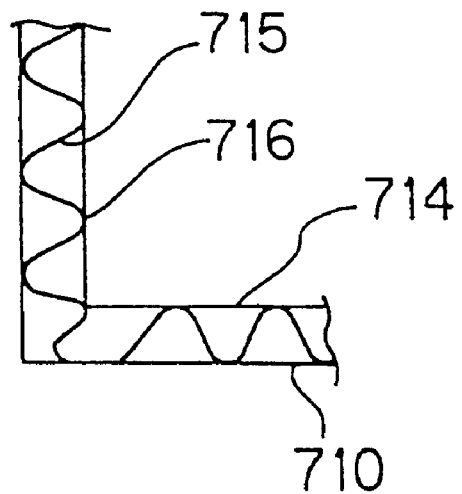
FIG. 104 is an explanatory view showing a state in which an electrode is arranged in a cardboard box.

Each pallet 683 is, as shown in FIGS. 101 and 102, made of plastic, and a bare electric wire 700 is buried in the pallet 683 so as to be connected to a high voltage generating device provided in the pallet. This high voltage generating device 684 is a charging-type one, and can be charged by connection of an electric power source of 100V through a consent 701 when the objects to be treated are piled in the warehouse. An electrostatic field of direct electric current by DC voltage is formed when the objects are delivered. The fork 692 of a forklift is inserted into the pallet. The pallet 683 is made of plastic, and an iron plate 691 as an electrode may be put on the pallet. The objects to be treated are accommodated in a cardboard box D as an accommodating body (box) which is mounted on the pallet 683. A part of the wall of the cardboard box is formed conductive, and if each cardboard box is formed conductive, an electric field can be formed in all cardboards boxes. That is, if the cardboard boxes piled contacted with each other (even if they do not contact each other, an electric field is induced when the conductive portions come close to each other), an electric field is generated in all cardboard boxes. The objects can function as an electrode, and an electric field is generated through the objects. There are various ways for making conductive the wall of a cardboard box, and, for example, a conductive sheet 711 may be adhered on the outer wall 710 of the cardboard box,. In addition, a conductive sheet may be buried into the wall 710 of the cardboard box, and metal powders may be buried into the wall of the cardboard box. As shown in FIG. 104, conductive powder may be mixed with paste 716 for adhesion of a connecting paper 715 for connecting the outer wall with the inner wall, and letters on the outer wall 710 may be written with conductive ink.

Figure 105:
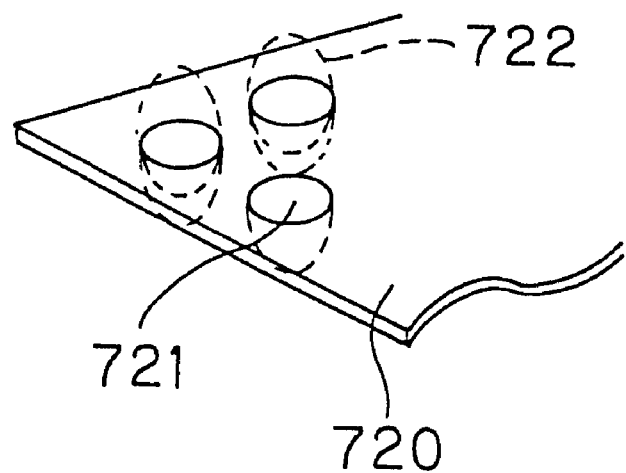
FIG. 105 is a perspective view of an egg accommodating plate.

As shown in FIG. 105, e.g., an accommodating plate 720, for holding eggs, which is provided in a cardboard box may be formed conductive. That is, an accommodating plate accommodated in a large box may be formed conductive.

Figure 106:
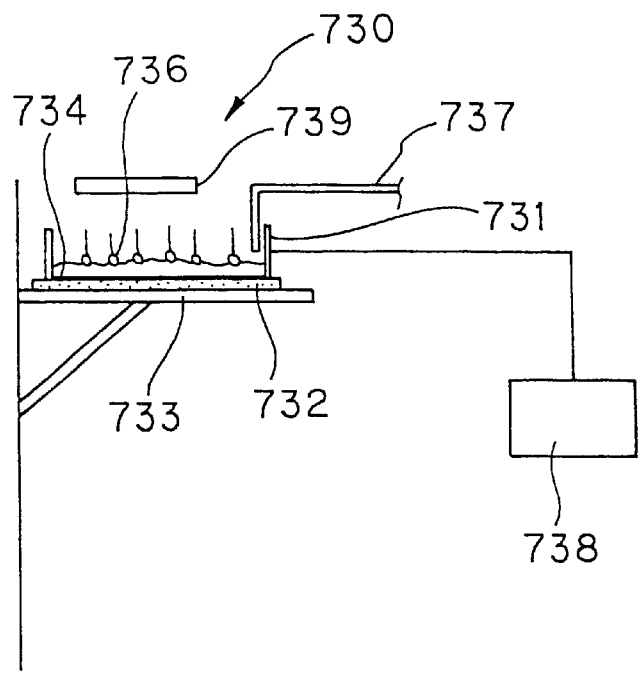
FIG. 106 is an explanatory view of a germinating device in which an electrostatic field is formed therein.

FIG. 106 shows a germinating apparatus 730 in which malt, radish and horseradish for water cultivation are cultivated. That is, the germinating apparatus 730 has a vessel 731 in which water including material 734 is provided on which seeds are put. Water is supplied to the water including material 734 through a tube 737, and the supplied water is charged with electron by connecting the vessel 731 to a high voltage generating device 738 to make electron-charged water. Vegetables cultivated with the electron-charged water grow more quickly and can be freshness-kept because water in the vegetables is changed to water different from normal water. Especially, if malt, radish and the like for water cultivation are put in a cardboard box, refrigerator and open case for a supermarket in an electrostatic field, the freshness can be remarkably well kept. In FIG. 106, the electron-charged water is used as water for water cultivation, and, however, it is desirable that an electrode 739 connected to a high voltage generating device 738 is disposed over the plants to be cultivated to form an electrostatic atmosphere in a space.

Figure 107:
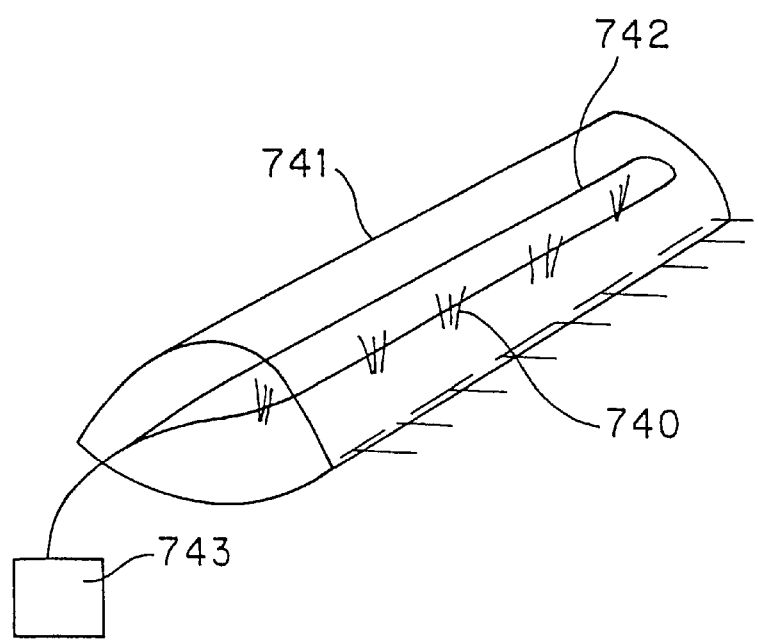
FIG. 107 is an explanatory view showing a state in which plants are grown in an electrostatic field.

FIG. 107 shows a state of cultivation of plants. When plants are cultivated in an electrostatic field, they grow well, and noxious insects can be eliminated upon growing. That is, a plant 740 is covered with vinyl 741 to form a closed space in which a conductive wire 742 is disposed, and conductive wire is connected to a high voltage generating device 743. Plants grow remarkably well in such an electrostatic atmosphere.

Figure 108:
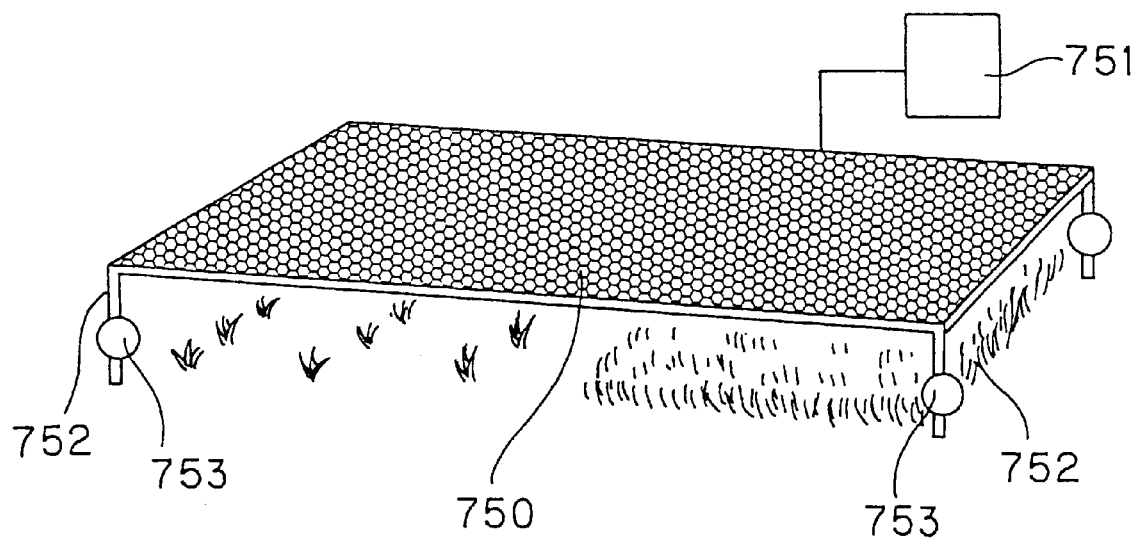
FIG. 108 is an explanatory view showing a state in which plants are grown in an electrostatic field.

As shown in FIG. 108, plants may be so cultivated that a metal net 750 covered with vinyl is disposed over a seedbed for rice or a place where other vegetables are planted in an insulated manner from earth, and the metal net 750 is connected to a high voltage generating device 751. It is found that plants grow well even if the same plants are cultivated in the same place. The metal net 750 is supported by a support 752, and an insulating body is provided at an intermediate portion of the support 752 to support the metal net in an insulating manner to earth.

Figure 109:
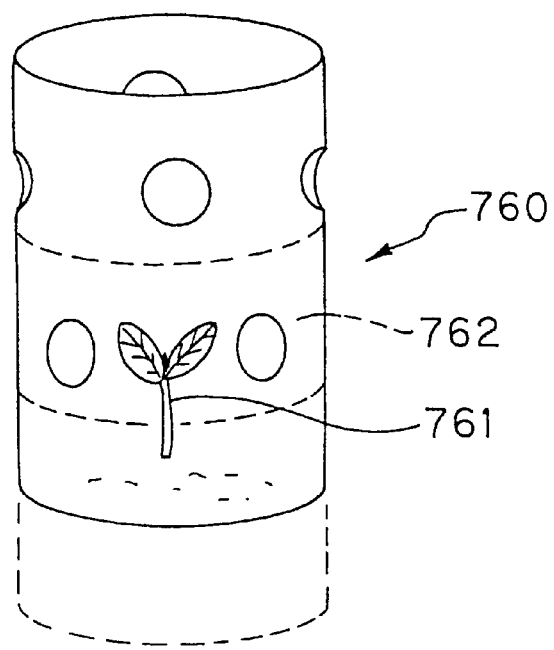
FIG. 109 is a perspective view of a cultivation cylinder in which an electrode is arranged.
Figure 110:
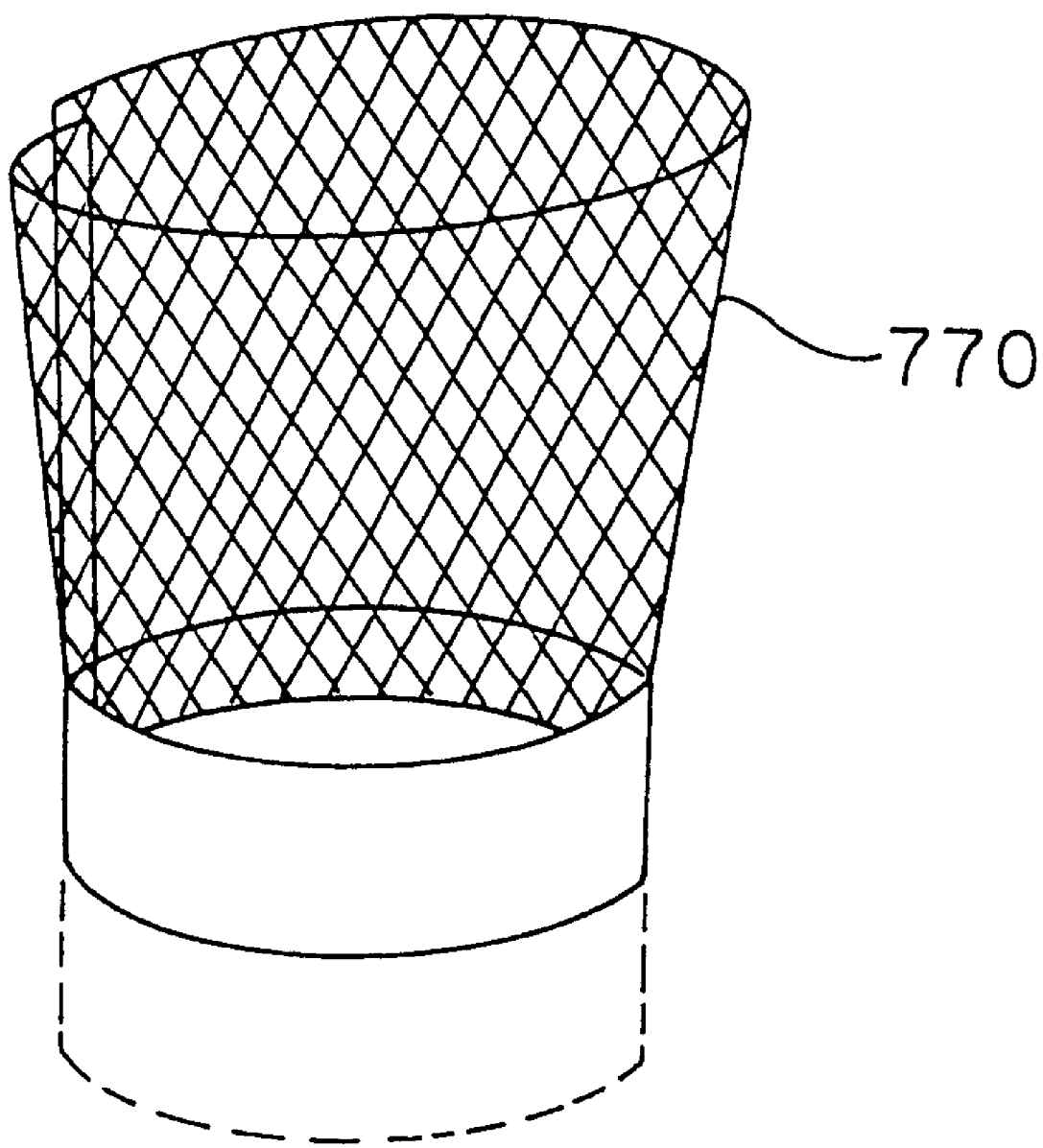
FIG. 110 is a perspective view of a cultivation cylinder in which an electrode is arranged.

FIGS. 109 and 110 show a cultivating cylinder 760 for plants, which is made of, e.g., transparent insulating member such as plastic, and whose bottom is inserted into the earth in a state of accommodating a plant 761. A conductive body 762 is provided on the inner or outer circumferential surface in the shape of a band, and a high voltage is impressed directly or indirectly on the conductive body 762. As shown in FIG. 110, a metal net 770 may be provided at the upper portion of the cultivating cylinder so that a high voltage is impressed on the metal net 770. If a seedling is cultivated in an electric field in this manner, noxious insects can be eliminated to promote its growing.

Figure 111:
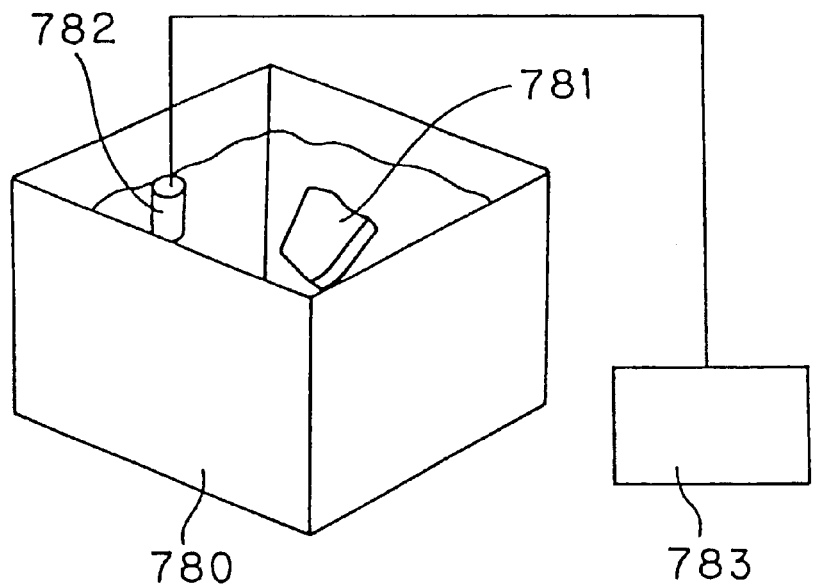
FIG. 111 is an explanatory view showing a way in which food is thawed in water.
Figure 112:
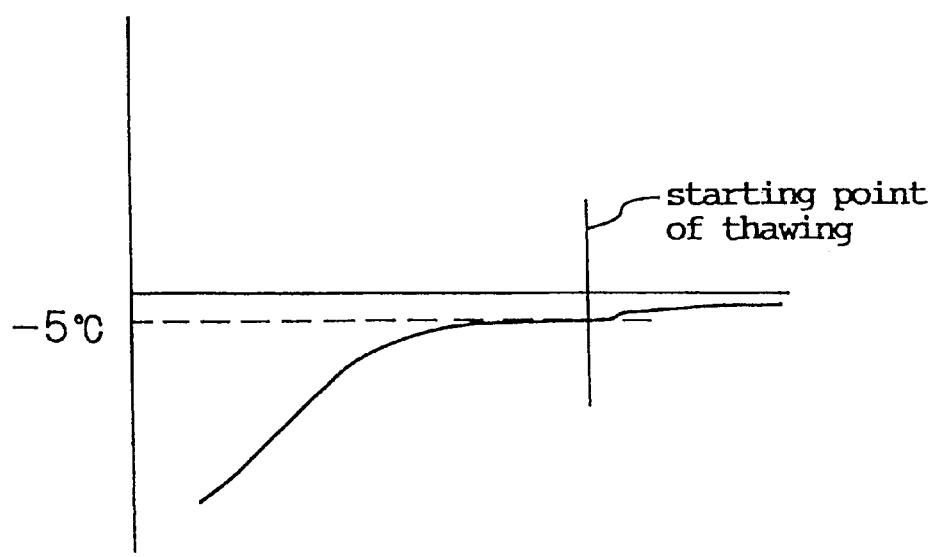
FIG. 112 is an explanatory graph showing a thaw starting point.

FIG. 111 shows a method of thawing in which frozen food is put in the water stored in an insulated water tank 780. On the contrary, an electrode 782 is put into the water, and is connected to a high voltage generating device 783.

In general, since frozen food does not melt at a temperature under −5° C. even in an electrostatic field, it is important that the temperature of frozen food is adjusted in water or air so as to raise its temperature quickly to 5° C. and then thawing is started in an electrostatic field.

Figure 113:
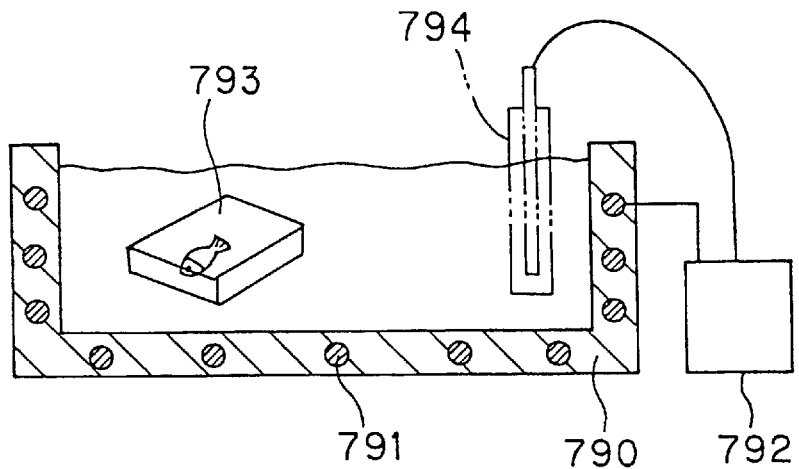
FIG. 113 is an explanatory view showing a way in which food is thawed in water.

In general, thawing of fishes and shellfishes must be done for a long time with those being dipped in water. However, if the thawing is done in an electrostatic field, it needs only a short time. FIG. 113 shows a thawing tank 790 which is made of concrete in which a metal wire 791 is buried, the metal wire is connected to a high voltage generating device 792. If the whole part of the thawing tank 790 is used as an insulating body, and the water therein is exposed to an electrostatic atmosphere, fishes and shellfishes 793 dipped in the water can be thawed for a short time. A bar-like insulating electrode 794 may be dipped without forming the whole portion of the thawing tank as an insulated electrode body.

Figure 114:
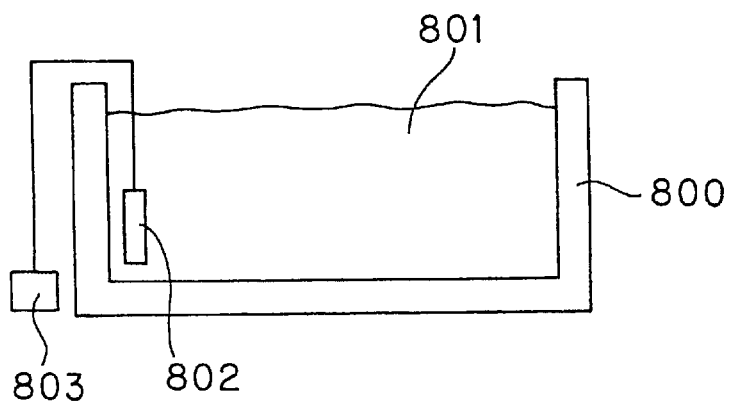
FIG. 114 is a structural view of an electrostatic field bath.

FIG. 114 shows a so-called electric field bath in which water is stored in an insulating tank 800, and an electrode 802 connected to a high voltage generating device 803 is inserted in the water 101. The electrode 802 may be a bare metal wire, and, however, it is preferable that the electrode 802 is covered with an insulating coating because it is no good that the metal wire contacts directly the body of a human being and other animals. In this case, as water is a good conductive body, the water itself can not be charged with electrocity without stopping the flow of electrons.

Next, the adaptation of this invention for medical treatment will now be explained.

Figure 115:
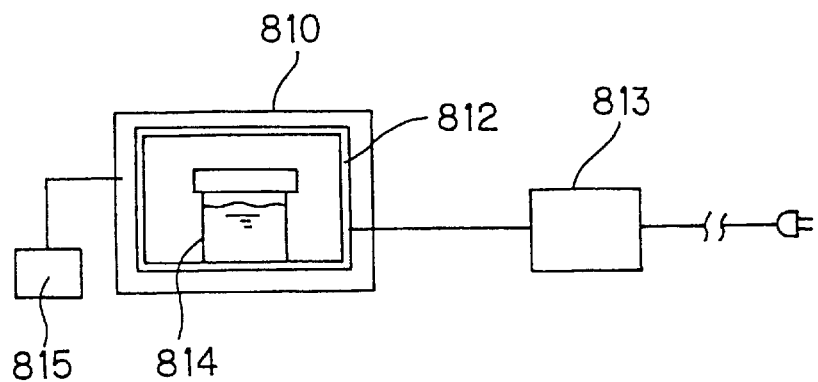
FIG. 115 is a structural view of a refrigerator for preservation of blood.

In FIG. 115, a numeral number 810 shows a refrigerator whose inner wall is made of a metal plate (not shown) which is covered with an insulating coating, and this metal plate is connected to a high voltage generating device 813.

Blood accommodated in a vessel 814 is coolly stored in an refrigerator 810. In general, blood of human being is stored at approximately +4° C. in a constant temperature atmosphere. However, if a voltage of 50V–5 kV is impressed on the inner wall 812 thereof, an electrostatic atmosphere is formed in the refrigerator 810 to charge the blood in the vessel 814 with electrocity, and it can be stored for a longer time than a conventional time without deteriorating the gradient of the blood. This blood is not frozen at a temperature of −4° C.–−5° C., and, therefore, it can be stored for a longer time at approximately −3° C. Further, blood is also frozen and stored through a quick freezing method, and, in this case, if blood is frozen in an electrostatic field, crystals of ice become small to enable the freezing of blood without breakage of cell. When fish, meat and the like as well as blood are frozen in a state of the impression of a voltage of 500V–2000V, crystals of ice in the cell become small to enable the freezing without the breakage of cell. Further, the blood can be thawed at a minus temperature of (approximately −3° C.), if thawing can be done without breakage of cell, and it can be stored at a minus temperature for a long time, maintaining a state of thawing of blood.

In general, in addition to blood transfusion, when internal organs of a human being, such as a heart, lever, kidney or horny coat of an eye are transplanted, if the refrigerator 810 is used as a good delivery box with an electric cell-type high voltage generating device 813 (a battery charging type device can be used), the freshness of them can be held, without freezing them, at a minus temperature for a long time.

Bone marrow can be coolly stored, in the same manner, and, especially, spermatozoons and ovums are stored in a frozen state. When the spermatozoons and ovums are thawed, there is no breakage of cell to enable an effective storing. A constant temperature control system 815 is arranged therein because it is necessary to perform correctly the control of temperature in a refrigerator for storing blood, and a part of the body of human being.

The inner wall 812 of the refrigerator 810 functions as an electrode. However, instead, an electrode plate may be simply set on the floor of a refrigerator to put a blood vessel thereon. Medicines and cosmetics for domestic use may be stored in this refrigerator to store them for a long time.

Figure 116:
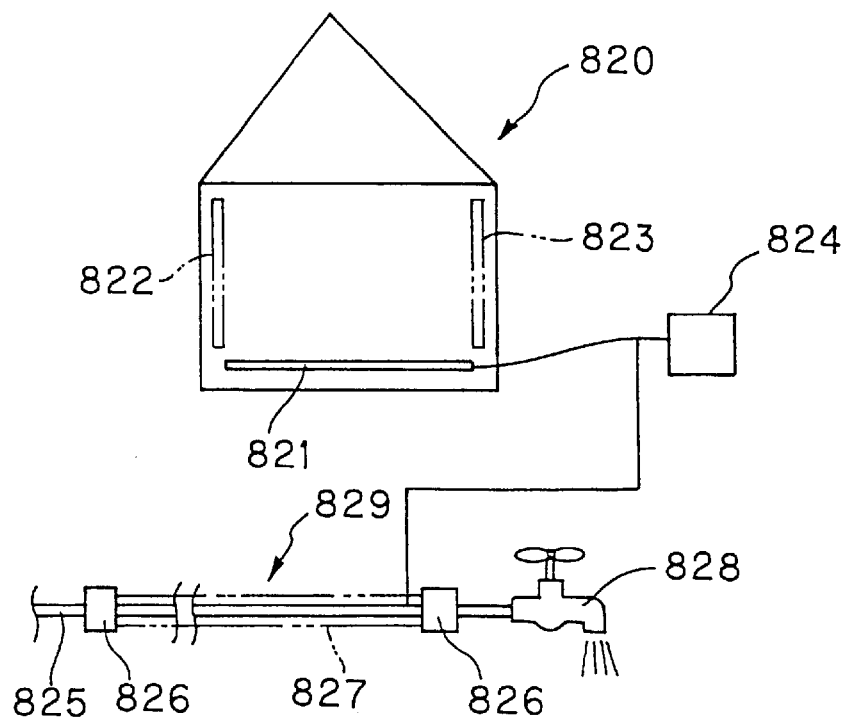
FIG. 116 is a structural view of an electrostatic field house.

FIG. 116 shows an electrostatic field house 80 whose floor or wall has electrodes 821, 822, 823 therein, which are connected to a high voltage generating device 824. On the contrary, at a predetermined position of a water pipe 821 is provided an impression portion 829 for an electrostatic field, the both ends of which are electrically insulated by insulating portions 826, 826, and the impression portion 829 is connected to a high voltage generating device 824. If an electrostatic field is formed in the house in this manner, ticks and fleas can be repulsed. Further, since an induction atmosphere can be formed in the house, a healthy environment can be obtained. The water coming out of a cock 828 is a good electron-charged water which has been treated in an electrostatic field during passing through the impression portion 829.

Figure 117:
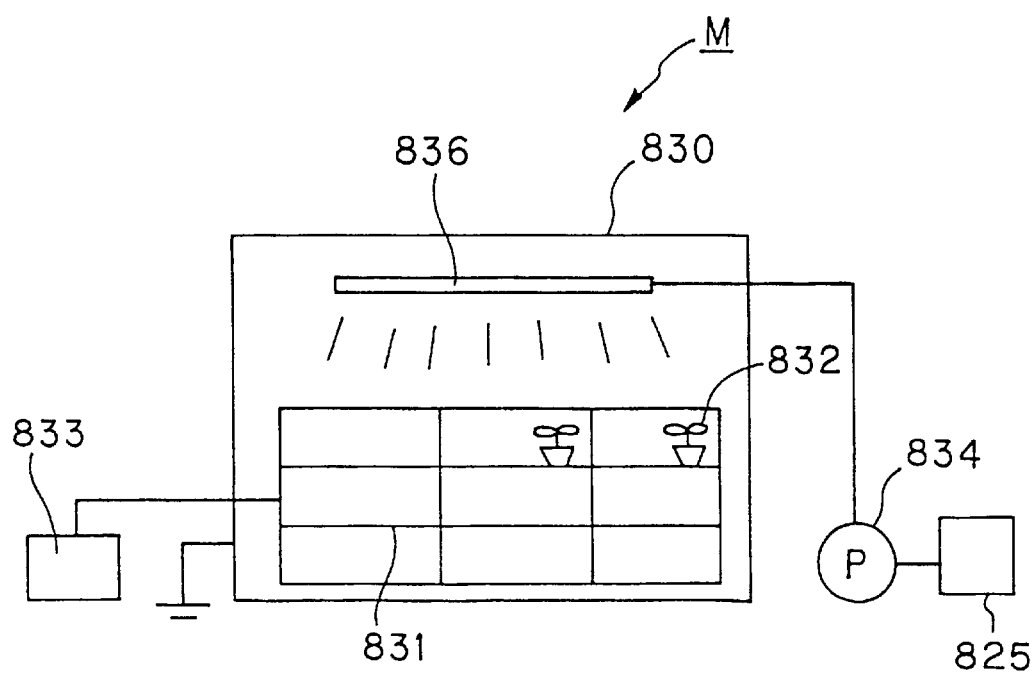
FIG. 117 is a structural view of a raw flower preservation device in which an electrostatic field is formed.

FIG. 117 shows a raw flower storage apparatus M which has a casing 830 in which shelves 831 are provided in an insulating state, and a high voltage is impressed on the shelves 831 by a high voltage generating device 833, and raw flowers 832 such as cut flowers are arranged on the shelves 831. A spray tube 836 is provided over the shelves 831, and water fed from a water tank 825 by a water pump 834 is sprayed through the spray tube. If water in the water tank 825 is treated so as to be electron-charged water, the freshness of the raw flowers can be kept better.

Figure 118:
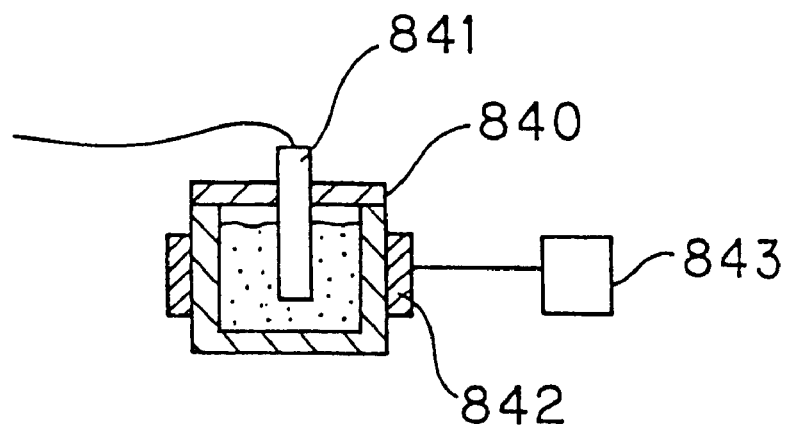
FIG. 118 is a sectional view of a dissolving furnace in which an electrostatic field is formed.

The electrostatic field functions to obtain a good dissolusion for metal. As shown in FIG. 118, an electrode 842 provided on the circumferential surface of a dissolving furnace 840 to form an electrostatic atmosphere in the dissolving furnace 840 in which an electric dissolution is performed by an electrode 841 (other dissolving methods can be adopted), so that a good dissolution for metal and manufacturing of alloy become possible because oxidation is prevented during reaction.

Figure 119:
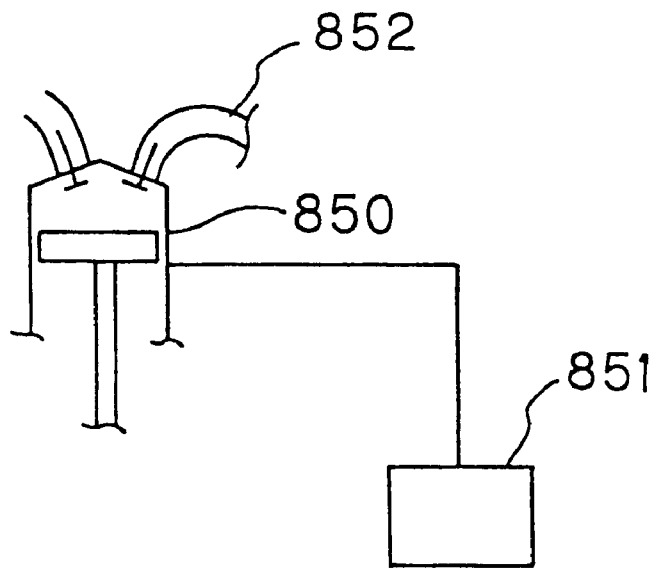
FIG. 119 is a structural view of an engine in which an electrostatic field is formed.

Further, as shown in FIG. 119, if an electrostatic field is formed in an internal-combustion engine 850 by a high voltage generating device 851, combustion efficiency is increased and poisonous gas in a gas discharged from a discharging tube 852 is decreased.

Figure 121:
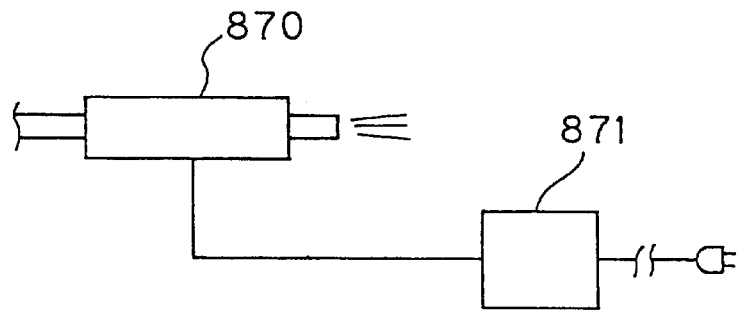

The electrostatic field treatment apparatus has a reducing function in this manner. Therefore, if a high voltage generating device 871 is, as shown in FIG. 121, connected to a discharging system such as a muffler of an automobile to form an electrostatic atmosphere therein, a poisonous oxidation gas such as $NO_X$ or $CO_2$ is decreased to protect an environmental pollution.

Figure 120:
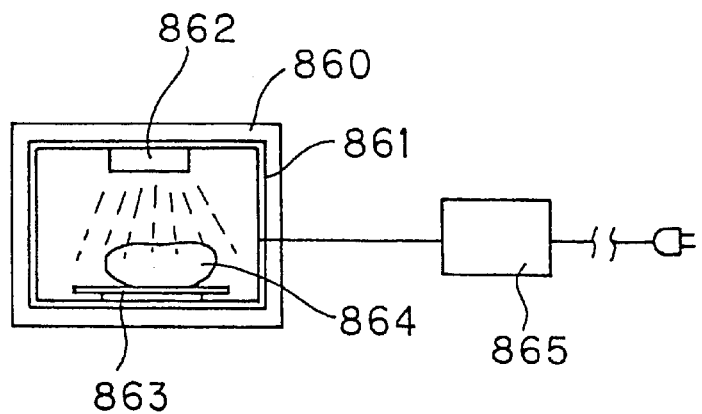

FIG. 120 is a view showing an electronic oven in which an electrostatic field treatment apparatus is arranged. The inner wall 861 formed of a conductive body such as graphite as non-metal material to be an electrode to which a high voltage generating device 865 is connected. A turntable 863 is provided at the lower portion of the electronic oven 860, and an object 864 to be treated is put on the turntable 863. If a microwave treatment is done in an electrostatic field in this manner, an object 864 to be treated is cooked evenly.

Figure 122:
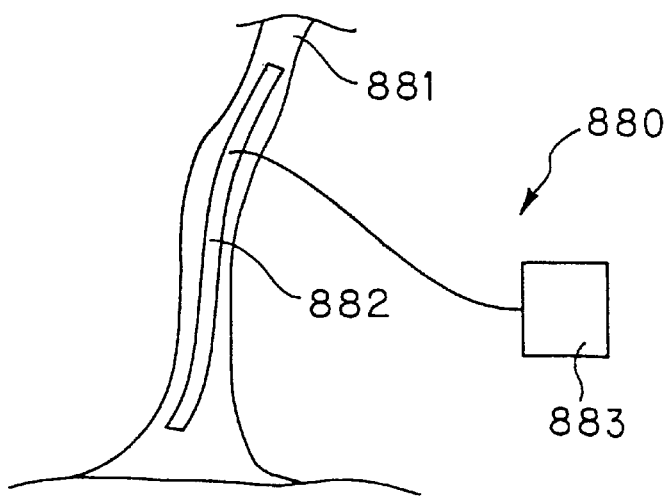

FIG. 122 shows a pine weevil eliminating device 880 which has an electrode 882 attached to a pipe tree 881, a voltage of 50–10 kV is impressed on the electrode 882 from a high voltage generating device 883 for a few minutes. Thereby, a pine weevil is eliminated.

Figure 123:
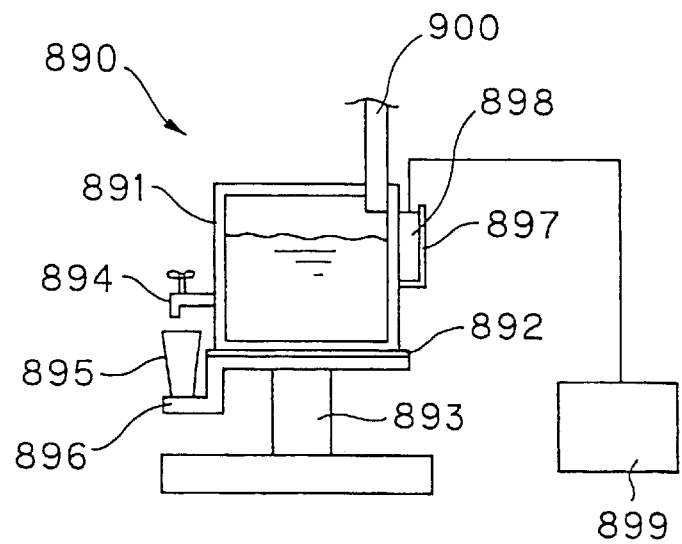

FIG. 123 shows an electron-charged water supply apparatus 890 which has a water tank supported on a table 893 through an insulating plate and provided with a cock 894. The water tank has, at its back face, an electrode holding portion 898 in which an electrode 898 made of metal is accommodated, and the electrode 898 is connected to a high voltage generating device 899 to make electron-charged water by charging water to be ionized in the water tank 891. The electrode 898 charges water in the water tank 891 through a circumferential wall thereof. However, the electrode 898 may be directly inserted into the water tank 891 supported in an insulating state. A cup 895 is put under the cock 894 provided on the front face of the water tank to be supported on a table 896. A water supply tube 900 is directed into the water tank 891 to supply water thereinto. The electron-charged water ionized in this manner becomes alkaline to increase slightly a value of PH and is suitable for water for drink.

Figure 124:
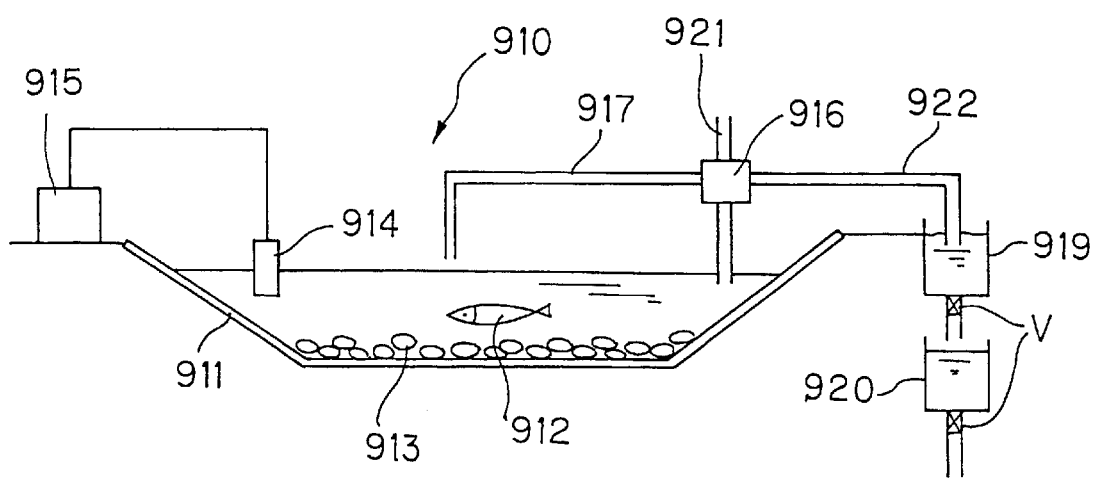

FIG. 124 shows a fish farm 910 which has a pond formed so that an insulating member 911 such as FRP is disposed in the earth, and fishes such as trouts are bred. Charcoals 913 are spread out on the bottom of the pond into which an electrode 914 is inserted, and the electrode 914 is connected to a high voltage generating device 915. The water in the pond is circulated by a water circulation apparatus. New water is supplied to the pond through a tube 921, pump 916 and a pipe 917. Water in the pond is once stored in a first water storage tank 919, and then is sent to a second water storage tank 920 by opening a valve V, and further is discharged by opening another valve V. That is, if discharged water flows to the earth continuously, water in the pond is not charged with electricity, and therefore, water storage tanks should be provided in two steps because the discharged water must be electrically insulated.

Figure 125:
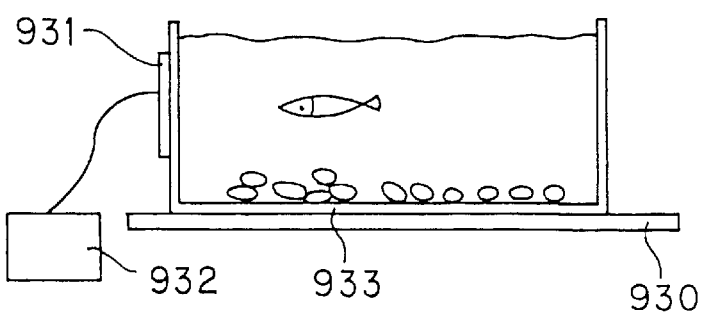

FIG. 125 shows a water tank for appreciation in a Japanese restaurant. The water tank is insulated by an insulating plate 930, and an electrode plate 931 is attached to the side face thereof. Thereby, water in the water tank is indirectly charged with electrocity. If water in the water tank is charged with electrocity, a fungus is not attached to fish, and fish grows more quickly, and, further, attachment of moss becomes less. If charcoals are spread on the bottom of the water tank, the effect of electric charge is increased by function of far ultrared rays. This apparatus makes possible hatching of eggs of fish, and the rate of hatching is remarkably increased.

Figure 126:
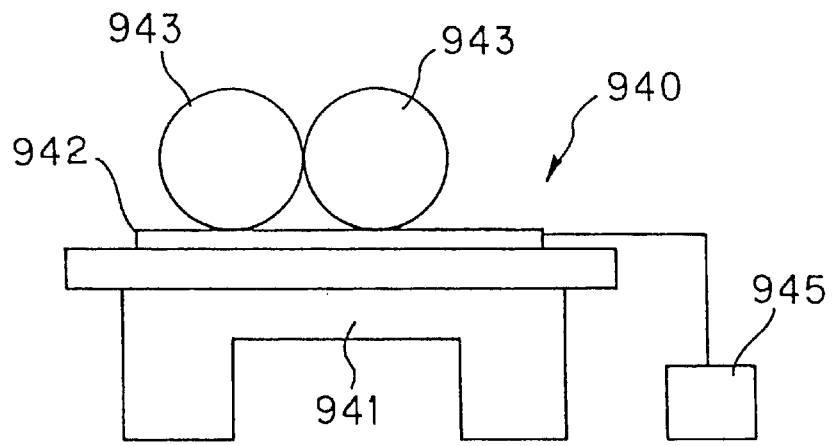
Figure 127:
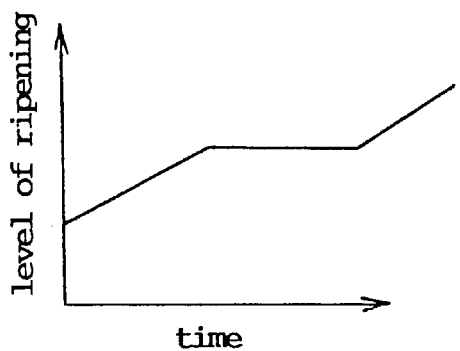

FIG. 126 shows a maturing apparatus 940 for wine and sake. It is found that the level of maturing of whisky and Japanese sake is remarkably increased in an electrostatic field. Namely, an insulated electrode 942 is put on a table 941, and the electrode is connected to a high voltage generating device 945. The maturing apparatus can be also adapted for making pickles. It is found that if pickles are treated in an electrostatic field, a good level of maturing is maintained for a predetermined time after the level of maturing of pickles reaches a good value. That is, if pickles such as egg plants and cucumbers are made in an electrostatic field, a period of time from a time when they have been matured to a time when they have been soured is extended, whereby the period of time of good taste is extended.

Figure 128:
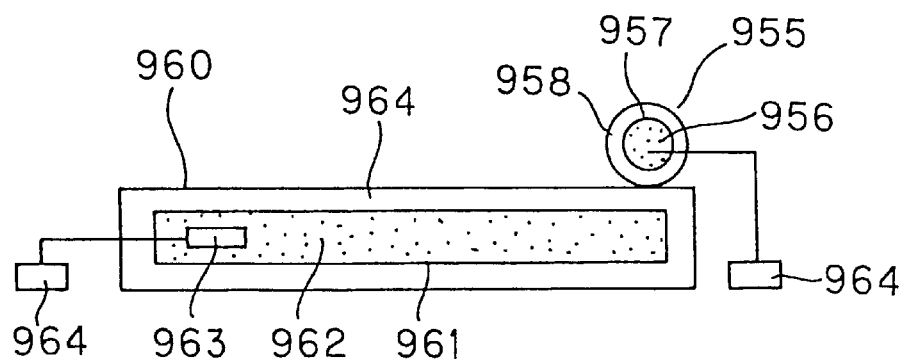

FIG. 128 shows an electrostatic field water bed 960 and an electrostatic pillow 965. The bag 961 of the water bed 960 includes water 962 therein in which an electrode 963 (covered with insulating coating or without coating) is accommodated, and the electrode 963 is connected to a high voltage generating device 964. An outer wrapping member has the bag 961 therein and is made of cloth to be insulated, so that a voltage is impressed on a man who lies (stays in air as an insulating body) on the outer wrapping member.

A bag 957 has water therein on which a voltage from a high voltage generating device 964 is impressed, and the bag 957 is covered with an outer covering member 958 to form an electrostatic field pillow. Instead of a water bed and a water pillow, conductive half-liquid body or solid body (fine powder body) may be used. In addition, it can be thought that swelling substance (substance included in a diaper) is put in a flexible and insulating bag such as plastic, and water is poured in the bag at an actual spot to form a predetermined shape to make various electrodes.

Figure 129:
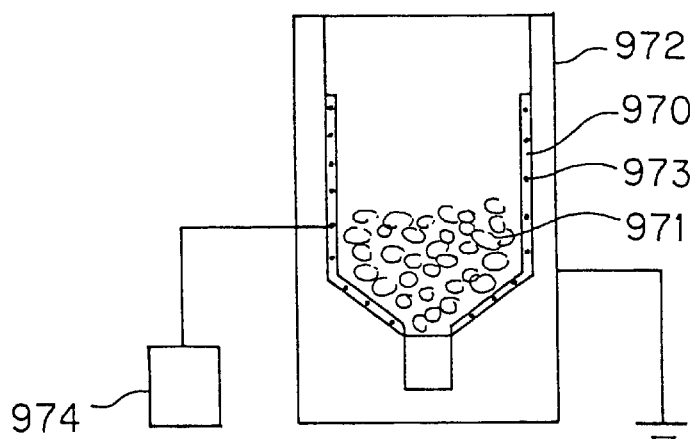

FIG. 129 shows a rice storage apparatus in which an accommodating cylinder 970 is provided to accommodate rice therein. The casing of the apparatus is earthed, and the accommodating cylinder itself is formed as an electrode which is so formed that a copper wire is buried in an insulating body, and the copper wire is connected to a high voltage generating device 974. There are various ways for forming the accommodating cylinder as an electrode. A conductive sheet may be adhered on the inner wall of the accommodating cylinder 970, and a plate-like conductive plate may be buried in an insulating member. If the rice accommodating cylinder 970 is formed as an electrode to accommodate rice therein, the taste of rice becomes well and the freshness of rice is maintained.

Figure 130:
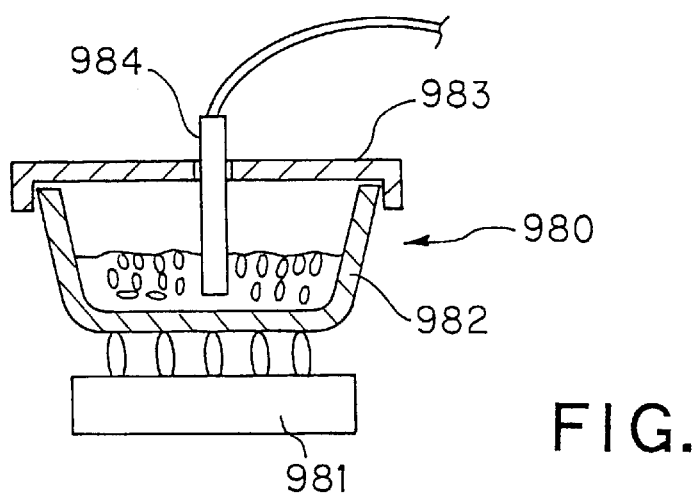

FIG. 130 shows a rice cooker 980 put on a heating device 981, and cooked rice is accommodated in the main body of the rice cooker. The main body thereof is closed with a cover plate 983, at the center of which a bar-like insulating electrode 984 is supported in a state wherein the lower end is inserted in the cooked rice in the main body 982 thereof. It is found that if rice is cooked in an electrostatic field, it can be cooked well. A similar structure may be adapted for a pressure cooker for cooking meat or chicken in addition to rice.

Figure 131:
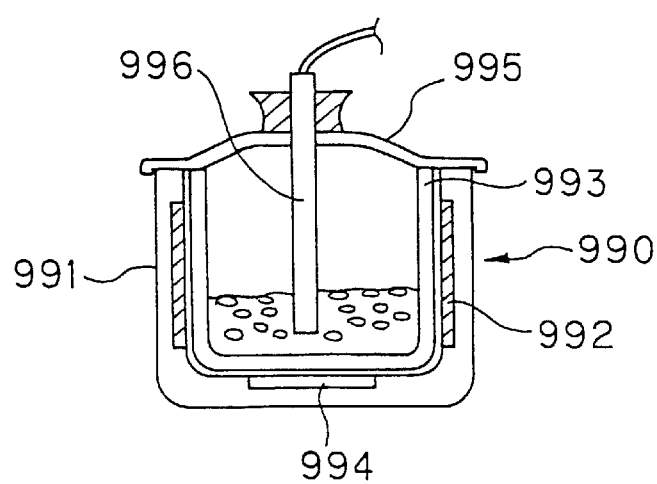

FIG. 131 shows a case in which an electrostatic field is formed in a large cooker. However, this can be adapted for domestic use. That is, a cylinder-like case (wall of the cooker) 990 has, therein, a plate-like insulated electrode 992 in a circular manner and accommodates a vessel 993 detachably therein in which rice is put. The case 991 and vessel 993 are closed with a cover member 995 by which a bar-like insulating electrode 996 is supported so that the lower end of the electrode 996 is inserted in the rice. It is not necessary that both of insulating electrode plate 992 and bar-like electrode 996 at the same time.

FIG. 132 shows a case of an electrostatic medical treatment in which a human body is located in an electrostatic field. An insulated electrode plate 1001 is put on a table 1000 for medical treatment, on which a mattress 1002 is located to lay a man 1003 thereon. The insulated electrode plate 1001 is connected to a high voltage generating device 1004. If a man is laid in an electrostatic field, medical treatment is possible. In addition, if a dead body of a human being is laid on an insulated electrode plate 1001 in a dead body treatment apparatus, the rotting speed of a dead body becomes slow. In this case, the dead body may be laid directly on the electrode plate without the mattress.

FIG. 133 shows a so-called electrostatic pan 1010 which has an insulating body 1011 such as ceramic in which a metal wire 1012 is burried, and the metal wire 1021 is connected to a high voltage generating device 1014 through a connecting portion 1013 so that the whole portion of the pan 1010 forms an insulated electrode. The pan 1010 is put on a gas table 1015, and a fire protection fin 1017 is formed at the lower circumferential surface of the pan. Various cookings are possible in an electrostatic field. It is found that if meat, fish and vegetable are cooked in an electrostatic field, the taste of them becomes good. The metal wire 1021 may be made of a nicrome wire to use it as a heater and an electrode. Instead of the metal wire 1021, a pan-like metal plate 1018 may be used as shown in FIG. 134.

Next, a concrete electric circuit for a high voltage generating device used for the above various apparatuses.

In FIG. 135, a numeral number 1020 is a plug 1020 which is connected to a domestic power source of 100V. The plug 1020 is connected to a power switch 102, and a LED 1022 lights when the power switch 1021 is turned on. The switch 1021 is connected to a transformer 1032 for outputting 12V through a connecting terminal 1023, and electric current from the transformer 1032 is rectified to be direct electric current so as to be inputted into a transistor 1024 (DC power source). On the contrary, the switch 1021 is connected to a contact "a" of a relay 1025, and the contact "a" normally contact a contact "b" to be connected to a change-over switch 1026 through the terminal 1023. A switch 1026 for switching selectably the secondary side output voltage of a transformer 1027, and an electrode 1028 is disposed on the end portion of the second side thereof via a resistance 1029 which restricts electric current flowing to the electrode. For example, the resistance is selected so that only electric current less than 2 mA flows into the electrode 1028 for safety of a human body.

A contact "d" normally contacts a contact "e", and a contact "f" does not contact the contact "e", and the red LED 1030a of an alarm device 1030 is off, and a blue LED 1030b and a power switch 1022 are on. Further, at the center portion of the drawing are provided two operational amplifiers 1031, 1032, between which a zener diode 1023 is disposed to operate a transistor 1034 and the relay 1025 when abnormal electric current flows in the circuit. Thereby, the contact "a" is separated from the contact "b" and the contact "e" contacts the contact "f". Therefore, at this time, the supply of electric current to the transformer 1027 is stopped and the operational amplifier 1031 operates so that the blue LED 1030b of the alarm device 1030 becomes off and the red LED 1030a becomes on.

The end of the secondary side of the transformer 1027 is connected to the electrode plate 1028 via the resistance, and the other end thereof is grounded through a resistance. Therefore, it is safe because electric current more than a predetermined value does not flow in the circuit. Since the other end of the secondary side of the transformer 1027 is earthed, a desired voltage can be impressed on the electrode. In the case of the use of such a high voltage generating device, if the voltage impressed on an electrode of a fryer is determined at 500–700V, the casing itself of the fryer is not necessarily earthed, and only the earth for the high voltage generating device is necessary. In case that an electric capacity for the whole of the fryer is large, the fryer itself can be used as an earth. In the case of the use of a domestic refrigerator, if the refrigerator has an enough electric capacity, the refrigerator itself is not necessarily grounded, and the earth for a high voltage generating device may be connected to the case of the refrigerator. If the refrigerator does not have an enough electric capacity for earth, a metal body may be provided on the case of the refrigerator if necessary.

Next, an electric circuit for a portable electrode will now be explained.

In FIG. 136, the electric circuit comprises a voltage converter 1040 for converting a voltage inputted by a battery into a high voltage, a switchingcircuit 1041 for making an alternating voltage to change over the high voltage increased by the convertor 1040, and a voltage adjusting circuit 1042 for generating a voltage in response to a frequency. The voltage convertor 1040 has a transformer 1043 whose primary side is grounded via a transistor 1044 performing a switching operation. The flow of electric current is controlled by diodes 1045, 1046, 1047, 1048, coils 1049, 1050 and condensers 1051, 1052 on the secondary side of the transformer 1043 so that plus voltage and minus voltage with the same value are changed over to make an alternating voltage. On the contrary, a voltage on the secondary side is compared with a reference voltage 1054 by a comparator 1053. When its difference exceeds a predetermined value, a photo-isolator operates to drive a pulse width control circuit 1056 at the time of detecting the lightning, so that the transistor 1044 performs a switch changing operation with a predetermined width of pulse. This system can be controlled so that the condition of an object to be treated is detected by a sensor to send the detected signal to a system controll portion 1061. In this case, a sequence control is performed by a computer or timer.

If the contact of the transformer 1043 is moved upward, as shown in FIG. 137, an alternating voltage in which a negative voltage is larger than a positive voltage is generated. If the alternating voltage is impressed on the object to be treated, electrostatic field treatment with a strong reducing function is possible. Further, this pattern can be adapted for an alternating power source, and, as shown in FIG. 138, negative ripple can be obtained.

FIG. 139 shows a circuit for a high voltage generating device 1070 for a refrigerator or fryer. The high voltage generating device 1070 has an alternating current power source 1071 which is turned on or off by a switch 1072. The power source 1071 is connected to a transformer 1073, the one end of the secondary side of which is connected to an electrode 1074, and the other end of which is grounded through a casing 1075. A sensor 1076 for measuring electric line of force is provided oppose to the side face of the casing 1075 to turn off a switch 1072 through a controller 1077 when the casing is accidentaly charged without the casing being grounded. Thereby, an operator does not receive electric shock when he touches the casing with abnormality of earth.

As a safety device, ampere-meters 1078, 1078 can be provided on the way between a transformer 1073 and an electrode 1074 or on an electric wire for earth to turn off the switch 1072 when the decrease of value of electric current is detected without a normal function of earth.

When an impressed voltage on a fryer or refrigerator is low, the fryer itself and the refrigerator itself are not necessarily grounded. Further, in the case of a large electric capacity of the fryer and the refrigeration, the fryer itself and the refrigerator itself can be used for earth of a high voltage generating device.

When a system for forming an electrostatic field, of this invention, is assembled in a refrigerator, there is a case in which the inner wall of the refrigerator must be formed in an insulating state or the electrode is covered with an insulating coating in order to prevent electric current from flowing when an object to be treated contacts the inner wall thereof. At this time, it is preferable to use an insulating material such as perhydropolysilazine which can be sprayed at a room temperature. Polysilazine is inorganic with a basic structure —$SiH_2$—NH—, and is synthesized so that ammonia is put in complex of zikurrosylane and pyridine. Recently it is sold by TONEN (Japanese Company).

A high voltage of 100V–5000V can be impressed on an object to be treated in response to various objects. The above high voltage generating device is normally connected to a domestic power source with a frequency of 60 Hz or 50 Hz. In addition, a frequency may be changeable by provision of a frequency changing apparatus in a circuit. It is found that the time of thawing is decreased with a frequency of 120 Hz and 200 Hz.

FIG. 140 is a circuit of a high voltage generating device in which a domestic power source is used as an earth, and a plug 1100 is connected to an automatic judging circuit 1103 which automatically judges the earthed side of the power source to connect it to the one end (earthed end) of the primary side and the end (earthed end) of the secondary side of a transformer 1101, and the casing 1102 of a refrigerator or fryer. The provision of such a circuit 103 can eliminate an earth for the transformer 1101 and the casing 1102.

INDUSTRIAL APPLICABILITY

As mentioned above, electrostatic field treatment method and apparatus are suitable for freezing, thawing and freshness-keeping of food, prevention of oxidation of edible oil, and manufacturing of electron-charged water, etc.

What is claimed is:

1. A method of treating a food object in an electrostatic field, comprising the steps of:

placing a conductive electrode in an insulated atmosphere to impress a voltage on the conductive electrode to generate an electrostatic field around the conductive electrode;

placing the food object to be treated in the electrostatic field in an insulated state;

establishing a freezing temperature of the food object on a basis of a relationship between a kind of the food object and a voltage to be impressed thereon; and storing the food object at a temperature between 0° C. and the freezing temperature of the food object.

2. The method of treating the food object according to claim 1, wherein the electrostatic field is in a refrigerator having a plurality of shelves, at least one of which is connected to a voltage generating device, other shelves being adjustable as to their positions relative to each other.

3. The method of treating the food object according to claim 1, wherein the conductive electrode is connected to a voltage generating device of direct current in such a manner that the electrode is grounded when a door of a refrigerator containing the food object is opened.

4. The method of treating the food object according to claim 1, wherein the electrode is connected to a normal domestic electric power through a safety device for prevention of an overcurrent.

5. The method of treating the food object according to claim 1, wherein the electrostatic field is in a refrigerator having a plurality of electrodes each having an insulating coating of different kinds of coating material to form a different electrostatic state on each electrode.

6. The method of treating the food object according to claim 1, wherein the electrostatic field is in a refrigerator having a plurality of rooms including a thawing room, a low voltage being impressed on a vegetable room while a high voltage is impressed on the thawing room.

7. The method of treating the food object according to claim 6, wherein the impressed voltage is changed by controlling an area of the conductive electrode disposed in each room of the refrigerator.

8. The method of treating the food object according to claim 1, wherein a refrigeration system controls a refrigeration temperature in such a manner that the refrigeration temperature is kept lower than normal in a conventional refrigerator when the electrostatic field is formed in the refrigerator, while the refrigeration temperature is increased when the electrostatic field is broken.

9. A method of treating a frozen food object in an electrostatic field, comprising the steps of:

placing a conductive electrode in an insulated atmosphere to impress a voltage on the conductive electrode to generate an electrostatic field around the conductive electrode;

placing the food object to be treated in the electrostatic field in a insulated state;

adjusting the temperature of the food object to quickly raise the temperature of the food object to approximately −5° C.; and then thawing the food object in the electrostatic field.

10. A method of setting a temperature of a food object placed in an electrostatic field comprising the steps of:

selecting the temperature to which the food object is to be set;

selecting a voltage based on the selected temperature and composition of the food object;

applying the selected voltage to a conductive electrode in a thermally conductive atmosphere to generate an electrostatic field around the conductive electrode; and placing the food object in the electrostatic field in the thermally insulated atmosphere.

11. The method as claimed in claim 10, wherein said placing step comprises placing a frozen food object in the electrostatic field to defrost the frozen food object.

12. The method as claimed in claim 11, further comprising the step of storing the frozen food object at a temperature between 0° C. and the selected temperature.

13. The method as claimed in claim 10, wherein the placing step comprises placing the food object in the electrostatic field to maintain the freshness of the food object.

14. The method as claimed in claim 10, wherein the placing step comprises placing the food object in the electrostatic field to mature the food object.

* * * * *